United States Patent
Maciesowicz

(10) Patent No.: US 7,562,161 B2
(45) Date of Patent: *Jul. 14, 2009

(54) UNIVERSAL GRAPHIC ADAPTER FOR INTERFACING WITH UGA HARDWARE VIA UGA VIRTUAL MACHINE AND MEANS FOR ABSTRACTING DETAILS OF THE UGA HARDWARE

(75) Inventor: Maciej Maciesowicz, Duvall, WA (US)

(73) Assignee: Microsoft Corporation, Redmond, WA (US)

( * ) Notice: Subject to any disclaimer, the term of this patent is extended or adjusted under 35 U.S.C. 154(b) by 551 days.

This patent is subject to a terminal disclaimer.

(21) Appl. No.: 11/079,814

(22) Filed: Mar. 14, 2005

(65) Prior Publication Data

US 2005/0160191 A1 Jul. 21, 2005

Related U.S. Application Data

(63) Continuation of application No. 10/157,067, filed on May 29, 2002, now Pat. No. 6,907,482.

(60) Provisional application No. 60/341,140, filed on Dec. 13, 2001.

(51) Int. Cl.
- *G06F 3/00* (2006.01)
- *G06F 13/00* (2006.01)
- *G06F 9/445* (2006.01)

(52) U.S. Cl. .................. 710/9; 710/8; 710/16; 710/104; 710/302; 345/1.1; 345/5; 345/520; 345/698; 713/1; 713/2; 713/100; 709/323; 709/324

(58) Field of Classification Search ............ 710/1, 710/9, 16, 63; 713/1, 2, 100; 345/520, 1.1, 345/5, 698; 709/323, 324
See application file for complete search history.

(56) References Cited

U.S. PATENT DOCUMENTS

| | | | |
|---|---|---|---|
| 5,438,663 | A | 8/1995 | Matsumoto et al. |
| 6,049,316 | A | 4/2000 | Nolan et al. |
| 6,081,891 | A | 6/2000 | Park |
| 6,697,033 | B1 | 2/2004 | Leung et al. |
| 6,928,543 | B2 | 8/2005 | Hendry et al. |

OTHER PUBLICATIONS

European Search Report Dated Feb. 17, 2003 for European Application Serial No. 02025052-8.
Microsoft Corp., Universal Graphics Adapter: Firmware Solution for Low-Level Graphics Support, Jun. 2002, pp. 1-6.
B. Haakenson, Examining the VESA VBE 2.0 Specification: Extending the VESA Standard, Dr. Dobb's Journal, vol. 20, Jul. 1995, pp. 80-83.
S. Thompson, VGA-Design Choices for a New Video Subsystem, vol. 27, 1988, pp. 185-197.
EFI Universal Graphics Adapter (VGA), by Intel, Aug. 27-30, 2001, website: http://developer.intel.com/technology/efi/vga_idf_final_revz.pdf, 37 pages.

*Primary Examiner*—Tammara R Peyton
(74) *Attorney, Agent, or Firm*—Amin, Turocy & Calvin, LLP

(57) ABSTRACT

The subject invention relates to a Universal Graphics Adapter (UGA) that is a hardware-independent design that encapsulates and abstracts low-level graphics hardware in a standard manner through firmware. UGA is a firmware standard, intended to wrap existing or planned hardware, including VGA. UGA does not require the use of real-mode assembly language, direct hardware register, or frame buffer access to program, thus providing advantages over conventional systems. UGA supports basic drawing operations, continuous display modes, and power management. As a firmware-based standard, UGA facilitates updating a system to support both evolving and new hardware features.

20 Claims, 9 Drawing Sheets

UNIVERSAL GRAPHIC ADAPTER FOR INTERFACING WITH UGA HARDWARE VIA UGA VIRTUAL MACHINE AND MEANS FOR ABSTRACTING DETAILS OF THE UGA HARDWARE

CROSS-REFERENCE TO RELATED APPLICATION

This application is a Continuation of U.S. patent application Ser. No. 10/157,067 entitled "UNIVERSAL GRAPHIC ADAPTER FOR INTERFACING WITH HARDWARE AND MEANS FOR ENCAPSULATING AND ABSTRACTING DETAILS OF THE HARDWARE," filed May 29, 2002 and is related to U.S. Divisional patent application Ser. No. 10/885,955 entitled "UNIVERSAL GRAPHICS ADAPTER," filed Jul. 7, 2004. This application claims the benefit of U.S. Provisional Patent application Ser. No. 60/341,140 entitled "UNIVERSAL GRAPHICS ADAPTER," filed Dec. 13, 2001. The entireties of the above-noted applications are incorporated by reference herein.

TECHNICAL FIELD

The present invention relates generally to video graphics display and more particularly to hardware independent video display facilitated through firmware services that abstract video hardware and expose an interface to an operating system.

BACKGROUND OF THE INVENTION

Video graphics array (VGA) is a graphics display system for personal computers (PCs). VGA has become one of the de facto standards for PCs, providing a resolution of 720 by 400 pixels in text mode and a choice of resolutions in graphics mode (e.g., 640 by 480 by 16 colors, 320 by 200 by 256 colors). VGA is a hardware specific standard that employs analog signals, not digital signals. Other standards have appeared since the 1987 VGA debut but VGA remains the lowest common denominator standard and thus substantially all PCs support VGA. However, VGA has drawbacks.

For example, VGA is hardware specific and thus to program to VGA requires knowledge of hardware, software, and assembly and/or machine language, which makes such programming difficult. Furthermore, some of the original requirements of VGA are becoming harder to support as the PC continues to evolve, requiring extensive rework of assembler and/or machine coded BIOS (Basic Input Output System) code to support enhancements. The VGA standard from the 1980s makes demands on hardware and software that are outdated today, such as the use of Int 10 services, a non-linear frame buffer, a limited range of display modes, and direct register addressing using real-mode assembly language. Further limitations include that BIOS code executes in a real-mode x86 environment and that the video BIOS image is restricted to an absolute maximum of 64K. Additionally, VGA is tied to legacy I/O (Input/Output) and memory usage that has a non-relocateable memory and a non-intuitive, non-linear frame buffer layout. Also, VGA has limited mode support (e.g., 80×25×70 Hz characters and 640×480×16-color graphics). VGA also does not support power management, which has become increasingly important in mobile computing environments. Also, there is no firmware support of VGA adapters in a multiple-monitor configuration under existing operating systems.

Substantially all display devices support VGA in addition to the high-performance device capabilities they expose. Many PCs require a VGA device to be in the machine before the system can boot and BIOS Power-On Self Test (POST) messages require a VGA device for display. In addition to being a de facto universal standard, VGA is also now a dated standard, with capabilities that have not changed significantly as the PC platform has evolved.

SUMMARY OF THE INVENTION

The following presents a simplified summary of the invention in order to provide a basic understanding of some aspects of the invention. This summary is not an extensive overview of the invention. It is not intended to identify key or critical elements of the invention or to delineate the scope of the invention. Its sole purpose is to present some concepts of the invention in a simplified form as a prelude to the more detailed description that is presented later.

Universal Graphics Adapter (UGA) is a hardware-independent design that encapsulates and abstracts low-level graphics hardware in a standard manner through firmware. UGA is a firmware standard, intended to wrap existing or planned hardware, including VGA. UGA does not require the use of real-mode assembly language, direct hardware register, or frame buffer access to program, thus providing advantages over conventional systems. UGA supports basic drawing operations, continuous display modes, and power management. As a firmware-based standard, UGA facilitates updating a system to support both evolving and new hardware features.

UGA mitigates shortcomings of VGA without making basic graphical operations more difficult to perform. For example, use of firmware to wrap hardware implementations facilitates a variety of display adapters complying with a UGA specification without requiring hardware changes. An example UGA firmware interface specification is attached hereto as Appendix A and which is considered part of this patent application specification. UGA facilitates devices supporting multiple BIOS, including both UGA and VGA BIOS in, for example an Option ROM (Read Only Memory). The VGA register set will not be changed, so hybrid display adapters will continue to work in existing machines, as well as working with a UGA-enable operating system. From one point of view, UGA extends the concepts of Plug and Play (PnP) and ACPI (behind the PCI bus) by providing standardized enumerating and manipulating of child devices of display adapters.

UGA features include, but are not limited to: hardware details being wrapped by firmware; exposed device capabilities being implemented in firmware; native mode support being exposed by firmware; not requiring access to legacy I/O ports or memory; employing Base Address Registers (BARs) in PCI (Peripheral Component Interconnect, a local bus standard) space only; not requiring real-mode execution environment; not limiting size of BIOS to 64K; facilitating adding new functionality to the BIOS; cross-platform support (e.g., x86, Itanium); improved overall graphics hardware and driver quality, and being able to code a BIOS in a higher level language (e.g., C vs. assembler/machine).

UGA benefits different classes of user in different ways. For example, substantially all users benefit from an improved pre- and post-boot experience. When users first switch on computers, they will be presented with a high-resolution graphical display on which an OEM (Other Equipment Manufacturer) can place graphics during and/or before a power on self-test (POST). This can include, for example, tools for repairing or configuring the system that follow the same paradigm as the operating system. An experienced user who wants to take advantage of multi-monitor support will not be required to understand how to disable the VGA BIOS on one of the display adapters. Users upgrading from earlier releases of operating systems on mobile PCs that lack high-performance display drivers can benefit from power-managed driver support, unlike the conventional VGA driver.

UGA has other benefits. For example, a BIOS can be developed in a high-level language (e.g., C, C#) rather than in assembler. Thus, a BIOS will be easier to maintain, because high-level language programming skills are more widely available than assembler skills. Furthermore, the BIOS size will not be restricted to 64K, so support for new features can be added as they become available and required. Display adapters will be platform independent, freed from the hardware restrictions for Int 10 support or x86 assembler thus facilitating adapting and evolving new display hardware. New display adapters will not be required to support the VGA register set in new display adapters, thus facilitating innovation in adapter design. Display hardware can be made to support UGA through firmware, which can reduce die size. Furthermore, independent hardware vendors will not be required to supply a UGA device driver, since a UGA driver can be provided as part of an operating system. Thus, adapters should be more timely brought to market.

Operating systems can provide a UGA driver. A UGA Hardware Abstraction Layer (HAL) wraps both native UGA driver support and the VGA driver, which facilitates a system supporting the transition between VGA and UGA devices. In one example of the present invention, if both supported types are available, a system can be configured to default to UGA.

To the accomplishment of the foregoing and related ends, certain illustrative aspects of the invention are described herein in connection with the following description and the annexed drawings. These aspects are indicative, however, of but a few of the various ways in which the principles of the invention may be employed and the present invention is intended to include all such aspects and their equivalents. Other advantages and novel features of the invention may become apparent from the following detailed description of the invention when considered in conjunction with the drawings.

BRIEF DESCRIPTION OF THE DRAWINGS AND APPENDICES

FIG. 1 compares a BIOS with UGA firmware abstracting UGA hardware through an exposed interface and a conventional VGA specific BIOS interacting with a register interface.

Figure 1:
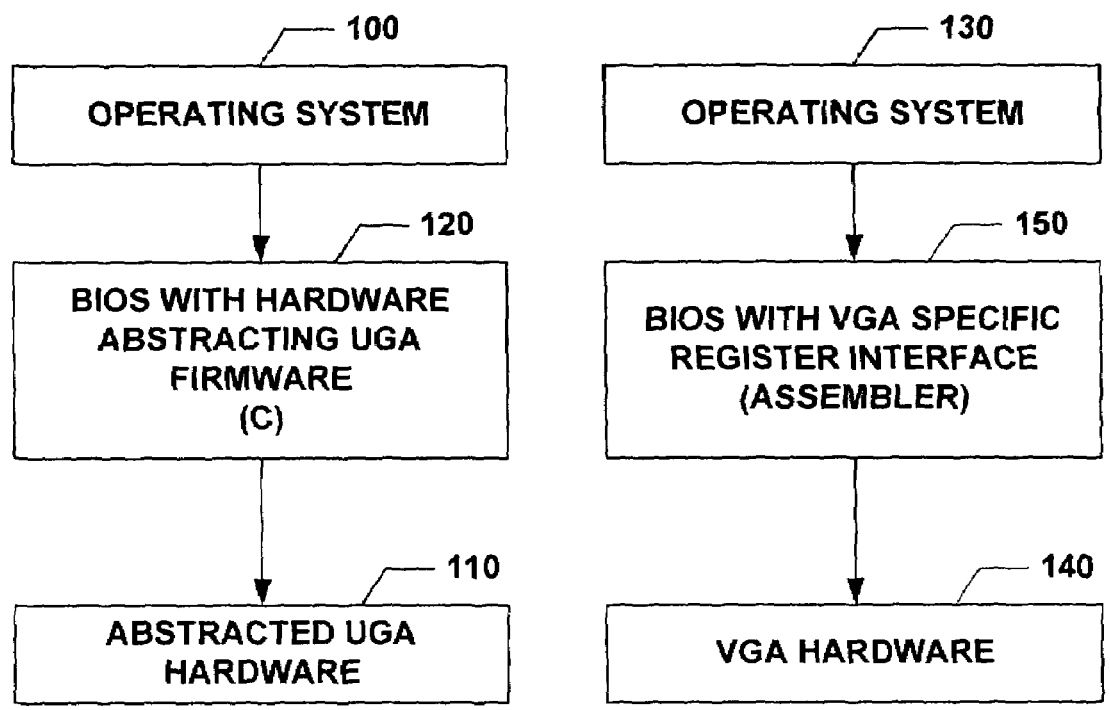

Appendix A is an example UGA firmware interface, and this Appendix is considered part of this patent application specification.

Appendix B is an example Extensible Firmware Interface Universal Graphics Adaptor (EFI-UGA) Binding Protocol, and this Appendix is considered part of this patent application specification.

DETAILED DESCRIPTION

The present invention is now described with reference to the drawings, where like reference numerals are used to refer to like elements throughout. In the following description, for purposes of explanation, numerous specific details are set forth in order to provide a thorough understanding of the present invention. It may be evident, however, to one skilled in the art that the present invention may be practiced without these specific details. In other instances, well-known structures and devices are shown in block diagram form in order to facilitate description of the present invention.

As used in this application, the term "computer component" is intended to refer to a computer-related entity, either hardware, a combination of hardware and software, software, or software in execution. For example, a computer component may be, but is not limited to being, a process running on a processor, a processor, an object, an executable, a thread of execution, a program and a computer. By way of illustration, both an application running on a server and the server can be computer components. One or more computer components may reside within a process and/or thread of execution and a computer component may be localized on one computer and/or distributed between two or more computers.

UGA is a next generation graphics adapter technology that succeeds VGA. UGA abstracts graphics hardware and exposes a UGA firmware interface that facilitates platform independent interaction between entities on the different sides of the firmware interface (e.g., an operating system and a graphics display device). The UGA firmware interface is exposed from UGA firmware. In one example of the present invention, the system firmware and UGA HAL driver employ the interface to perform basic operations with the UGA hardware. This layer replaces legacy video BIOS. In the example, UGA firmware exports a single entry point to the external world (e.g., system firmware, operating system runtime). One example exported entry point is UgaFwDispatchService, which is responsible for dispatching a UGA I/O request to an appropriate handler within the UGA firmware, based on a UGA device type and I/O request type. One example UGA specification therefore defines five UGA device types (UgaDtParentBus, UgaDtGraphicsController, UgaDtOutputController, UgaDtOutputPort, UgaDtOther) to facilitate interacting with an operating system through the entry point.

UGA supplies high resolution, high color, multiple monitor support, GDI (Graphics Device Interface) acceleration and LFB (Linear Frame Buffer) layout independence. UGA defines an interface that IHVs (Independent Hardware Vendors) can implement on UGA hardware to facilitate interacting with an operating system via a UGA firmware. Thus, as an operating system, firmware and/or hardware evolve, so long as the interfaces between such entities are maintained, such changes can be independent of the other entities, which minimizes the impact of such changes on related entities, providing advantages over conventional systems where the impact can be greater. For example, a graphics display hardware component can be updated to provide a higher resolution. So long as the hardware component maintains the interface to the UGA firmware, neither the UGA firmware nor the operating system are required to change due to the graphics display hardware change. This provides an advantage over conventional systems where a hardware component upgrade can require patching the operating system with which it operates.

UGA facilitates dispatching I/O service requests for display controller firmware, facilitates reporting, negotiating and configuring display capability ranges for output controllers and devices, facilitates enumerating display controller devices and their children, and facilitates power management of display controller devices and their children. Such services facilitate producing a platform independent graphics display environment, providing advantages over conventional systems.

UGA defines a firmware interface specification for firmware that can be written in a high level language (e.g., C, C#) that can be compiled to be interpreted by a system BIOS and/or operating system virtual machine p-code and/or byte code. The UGA firmware can be located in a display device and/or in a system for an integrated environment.

Turning now to FIG. 1, by employing the present invention, an operating system 100 can interact with abstracted UGA hardware 110 via a UGA firmware 120 stored in a BIOS. Such firmware can be interpreted byte code that was compiled from a higher level language (e.g., C, C#) that executes in an on-board execution environment. The firmware 120 can implement an interface that facilitates non-hardware specific interactions between the operating system 100 and the hardware 110. Such an interface can include abstractions like device_on, device_off, device_accept_data, device_provide_data, and device_report_children. One example interface is described in Appendix A. Such an interface facilitates a flexible approach for operating system to hardware interaction wherein the details of how the hardware will perform certain tasks are restricted to the hardware. This is contrasted with the conventional situation where an operating system 130 interacts with a VGA hardware 140 through a VGA specific, hardware specific, BIOS 150 that implements the standard VGA register interface. The BIOS 150 is conventionally coded in a lower level language (e.g., assembler, machine language).

Figure 2:
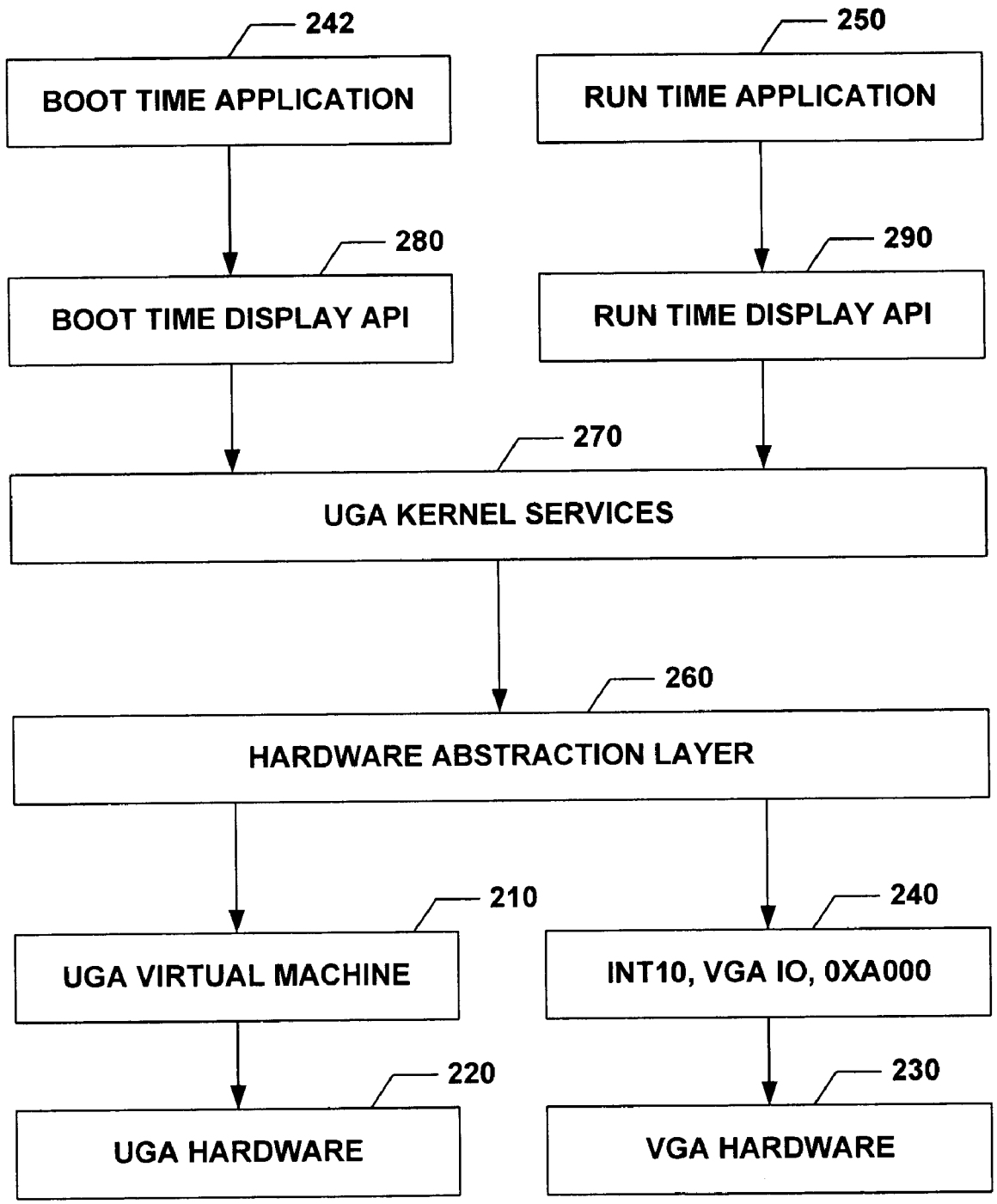
FIG. 2 illustrates a sample architecture of a UGA enabled operating system, in accordance with an aspect of the present invention.

Turning now to FIG. 2, a system 200 that includes a UGA virtual machine 210 that facilitates access via a UGA interface to UGA hardware 220 is illustrated. The UGA virtual machine 210 can be implemented in firmware and stored in a BIOS on a chip associated with the UGA hardware 220. The system 200 illustrates one configuration of computer components wherein legacy compatibility with VGA hardware 230 is maintained. Conventionally, access to VGA hardware 230 has been via an Int 10, VGA I/O register interface 240.

In the system 200, a boot time application 242 and/or a run-time application 250 can consider the system 200 to have only UGA hardware 220 through the interaction of a hardware abstraction layer 260 (HAL) and a UGA kernel services 270. The HAL 260 abstracts the details of video display hardware into an interface. The boot time application 242 calls a boot time display API (Application Programming Interface) 280 to perform actions like displaying messages during POST and/or to display a power on banner (e.g., trademark screen). The run time application 250 calls a run time display API 290 to perform display functions (e.g., display text, display graphics). Although the boot time application 242 and/or run time application 250 may desire to interact with UGA hardware 220, the system 200 may only have VGA hardware 230. Thus, the HAL 260 can implement abstracted methods to work with VGA hardware 230 through the conventional register interface 240. However, when UGA hardware 220 is present, the HAL 260 can implement the abstracted methods to work through the UGA virtual machine 210 to interact with the UGA hardware 220.

Figure 3:
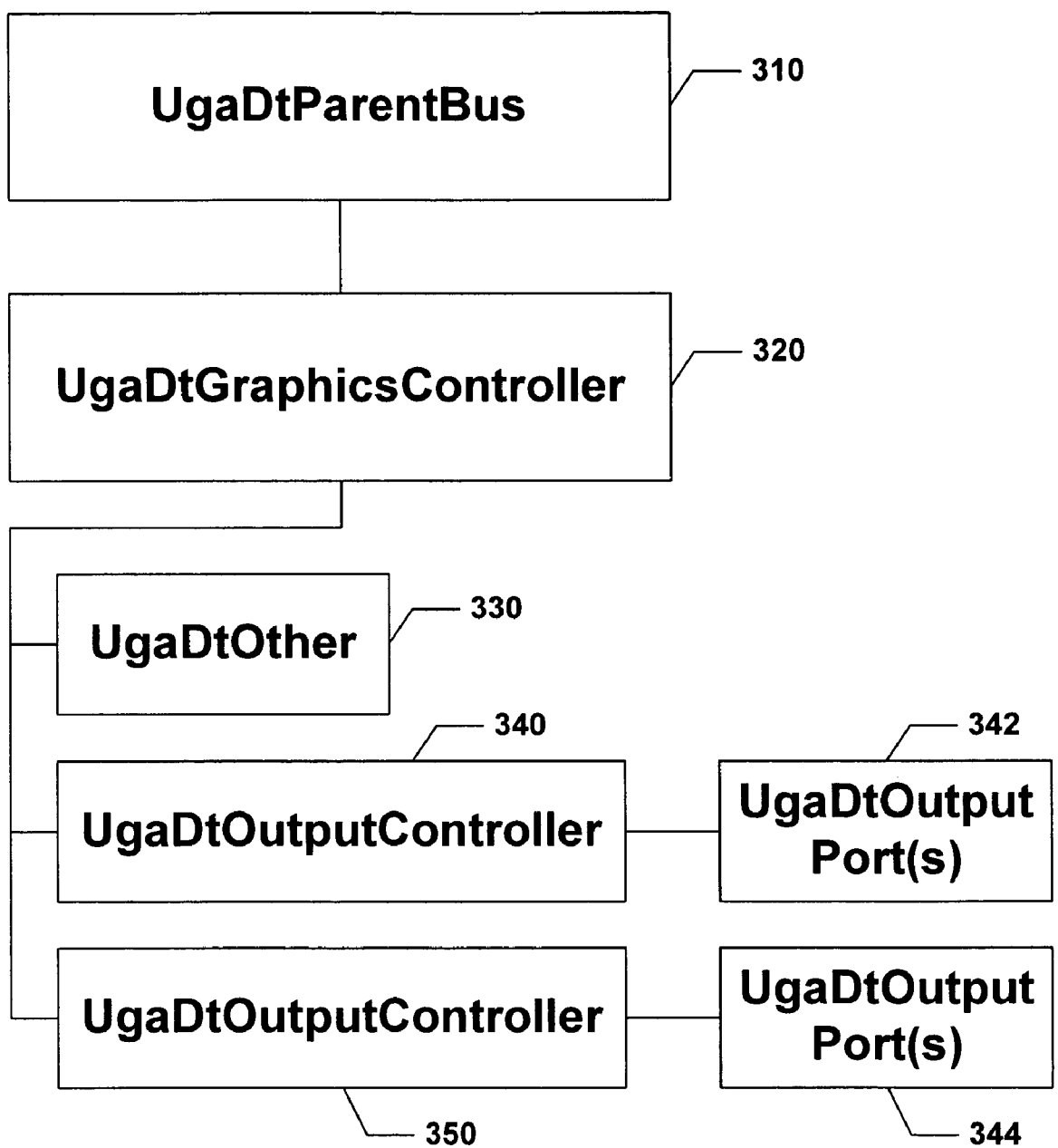
FIG. 3 illustrates a sample UGA device tree for a UGA enabled display adapter, in accordance with an aspect of the present invention.

Turning now to FIG. 3, a hierarchy 300 of computer components associated with UGA are illustrated. The hierarchy 300 includes five sample devices defined in the example UGA firmware specification attached as appendix A that facilitate communicating through devices to attached devices. At the top of the hierarchy 300 is a parent device 310 (e.g., UgaDtParentBus). An operating system can interact with the parent device 310, which may be a physical and/or logical device, through the UGA firmware interface. Two pieces of information are employed to communicate with a device, a device identifier (e.g., with which device do you wish to communicate) and a request type (e.g., what would you like the device to do). In one example of the present invention, what the user would like the device to do is referred to as a service. A UGA firmware interface can define a set of services for devices to perform. Such services can include, but are not limited to, power management (e.g., turn on, turn off, go to lower power state, go to higher power state), device description (e.g., provide EDID (extended display identification data standard) data), and data communications (e.g., accept data, provide data).

The hierarchy 300 also includes a graphic controller (e.g., UgaDtGraphicsController). Such a controller can perform functions (e.g., services) for the operating system and can also interact with other child computer components (e.g., devices). For example, one or more other devices 330 (e.g., UgaDtOther) can be logically and/or physically connected to the controller device 320. An operating system can communicate through the parent device 310 to the graphics controller 320 and thus to the other device(s) 330. Similarly, an operating system can communicate through the parent device 310 to the graphics controller 320 and thus to an output controller 340 or 350 (e.g., UgaDtOutputController). While one other device 330 and two output controllers 340 and 350 are illustrated, it is to be appreciated that a variety of combinations of such devices can be employed with the present invention. The output controller 340 could be connected with an actual output device (e.g., an output port 342 associated with a monitor) and the output controller 350 could be connected with another actual output device (e.g., an output port 344 associated with a television).

The hierarchy 300, an example of which is defined in the UGA firmware specification attached in Appendix A, thus facilitates operating system communications with actual output devices and physical and/or logical devices residing between the operating system and the actual device. In one example of the present invention, one or more of the computer components identified in the hierarchy 300 can be located on a video graphics adapter card. By way of illustration, a video graphics card could have two output ports, one for a television output and one for a computer monitor output. Such outputs could be operatively connected to output controllers that facilitate performing actions like identifying the capabilities of the output devices and performing power management for the devices. Similarly, the output controllers could be operatively connected to a graphics controller, which is in turn operatively connected to a bus that facilitates connecting the video graphics adapter card to a host system. Conventionally, individually accessing more than one physical and/or logical entity on a video graphics card via the VGA register interface was impractical, if possible at all. Thus, the UGA firmware interface provides advantages over conventional systems with respect to accessing multiple physical and/or logical devices located on one physical device.

Figure 4:
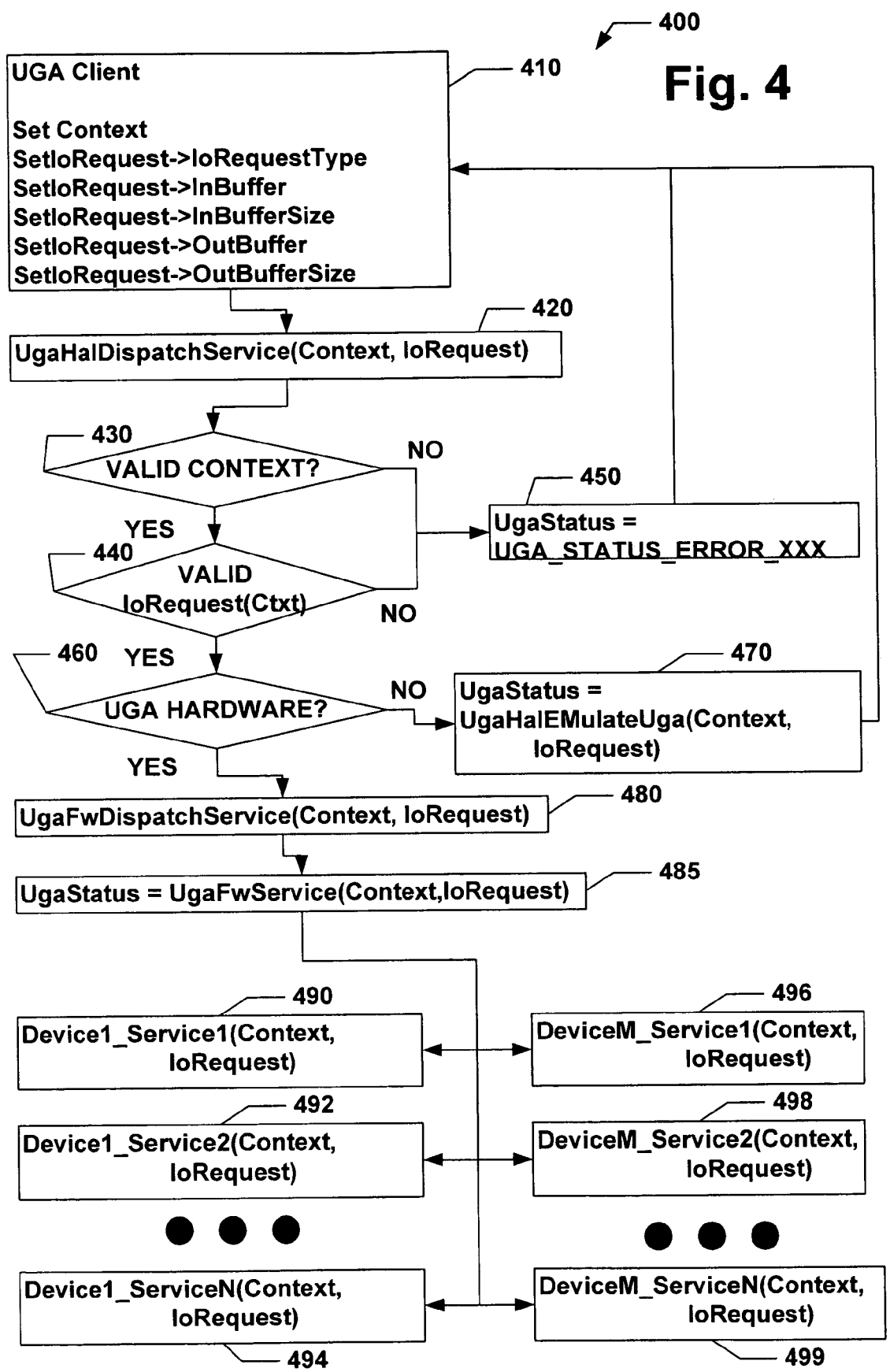
FIG. 4 is a flow chart that illustrates UGA I/O service request dispatching, in accordance with an aspect of the present invention.
Figure 5:
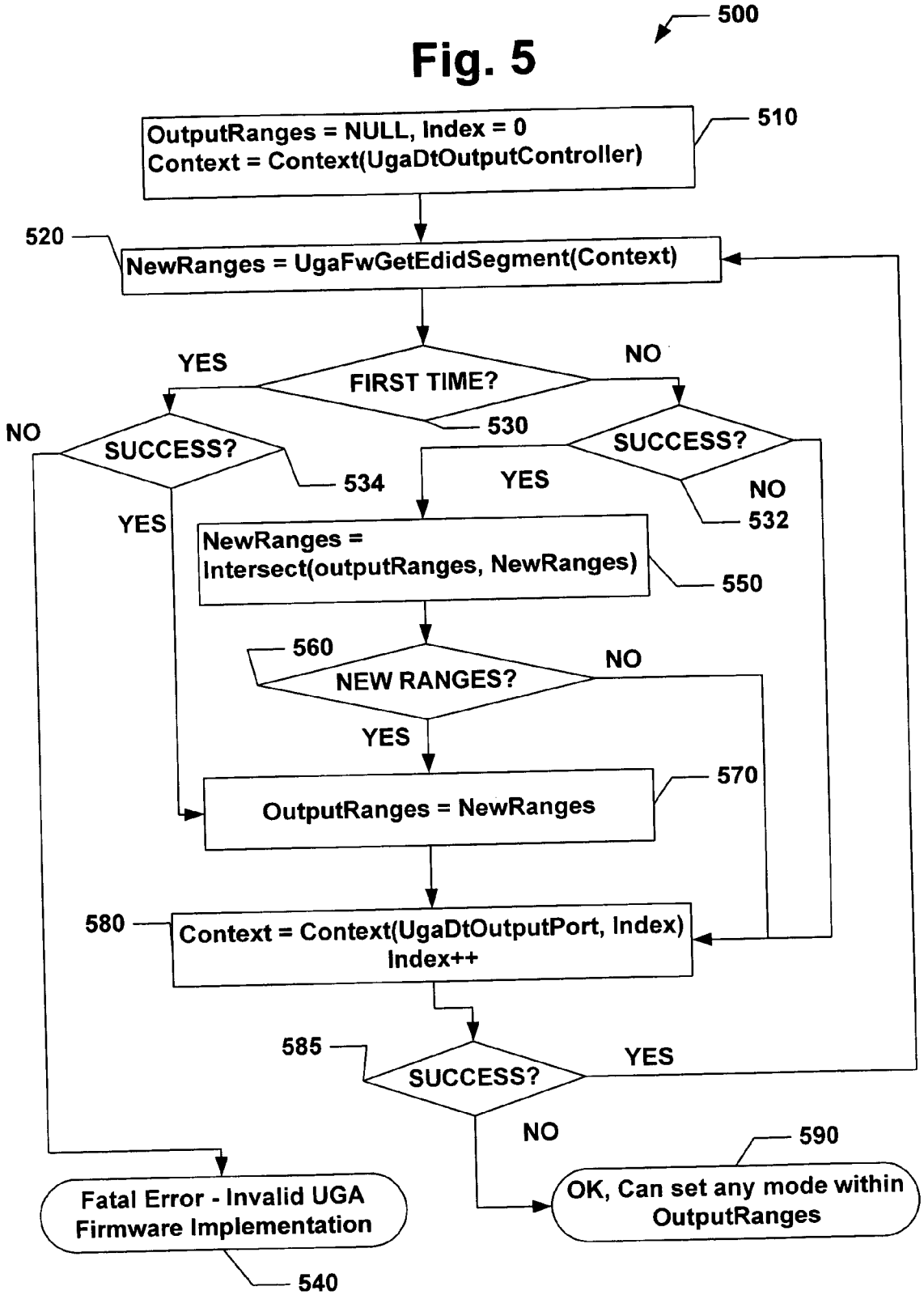
FIG. 5 is a flow chart that illustrates UGA output range negotiating, in accordance with an aspect of the present invention.
Figure 6:
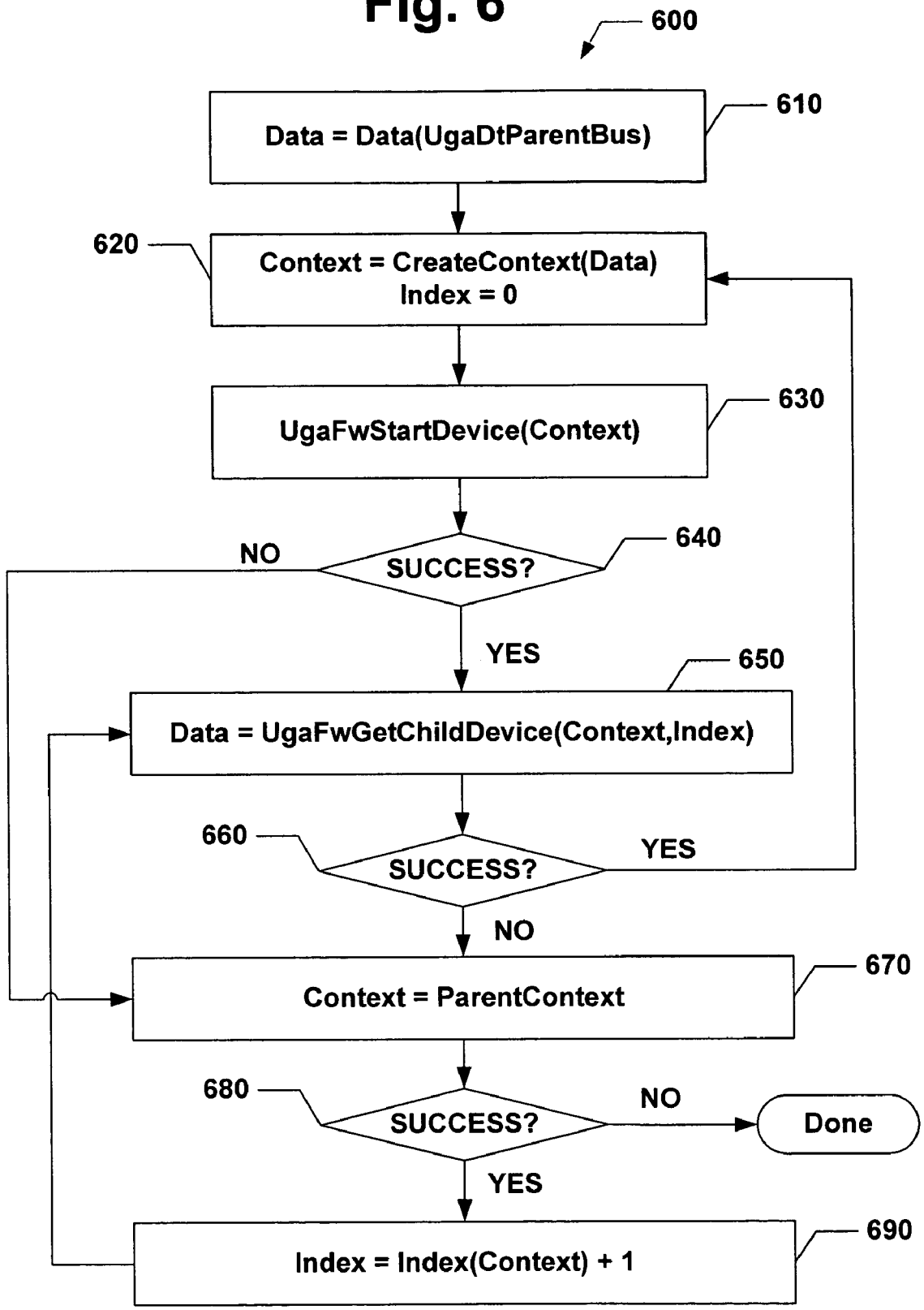
FIG. 6 is a flow chart that illustrates UGA device enumerating, in accordance with an aspect of the present invention.

In view of the exemplary systems shown and described above, methodologies that are implemented in accordance with the present invention will be better appreciated with reference to the flow diagrams of FIGS. 4 through 6. While for purposes of simplicity of explanation, the illustrated methodologies are shown and described as a series of blocks, it is to be understood and appreciated that the present invention is not limited by the order of the blocks, as some blocks can, in accordance with the present invention, occur in different orders and/or concurrently with other blocks from that shown and described herein. Moreover, not all illustrated blocks may be required to implement a methodology in accordance with the present invention. Furthermore, additional and/or alternative methodologies can employ additional blocks, not illustrated herein. In one example of the present invention, such methodologies can be implemented as computer executable instructions and/or operations, which instructions and/or operations can be stored on computer readable media including, but not limited to an ASIC, a CD, a DVD, a RAM, a ROM, a PROM, an EEPROM, a disk, a carrier wave, and a memory stick.

Turning now to FIG. 4, a method 400 for I/O service request dispatching is flow-charted. At 410, a UGA client establishes a context that includes establishing information like, a device identity, a location and size of an input buffer, a location and size of an output buffer, and a request type. At 420, a method (e.g., UgaHalDispatchService (Context, IoRequest) is called to begin dispatching the abstracted service through the layers of the UGA firmware interface. At 430, a determination is made concerning whether the context established at 410 is valid and at 440 a determination is made concerning whether the requested I/O action is valid. If the determination at either 430 or 440 is NO, then processing proceeds to 450 where a status code is generated. But if the determinations 430 and 440 are YES, then processing proceeds to 460.

At 460, a determination is made concerning whether there is UGA hardware available for the abstracted UGA service that has been requested. If the determination at 460 is NO, then there is no UGA hardware, and the abstracted UGA calls can be processed by emulation to interact with the VGA hardware that is available. But if the determination at 460 is YES, then at 470 the service is dispatched to the next lowest level in the UGA firmware interface. Similarly, at 480, the service is dispatched to the next lowest level until, at 490 through 499, the actual service routine is invoked. The service routines 490, and 492 through 494 represent a set of services for a first UGA device. The service routines 496, and 498 through 499 represent a set of services for a second UGA device. UGA devices implement a set of abstracted UGA services. Thus, UGA devices can appear like an abstracted hardware that implements an interface to a UGA client, which simplifies operating system to hardware communications and control. This abstraction contrasts directly with the conventional VGA register interface, where the operating system has to be aware of and implement the register interface for communications with VGA hardware.

Thus, to invoke a UGA firmware method, a UGA client can call an entry point (e.g., UgaFwDispatchService) that is exported from UGA firmware supplying UGA device specific context and UGA I/O request blocks. The UGA device context is employed by the UGA firmware to identify a UGA device for which the I/O request is intended. The UGA client provides a memory storage for a UGA device context, a UGA I/O request block and input and output buffers associated with the UGA I/O request block. The UGA client populates a UGA I/O request block request code, and the location(s) and size(s) of input and/or output buffers. Upon successful completion of an I/O request, UGA firmware places the number of returned bytes into an I/O request block and can, based on UGA I/O request code and device context, fill the output buffer with the requested data. UGA firmware can return a status code indicating the status (e.g., success/failure) of the I/O request for each UGA I/O request.

A UGA firmware runtime environment (e.g., system firmware, operating system) can implement a UGA Hardware Abstraction Layer (UGA HAL) to facilitate a common interface to UGA and non-UGA (e.g., VGA) display devices. Thus, a firmware client can assume that UGA firmware is available and for non-UGA devices, the UGA HAL facilitates translating UGA I/O requests from the UGA client and non-UGA (e.g., VGA, firewire, network) output device. Furthermore, firmware that is UGA specification compliant can be implemented for display controller devices that are not local. Remote display devices appear as a local display device to the UGA client, including the UGA HAL.

Turning now to FIG. 5, a method 500 for negotiating output ranges is flow-charted. Output ranges are associated with what a display device can do. For example, a first display device may be able to display 640 by 480 @ 60 Hz while a second display device may be able to display 1280 by 1024 @ 80 Hz. If both display devices are associated with the same graphics controller, then the present invention can be employed to ascertain the intersection between the performance capabilities of the devices.

At 510, initial values are established. Such initial values can include, but are not limited to, establishing an index to the set of available devices and establishing a context for the output controller. At 520, information concerning the capabilities of a device are read. For example, a UgaFwGetEdidSegment(context) call can be made to retrieve EDID data (e.g., 128 byte, 256 byte) descriptions of the capabilities of a device. Such EDID data can contain discrete values (e.g., for a device with one capability) and/or a range of values (e.g., for multi-capability devices). A determination at 530 is made concerning whether this is the first device read. If so, then a determination is made at 534 concerning whether the data read succeeded. If not, then a fatal error has occurred and processing proceeds to 540. But if the read succeeded, then at 570, the currently determined output ranges are established as the initial ranges read at 520. If this was not the first read, then a determination is made at 532 concerning whether the read succeeded. If the read did not succeed, then processing continues at 580, where the next potential device is identified and a context is established to facilitate reading description data from that next device. If the read did succeed, then processing continues at 550 where an intersection between previously determined ranges and the currently read range is performed. At 560, a determination is made concerning whether the intersection computation has determined a new range. If so, then at 570, the determined intersection ranges are updated and processing proceeds to 580.

At 585, a determination is made concerning whether there is another device from which descriptive data is to be read. If the determination is YES, then processing proceeds to 520 where such descriptive data is read. If the determination is NO, then processing concludes and video modes that lie within the determined output ranges can safely be employed.

Thus, system firmware and/or an operating system intersect display capabilities data returned for output controllers and output ports attached to the controllers. The intersections define video mode ranges that are supported by connected devices. Thus, a mode identified in the intersection can be set on an output controller and can be displayed on the output device attached to the output port attached to the output controller.

Based, at least in part, on the EDID data returned for output ports and/or controllers, supported, intersected video mode ranges may contain discreet or contiguous sets of available modes. Thus, system firmware and/or an operating system can request a mode from the intersected ranges. Then the system firmware and/or operating system can invoke a UGA firmware video setting method (e.g., UgaFwSetVideoMode) on an output controller specifying device context, I/O request type and requested mode data (e.g., horizontal resolution, vertical resolution, color depth, refresh rate) and based on such information the UGA firmware can dispatch an I/O handler method for the I/O request and the UGA child device. The UGA firmware can employ, for example, a table driven algorithm that analyzes discrete mode ranges and/or a timing formula (e.g., VESA GTF) for contiguous and/or discreet mode ranges to program UGA hardware to set a requested mode.

FIG. 6 illustrates a flow chart for a device enumeration method 600. At 610, a recursive enumeration method begins by acquiring data associated with an initial device (e.g., UgaDtParentBus). Given the initial data, at 620, a context can be created to facilitate interacting with the device. Thus, at 630, the context is employed to start the initial device via, for example, a UgaFwStartDevice call. At 640, a determination is made concerning whether the device could be started. If not, then the context is set to the parent context at 670. If the device could be started, then processing proceeds to 650 where an attempt to acquire data associated with a child device associated with the current device is made. For example, a UgaFwGetChildDevice call can be made to retrieve the child data. At 660, a determination is made concerning whether child data was acquired. If the determination at 660 was NO, then, processing proceeds to 670 where the context is set to be the context of the parent device. But if the determination at 660 was YES, then processing returns to 620 where a context is created for the child device and the depth first traversal continues to search for children of this child device.

At 680, a determination is made concerning whether there was a valid parent context. If not, then the depth first traversal has completed. If so, then processing proceeds to 690 where the next iteration of the recursive enumeration is begun.

Such a recursive enumeration method facilitates UGA firmware supporting a variety of devices. A UGA firmware specification can define a set of I/O services that are implemented in UGA firmware for enumerated UGA devices. Service types are associated with UGA I/O request codes and such I/O request codes can be added to a UGA firmware specification. The UGA firmware I/O model is designed to facilitate new I/O request codes and/or new device types being added to a UGA firmware specification while preserving compatibility between UGA clients, UGA runtime environments and UGA firmware.

By employing a recursive enumeration method, UGA firmware supports one or more video child devices that include, but are not limited to, a parent bus, a graphics controller, an output controller, an output port and other device types. For enumerated UGA devices, the UGA firmware can provide an additional device descriptor data that can be interpreted by a system BIOS and IHV video driver, a standardized PnP identifier to support generic child device driver support and a device description string. UGA devices can be associated with a unique context or a shared context can be shared by UGA devices associated with a single UGA adapter.

To enumerate UGA devices, system firmware and/or an operating system traverse a UGA device tree using, for example, a depth first traversal algorithm. UGA firmware method calls (e.g., UgaFwStartDevice, UgaFwGetChildDevice) can be invoked for the devices. In one example of the present invention, a device context creation method and a start method for a parent device are executed before child devices are enumerated and/or started.

The system BIOS and/or operating system pass device context and I/O request types to UGA firmware which, based on the information, can dispatch an I/O handler method for the I/O request and UGA child device. By employing a recursive enumeration method, UGA firmware can support one or more output controllers and/or output ports. Such enumerated ports can be attached to a physical output device (e.g., CRTC monitor, flat panel, television). For enumerated output ports, the system firmware and/or operating system invokes a data acquisition method, (e.g., UgaFwGetEdidSegment) specifying a device context and I/O request type. Based on such information, the UGA firmware dispatches an I/O handler method for the I/O request and the UGA child device. The UGA firmware then returns display identification and configuration data for the output device attached to the output port. Such information can be returned, for example, in the EDID format defined in the VESA (Video Electronics Standards Association), standard. The UGA firmware reads the EDID information from the output device by, for example, DDC (display data channel standard), and/or an implementation specific communication channel. The UGA firmware can, if the EDID data cannot be obtained from the output device, create an EDID.

If the UGA firmware does not implement, or fails while employing a data acquisition method (e.g., UgaFwGetEdidSegment) for an output port device, then the UGA firmware implements a set of device channel I/O routines (e.g., UgaFwDeviceChannelOpen, UgaFwDeviceChannelRead, UgaFwDeviceChannelWrite, UgaFwDeviceChannelClose), which enable system firmware and/or an operating system to communicate directly with output devices over DDC or other implementation specific communication channels.

Similar to processing for output ports, for enumerated output controllers the system firmware and/or operating system invokes a data acquisition method, (e.g., UgaFwGetEdidSegment) specifying a device context and I/O request type. Based on such information, the UGA firmware dispatches an I/O handler method for the I/O request and the UGA child device. The UGA firmware then returns display identification and configuration data for the output controller. Such information can be returned, for example, in the VESA EDID format. EDID data for output controller devices is provided by UGA firmware based on the hardware capabilities of the UGA display adapter. In one example of the present invention, the data acquisition method must be implemented in the UGA firmware for output controller devices.

Concerning power management facilitated by the present invention, a top-down tree traversal can be employed for power up and a bottom-up tree traversal can be employed for power down. For devices, UGA firmware methods (e.g., UgaFwSetPowerState) can be invoked to probe a power state and cause power changes. Such methods can be vetoed, in which case power state setting methods previously invoked can be cancelled. The system firmware and/or operating system can pass device context, I/O request types, power request types, requested device states, and requested power states to UGA firmware. Thus, UGA devices can support multiple power states and UGA firmware can dispatch I/O handler methods for I/O requests and child devices related to such power state management.

One example of the present invention implements UGA as an EFI (Extensible Firmware Interface) driver. Thus, an EFI-UGA Binding Protocol is attached hereto as Appendix B which is considered part of this patent application specification.

Figure 7:
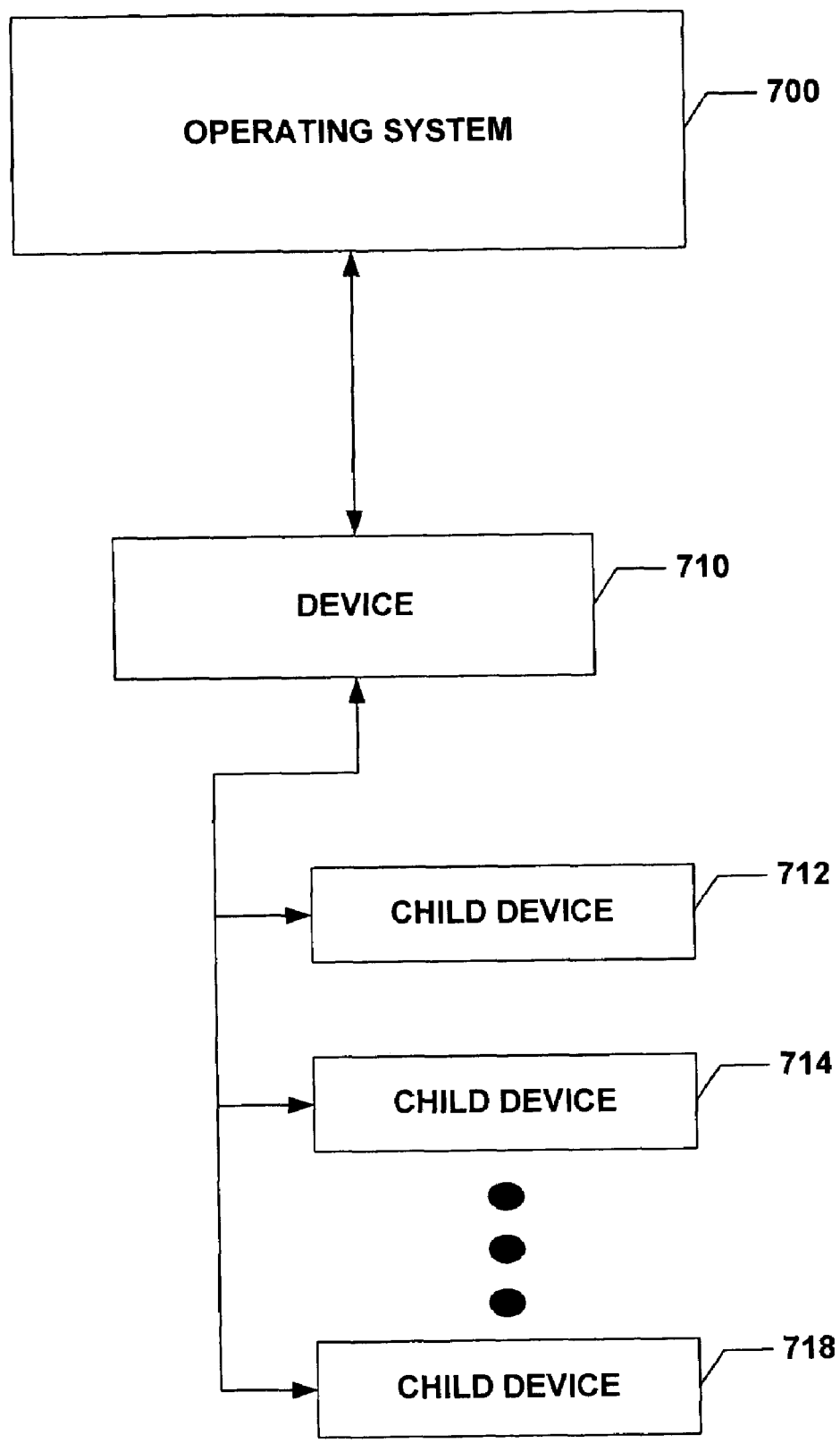
FIG. 7 illustrates a display device with child devices that can interact with the UGA firmware, in accordance with an aspect of the present invention.

FIG. 7 illustrates an operating system 700 interacting with a display device 710 and with its child devices 712 through 718. Conventionally, a VGA system could not interact with such child devices 712 through 718. UGA facilitates enumerating such child devices 712 through 718 through the UGA firmware interface and if the child devices 712 through 718 expose the UGA firmware interface, the operating system 700 can interact with them. Thus, one example of the UGA firmware can support a number of child devices of a variety of types and provide methods for enumerating such child devices, performing power management for such child devices, querying and controlling state for such child devices, setting display modes for such child devices and facilitating fundamental drawing operations.

Figure 8:
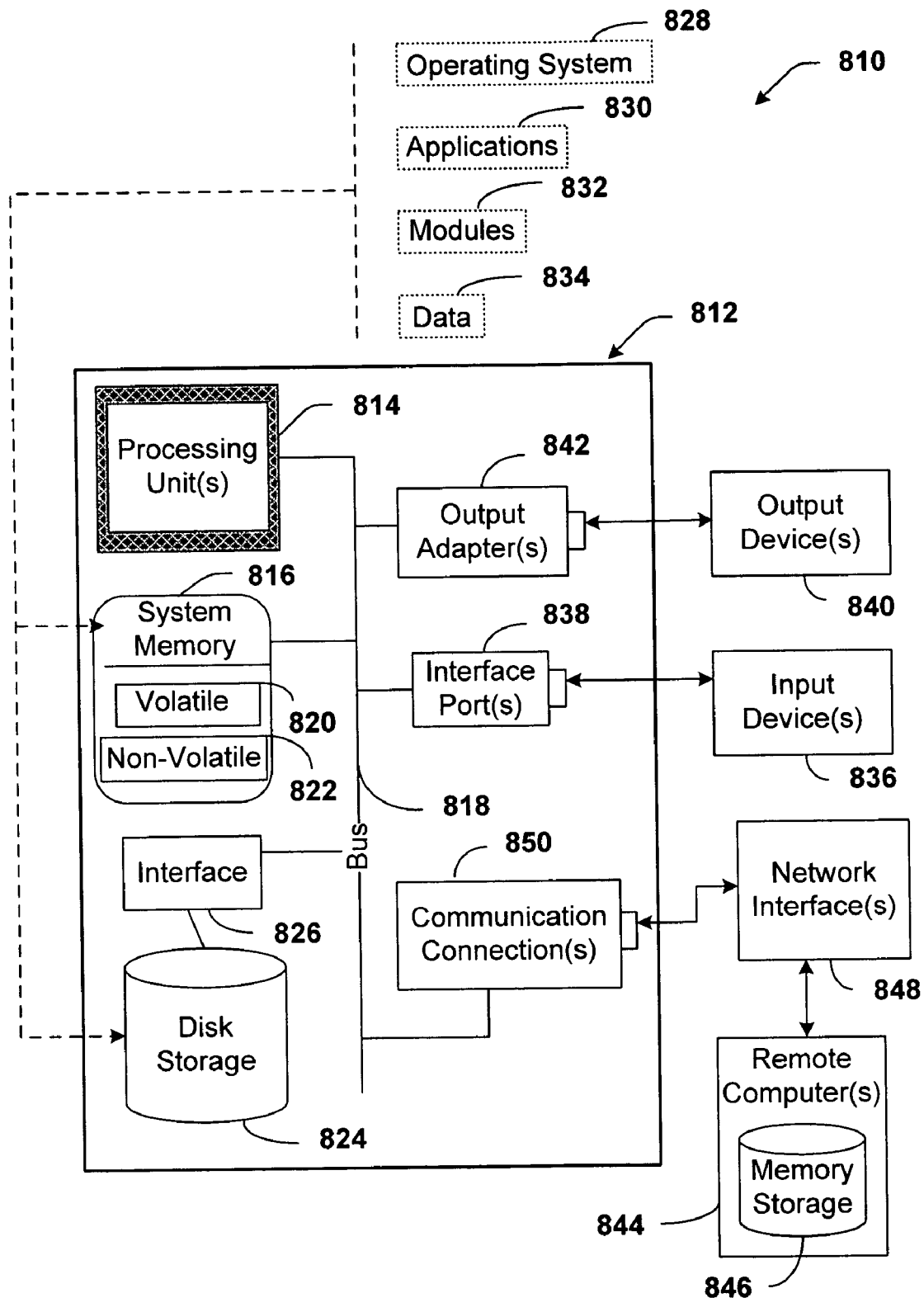
FIG. 8 is a schematic block diagram of an example computing environment in which the present invention may operate, in accordance with an aspect of the present invention.

In order to provide additional context for various aspects of the present invention, FIG. 8 and the following discussion are intended to provide a brief, general description of a suitable computing environment 810 in which the various aspects of the present invention may be implemented. While the invention has been described above in the general context of computer-executable components, instructions and/or operations that may run on one or more computers, those skilled in the art will recognize that the invention also may be implemented in combination with other program modules and/or as a combination of hardware and software. Generally, program modules include routines, programs, components, data structures, etc. that perform particular tasks or implement particular abstract data types. Moreover, those skilled in the art will appreciate that the inventive methods may be practiced with computer system configurations, including single-processor or multiprocessor computer systems, minicomputers, mainframe computers, personal computers, hand-held computing devices, microprocessor-based or programmable consumer electronics, and the like, each of which may be operatively coupled to one or more associated devices. The illustrated aspects of the invention may also be practiced in distributed computing environments where certain tasks are performed by remote processing devices that are linked through a communications network. In a distributed computing environment, program modules may be located in both local and remote memory storage devices.

With reference to FIG. 8, an exemplary environment 810 for implementing various aspects of the invention includes a computer 812, the computer 812 including a processing unit 814, a system memory 816 and a system bus 818. The system bus 818 couples system components including, but not limited to the system memory 816 to the processing unit 814. The processing unit 814 may be any of various processors. Dual microprocessors and other multi-processor architectures also can be employed as the processing unit 814.

The system bus 818 can be any of several types of bus structure including a memory bus or memory controller, a peripheral bus and a local bus using any of a variety of bus architectures. The system memory 822 includes read only memory (ROM) 820 and random access memory (RAM) 822. A basic input/output system (BIOS), containing the basic routines that help to transfer information between elements within the computer 812, such as during start-up, is stored in ROM 820. The BIOS can include, for example, the UGA firmware.

The computer 812 further includes a hard disk drive 824, a magnetic disk drive 826, (e.g., to read from or write to a removable disk 828) and an optical disk drive 830, (e.g., for reading a CD-ROM disk 832 or to read from or write to other optical media). The hard disk drive 824, magnetic disk drive 826 and optical disk drive 830 can be connected to the system bus 818 by a hard disk drive interface 834, a magnetic disk drive interface 836 and an optical drive interface 838, respectively. The drives and their associated computer-readable media provide nonvolatile storage of data, data structures, computer components, computer-executable instructions, etc. for the computer 812. Although the description of computer-readable media above refers to a hard disk, a removable magnetic disk and a CD, it should be appreciated that other types of media that are readable by a computer, such as zip drives, magnetic cassettes, flash memory cards, digital video disks, cartridges, ASICs, and the like, may also be used in the exemplary operating environment, and further that any such media may contain computer-executable instructions for performing the methods of the present invention.

A number of program modules can be stored in the drives and RAM 822, including an operating system 840, one or more application programs 842, other program modules 844 and program data 846. It is to be appreciated that the present invention can be implemented with various operating systems or combinations of operating systems.

A user can enter commands and information into the computer 812 through a keyboard 848 and a pointing device, such as a mouse 850. Other input devices (not shown) may include a microphone, an IR remote control, a joystick, a game pad, a satellite dish, a scanner, or the like. These and other input devices are often connected to the processing unit 814 through a serial port interface 852 that is coupled to the system bus 818, but may be connected by other interfaces, such as a parallel port, a game port, a universal serial bus ("USB"), an IR (infrared) interface, etc. A monitor 854 or other type of display device is also connected to the system bus 818 via an interface, such as a video adapter 856. In addition to the monitor, a computer typically includes other peripheral output devices (not shown), such as speakers, printers etc.

The computer 812 may operate in a networked environment using logical connections to one or more remote computers, such as a remote computer(s) 858. The remote computer(s) 858 may be a workstation, a server computer, a router, a personal computer, microprocessor based entertainment appliance, a peer device or other common network node, and typically includes many or all of the elements described relative to the computer 812, although, for purposes of brevity, only a memory storage device 860 is illustrated. The logical connections depicted include a local area network (LAN) 862 and a wide area network (WAN) 864. Such networking environments are commonplace in offices, enterprise-wide computer networks, intranets and the Internet.

When used in a LAN environment, the computer 812 is connected to the local network 862 through a network interface or adapter 866. When used in a WAN environment, the computer 812 typically includes a modem 868, or is connected to a communications server on the LAN, or has other means for establishing communications over the WAN 864, such as the Internet. The modem 868, which may be internal or external, is connected to the system bus 818 via the serial port interface 852. In a networked environment, program modules depicted relative to the computer 812, or portions thereof, may be stored in the remote memory storage device 860. It will be appreciated that the network connections shown are exemplary and other means of establishing a communications link between the computers may be used.

Figure 9:
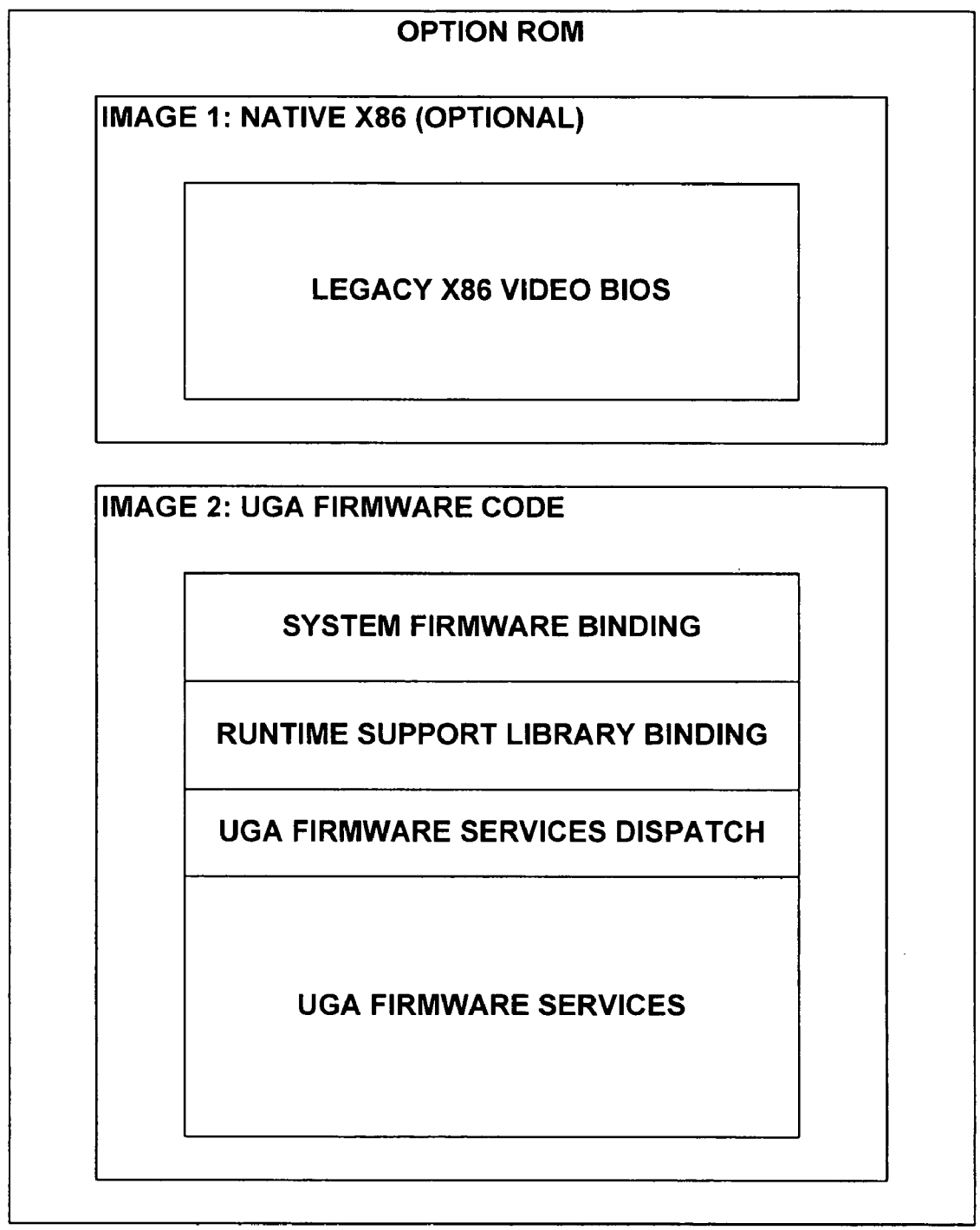
FIG. 9 illustrates a sample option ROM layout of a UGA enabled display adapter, in accordance with an aspect of the present invention.

FIG. 9 illustrates an option ROM in which multiple video adapter images are stored. For example, a first image can support a legacy x86 video BIOS while a second image can support a UGA BIOS. To support the UGA BIOS, the second image can include a firmware specific binding (e.g., EFI to UGA) that facilitates UGA firmware byte code interacting with a runtime environment. The second image can also include a runtime support library binding that facilitates interfacing the system firmware binding and the UGA firmware services dispatch. The UGA firmware services dispatch receive calls intended for a UGA device, identify the device to which a user desires to talk and what service the user desires to have performed. The dispatcher calls the appropriate method in the UGA firmware services. Thus, the ability to store multiple images in an option ROM facilitates concurrent support for legacy systems and UGA systems providing interoperability improvements over conventional systems.

What has been described above includes examples of the present invention. It is of course, not possible to describe every conceivable combination of components or methodologies for purposes of describing the present invention, but one of ordinary skill in the art may recognize that many further combinations and permutations of the present invention are possible. Accordingly, the present invention is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising", as comprising is interpreted as a transitional word in a claim.

APPENDIX A

UGA

Universal Graphics Adapter

Firmware Interface Specification

Part 1

1.1 UGA Interface Naming Convention

UgaFwXxxx—methods exported by UGA firmware to system firmware and operating system and UGA IO request handlers.

VmlXxxx—methods exported by Virtual Machine (VM) to UGA firmware via UGAVMXXX.LIB I/O library. Note: l in the prefix is a lower case L.

Part 2

UGA Firmware Interface

UGA firmware interface is exposed from UGA firmware. The system firmware and UGA HAL driver use this interface to perform basic operations with UGA hardware. This layer replaces legacy video BIOS.

2.1 UGA Firmware Interface—Constants and Data Types
UGA_DATA_WIDTH
UGA_DEVICE_ID
UGA_DEVICE_STATE
UGA_DEVICE_TYPE
UGA_IO_REQUEST_CODE
UGA_MEMORY_CACHING_TYPE
UGA_MEMORY_TRANSFER_TYPE
UGA_PHYSICAL_ADDRESS
UGA_POWER_REQUEST_TYPE
UGA_POWER_STATE_DEVICE
UGA_POWER_STATE_SYSTEM
UGA_STATUS
UGA_VERSION_NUMBER

UGA_DATA_WIDTH

```
typedef enum _UGA_DATA_WIDTH
{
    UgaDwInt8 = 1,
    UgaDwInt16,
    UgaDwInt32,
    UgaDwInt64
} UGA_DATA_WIDTH, *PUGA_DATA_WIDTH;
```

UGA_DEVICE_ID typedef UINT32 UGA_DEVICE_ID, *PUGA_DEVICE_ID;

UGA_DEVICE_PROPERTY

```
typedef enum _UGA_DEVICE_PROPERTY
{
    UgaDpType = 1,
    UgaDpId,
    UgaDpAcpiId,
    UgaDpPnpId,
    UgaDpDescription,
    UgaDpManufacturer,
    UgaDpPrivateData = 0x10000
} UGA_DEVICE_PROPERTY, *PUGA_DEVICE_PROPERTY;
```

UgaDpPrivateData and higher property IDs are reserved for IHV specific properties only.

UGA_DEVICE_STATE

```
typedef enum _UGA_DEVICE_STATE
{
    IN UgaDsEnable = 1,
    IN UgaDsDisable,
    OUT UgaDsNotAvailable,
    OUT UgaDsDisabled,
    OUT UgaDsEnabled,
    OUT UgaDsActive
} UGA_DEVICE_STATE, *PUGA_DEVICE_STATE;
```

UGA_DEVICE_TYPE

```
typedef enum _UGA_DEVICE_TYPE
{
    UgaDtParentBus = 1,
    UgaDtGraphicsController,
    UgaDtOutputController,
    UgaDtOutputPort,
    UgaDtOther
} UGA_DEVICE_TYPE, *PUGA_DEVICE_TYPE;
```

UGA_IO_REQUEST_CODE

```
typedef enum _UGA_IO_REQUEST_CODE
{
    UgaIoGetVersion = 1,
    UgaIoGetChildDevice,
    UgaIoStartDevice,
    UgaIoStopDevice,
    UgaIoFlushDevice,
    UgaIoResetDevice,
    UgaIoGetDeviceState,
    UgaIoSetDeviceState,
    UgaIoSetPowerState,
    UgaIoGetMemoryConfiguration,
    UgaIoSetVideoMode,
    UgaIoCopyRectangle,
    UgaIoGetEdidSegment,
    UgaIoDeviceChannelOpen,
    UgaIoDeviceChannelClose,
    UgaIoDeviceChannelRead,
    UgaIoDeviceChannelWrite,
    UgaIoGetPersistentDataSize,
    UgaIoGetPersistentData,
    UgaIoSetPersistentData,
    UgaIoGetDevicePropertySize,
    UgaIoGetDeviceProperty,
    UgaIoBtPrivateInterface
} UGA_IO_REQUEST_CODE, *PUGA_IO_REQUEST_CODE;
```

UGA_MEMORY_CACHING_TYPE

```
typedef enum _UGA_MEMORY_CACHING_TYPE
{
    UgaMcNonCached = 1,
    UgaMcCached,
    UgaMcWriteCombined
} UGA_MEMORY_CACHING_TYPE,
*PUGA_MEMORY_CACHING_TYPE;
```

UGA_MEMORY_TRANSFER_TYPE

```
typedef enum _UGA_MEMORY_TRANSFER_TYPE
{
    UgaMtSystemToVideo = 1,
    UgaMtVideoToSystem,
    UgaMtVideoToVideo
} UGA_MEMORY_TRANSFER_TYPE,
*PUGA_MEMORY_TRANSFER_TYPE;
```

UGA_PHYSICAL_ADDRESS typedef UINT64 UGA_PHYSICAL_ADDRESS, *PUGA_PHYSICAL_ADDRESS;

UGA_POWER_REQUEST_TYPE

```
typedef enum _UGA_POWER_REQUEST_TYPE
{
    UgaPrProbe = 1,
    UgaPrCommit,
    UgaPrCancel
} UGA_POWER_REQUEST_TYPE,
*PUGA_POWER_REQUEST_TYPE;
```

UGA_POWER_STATE_DEVICE

```
typedef enum _UGA_POWER_STATE_DEVICE
{
    UgaPsD0 = 1,
    UgaPsD1,
    UgaPsD2,
    UgaPsD3
} UGA_POWER_STATE_DEVICE,
*PUGA_POWER_STATE_DEVICE;
```

UGA_POWER_STATE_SYSTEM

```
typedef enum _UGA_POWER_STATE_SYSTEM
{
    UgaPsS0 = 1,
    UgaPsS1,
    UgaPsS2,
    UgaPsS3,
    UgaPsS4,
    UgaPsS5
} UGA_POWER_STATE_SYSTEM,
*PUGA_POWER_STATE_SYSTEM;
```

UGA_STATUS
    typedef UINT32 UGA_STATUS, *PUGA_STATUS;
    UGA_STATUS values are 32 bit values laid out as follows:

| 30-31 | 16-29 | 0-15 |
|---|---|---|
| Severity | Reserved | Status code |

Severity bits are defined as follows:
00—Success
01—Informational
10—Warning
11—Error
    UGA_STATUS values are defined as follows: (TBD)

```
#define UGA_STATUS_SUCCESS            ((UGA_STATUS)0x00000000)
#define UGA_STATUS_INFORMATIONAL      ((UGA_STATUS)0x40000000)
#define UGA_STATUS_WARNING            ((UGA_STATUS)0x80000000)
#define UGA_STATUS_ERROR              ((UGA_STATUS)0xc0000000)
#define UGA_STATUS_INVALID_DEVICE     ((UGA_STATUS)(UGA_STATUS_ERROR | 0x00000001))
#define UGA_STATUS_INVALID_MODE       ((UGA_STATUS)(UGA_STATUS_ERROR | 0x00000002))
#define UGA_STATUS_INVALID_FUNCTION   ((UGA_STATUS)(UGA_STATUS_ERROR | 0x00000003))
#define UGA_STATUS_UNSUPPORTED        ((UGA_STATUS)(UGA_STATUS_ERROR | 0x00000004))
#define UGA_STATUS_OPERATION_FAILED   ((UGA_STATUS)(UGA_STATUS_ERROR | 0x00000005))
#define UGA_STATUS_DEVICE_BUSY        ((UGA_STATUS)(UGA_STATUS_ERROR | 0x00000006))
```

-continued

| | |
|---|---|
| #define UGA_STATUS_INSUFFICIENT_BUFFER | ((UGA_STATUS)(UGA_STATUS_ERROR \| 0x00000007)) |
| #define UGA_STATUS_NO_MORE_DATA | ((UGA_STATUS)(UGA_STATUS_ERROR \| 0x00000008)) |
| #define UGA_STATUS_TIMEOUT | ((UGA_STATUS)(UGA_STATUS_ERROR \| 0x00000009)) |
| #define UGA_STATUS_INVALID_PARAMETER | ((UGA_STATUS)(UGA_STATUS_ERROR \| 0x0000000a)) |
| #define UGA_STATUS_OUT_OF_RESOURCES | ((UGA_STATUS)(UGA_STATUS_ERROR \| 0x0000000b)) |

UGA_VERSION_NUMBER
typedef UINT32 UGA_VERION_NUMBER, *PUGA_VERSION_NUMBER;
UGA_VERSION_NUMBER values are 32 bit values laid out as follows:

| 16-31 | 8-15 | 0-7 |
|---|---|---|
| Reserved | Version major | Version minor |

2.2 UGA Firmware Interface—Data Structures
UGA_CHANNEL_TRANSFER
UGA_DEVICE
UGA_DEVICE_DATA
UGA_IO_REQUEST
UGA_MEMORY_CONFIGURATION
UGA_MEMORY_TRANSFER
UGA_POWER_REQUEST
UGA_VERSION
UGA_VIDEO_MODE
UGA_VM_VERSION

UGA_CHANNEL_TRANSFER

```
typedef struct _UGA_CHANNEL_TRANSFER
{
    VOID UNALIGNED *pvBuffer;
    UINT64 ui64Size;
    BOOLEAN bEndOfTransfer;
} UGA_CHANNEL_TRANSFER, *PUGA_CHANNEL_TRANSFER;
```

UGA_CHANNEL_TRANSFER contains information required by the UGA firmware to perform data transfers between open device channel and memory buffer.

Members
pvBuffer
  Virtual pointer to the source or destination memory buffer for data send to or received from open device channel.
ui64Size
  Size in bytes of the requested data transfer.
bEndOfTransfer
  Specifies if UGA firmware should expect additional channel transfer request in the same direction to follow. FALSE indicates additional transfers are still pending, TRUE indicates last transfer in a batch.

UGA_DEVICE

```
typedef struct _UGA_DEVICE
{
    PVOID pvDeviceContext;
    PVOID pvSharedContext;
    PVOID pvRunTimeContext;
    struct _UGA_DEVICE *pParentDevice;
    PVOID pvBusIoServices;
    PVOID pvStdIoServices;
    UGA_DEVICE_DATA deviceData;
} UGA_DEVICE, *PUGA_DEVICE;
```

UGA_DEVICE specifies a device object associated with a device enumerated by UgaFwGetChildDevice. System firmware/operating system allocates UGA_DEVICE for each enumerated device. A pointer to this object is passed to UGA firmware methods. This is an opaque object—UGA firmware cannot dereference any of its fields directly—its layout may change without notice.

UGA_DEVICE_DATA

```
typedef struct _UGA_DEVICE_DATA
{
    UGA_DEVICE_TYPE deviceType;
    UGA_DEVICE_ID deviceId;
    UINT32 ui32DeviceContextSize;
    UINT32 ui32SharedContextSize;
} UGA_DEVICE_DATA, *PUGA_DEVICE_DATA;
```

UGA_DEVICE_DATA specifies a device data returned by UgaFwGetChildDevice method.

Members
  deviceType
    Specifies the type of device.
  deviceId
    Video IHV defined device Id.
  ui32DeviceContextSize
    Requested size in bytes of the context buffer allocated for enumerated UGA device. This buffer will be allocated by the system firmware/operating system. UGA firmware can use this buffer to store any runtime device specific information.
  ui32SharedContextSize
    Requested size in bytes of the shared context buffer allocated for the UGA adapter. This buffer will be allocated by the system firmware/operating system. UGA firmware can use this buffer to store any runtime device specific information.

UGA_IO_REQUEST

```
typedef struct _UGA_IO_REQUEST
{
    IN UGA_IO_REQUEST_CODE ioRequestCode;
    IN PVOID pvInBuffer;
    IN UINT64 ui64InBufferSize;
    OUT PVOID pvOutBuffer;
    IN UINT64 ui64OutBufferSize;
```

-continued

```
        OUT UINT64 ui64BytesReturned;
} UGA_IO_REQUEST, *PUGA_IO_REQUEST;
```

UGA_MEMORY_CONFIGURATION

```
typedef struct _UGA_MEMORY_CONFIGURATION
{
    UINT64 ui64VideoMemorySize;
    UINT64 ui64PrimaryOffset;
    UINT32 ui32PrimaryDelta;
    UINT64 ui64OffScreenOffset;
    UINT64 ui64OffScreenSize;
    UINT32 ui32OffScreenAlignment;
} UGA_MEMORY_CONFIGURATION,
 *PUGA_MEMORY_CONFIGURATION;
```

UGA_MEMORY_TRANSFER

```
typedef struct _UGA_MEMORY_TRANSFER
{
    UGA_MEMORY_TRANSFER_TYPE transferType;
    union
    {
        struct
        {
            UINT64 ui64Source;
            UINT64 ui64Destination;
        } videoToVideo;
        struct
        {
            VOID UNALIGNED *pvSource;
            UINT64 ui64Destination;
        } systemToVideo;
        struct
        {
            UINT64 ui64Source;
            VOID UNALIGNED *pvDestination;
        } videoToSystem;
    };
    INT32 i32Width;
    INT32 i32Height;
    INT32 i32SourceDelta;
    INT32 i32DestinationDelta;
    BOOLEAN bEndOfTransfer;
} UGA_MEMORY_TRANSFER, *PUGA_MEMORY_TRANSFER;
```

UGA_MEMORY_TRANSFER contains information required by the UGA firmware to perform memory data transfers.

Members
  transferType
    Specifies the type of the transfer: UgaMtSystemToVideo, UgaMtVideoToSystem, or UgaMtVideoToVideo.
  pvSource
    Virtual pointer to the transfer source located in system memory.
  pvDestination
    Virtual pointer to the transfer destination located in system memory.
  ui64Source
    Offset from the beginning of the frame buffer of the transfer source located in video memory.
  ui64Destination
    Offset from the beginning of the frame buffer of the transfer destination located in video memory.
  i32Width
    Width of the transfer region in bytes.
  i32Height
    Height of the transfer region in lines.
  i32SourceDelta
    Number of bytes between starting points of two adjacent lines of the source transfer region.
  i32DestinationDelta
    Number of bytes between starting points of two adjacent lines of the destination transfer region.
  bEndOfTransfer
    Specifies if UGA firmware should expect additional calls to UgaFwCopyRectangle to follow. FALSE indicates pending additional transfers, TRUE indicates last transfer in a batch. UGA firmware can interpret value of TRUE as a hint to flush pixel cache lines if required.

UGA_POWER_REQUEST

```
typedef struct _UGA_POWER_REQUEST
{
    UGA_POWER_REQUEST_TYPE powerRequestType;
    UGA_POWER_STATE_DEVICE powerStateDevice;
    UGA_POWER_STATE_SYSTEM powerStateSystem;
} UGA_POWER_REQUEST, *PUGA_POWER_REQUEST;
```

UGA_VERSION

```
typedef struct _UGA_VERSION
{
    UGA_VERSION_NUMBER vmUgaSpecificationVersion;
    UGA_VERSION_NUMBER vmVirtualMachineVersion;
    UGA_VERSION_NUMBER fwUgaSpecificationVersion;
    UGA_VERSION_NUMBER fwFirmwareVersion;
} UGA_VERSION, *PUGA_VERSION;
```

UGA_VIDEO_MODE

```
typedef struct _UGA_VIDEO_MODE
{
    UINT32 ui32HorizontalResolution;
    UINT32 ui32VerticalResolution;
    UINT32 ui32ColorDepth;
    UINT32 ui32RefreshRate;
} UGA_VIDEO_MODE, *PUGA_VIDEO_MODE;
```

UGA_VM_VERSION

```
typedef struct _UGA_VM_VERSION
{
    UGA_VERSION_NUMBER vmUgaSpecificationVersion;
    UGA_VERSION_NUMBER vmVirtualMachineVersion;
} UGA_VM_VERSION, *PUGA_VM_VERSION;
```

2.3 UGA Firmware Interface

UGA firmware exports a single entry point to the external world (system firmware, operating system runtime). The exported entry point is called UgaFwDispatchService. UgaFwDispatchService is responsible for dispatching the UGA IO request to the proper handler within the UGA firmware, based on UGA device type and IO request type.

UgaFwDispatchService is called with two arguments: PUGA_DEVICE pDevice and PUGA_IO_REQUEST pIoRequest. UgaFwDispatchService can determine the device type the request is intended for calling VM Library method VmlGetDeviceType(pDevice). UGA firmware cannot dereference directly any fields within UGA_DEVICE data structure—this is an opaque object and its internal layout may change in the future without notice.

UGA Specification Version 1.0 defines following UGA device types:
UgaDtParentBus
UgaDtGraphicsController
UgaDtOutputController
UgaDtOutputPort
UgaDtOther UGA_IO_REQUEST contains pointers to input and output buffers, lengths of both buffers, field to store a number of bytes returned by UGA firmware in the output buffer, and the IO request code in the UGA_IO_REQUEST.ioRequestCode field.

TBD: Should we declare UGA_IO_REQUEST an opaque object as well and define methods to manipulate its fields?

UGA Specification Version 1.0 defines following UGA IO request codes:
UgaIoGetVersion
UgaIoGetChildDevice
UgaIoStartDevice
UgaIoStopDevice
UgaIoFlushDevice
UgaIoResetDevice
UgaIoGetDeviceState
UgaIoSetDeviceState
UgaIoSetPowerState
UgaIoGetMemoryConfiguration
UgaIoSetVideoMode
UgaIoCopyRectangle
UgaIoGetEdidSegment
UgaIoDeviceChannelOpen
UgaIoDeviceChannelClose
UgaIoDeviceChannelRead
UgaIoDeviceChannelWrite
UgaIoGetPersistentDataSize
UgaIoGetPersistentData
UgaIoSetPersistentData
UgaIoGetDevicePropertySize
UgaIoGetDeviceProperty
UgaIoBtPrivateInterface For each UGA device UGA firmware will initially receive UgaIoStartDevice followed by UgaIoGetChildDevice IO requests, moving from the top to the bottom of the UGA device tree. Other IO requests will be received after devices have been enumerated and started. UgaDtParentBus is a special case—it is intended to seed UGA device enumeration process, and it will not be used for anything else than UgaIoGetVersion and UgaIoGetChildDevice.

2.4.1 UGA Firmware Interface—Entry Point

```
UGA_STATUS
UGA_FW_CALL_TYPE_API
UgaFwDispatchService(
    IN PUGA_DEVICE pDevice,
    IN PUGA_IO_REQUEST pIoRequest
    );
```

UgaFwDispatchService is the only entry point exported from UGA firmware and it is used as the main UGA service dispatch routine.

This is a required method.

Parameters
pDevice
Specifies a device object associated with a device enumerated by UgaFwGetChildDevice. Each device enumerated by UgaFwGetChildDevice has a unique device object associated with it.
pIoRequest
Points to the UGA IO request packet.

Return Value
UGA firmware status code.

2.4.2 UGA Firmware Interface—IO Request Handlers

| | |
|---|---|
| UgaFwBtPrivateInterface | Optional, boot time only |
| UgaFwCopyRectangle | Required |
| UgaFwDeviceChannelClose | Required* |
| UgaFwDeviceChannelOpen | Required* |
| UgaFwDeviceChannelRead | Required* |
| UgaFwDeviceChannelWrite | Required* |
| UgaFwFlushDevice | Required |
| UgaFwGetChildDevice | Required |
| UgaFwGetDeviceProperty | Required |
| UgaFwGetDevicePropertySize | Required |
| UgaFwGetDeviceState | Required |
| UgaFwGetEdidSegment | Required* |
| UgaFwGetMemoryConfiguration | Required |
| UgaFwGetPersistentData | Optional |
| UgaFwGetPersistentDataSize | Optional |
| UgaFwGetVersion | Optional |
| UgaFwResetDevice | Required |
| UgaFwSetDeviceState | Required |
| UgaFwSetPersistentData | Optional |
| UgaFwSetPowerState | Required |
| UgaFwSetVideoMode | Required |
| UgaFwStartDevice | Required |
| UgaFwStopDevice | Required |

*These methods may not be required for specific hardware configurations.

UgaFwBtPrivateInterface

```
UGA_STATUS
UGA_FW_CALL_TYPE_SERVICE
UgaFwBtPrivateInterface(
    IN PUGA_DEVICE pDevice,
    IN PUGA_IO_REQUEST pIoRequest
    );
```

UgaFwBtPrivateInterface provides a way to send OEM/IHV specific requests to the UGA firmware and to exchange free formatted data between the system and UGA firmware.

This is an optional, boot time only, method.

Parameters
pDevice
Specifies a device object associated with a device enumerated by UgaFwGetChildDevice. Each device enumerated by UgaFwGetChildDevice has a unique device object associated with it.
pIoRequest
Points to the UGA IO request packet.
pIoRequest->ioRequestCode
UGA IO request code.
pIoRequest->pvInBuffer
IHV/OEM defined.

pIoRequest->ui64InBufferSize
Size of input buffer in bytes.
pIoRequest->pvOutBuffer
IHV/OEM defined.
pIoRequest->ui64OutBufferSize
Size of output buffer in bytes.
pIoRequest->ui64BytesReturned
On return number of bytes in output buffer.

Return Value
UGA firmware status code.

Comments

See Also
UgaFwGetChildDevice, VmlBtPrivateInterface.

UgaFwCopyRectangle

```
UGA_STATUS
UGA_FW_CALL_TYPE_SERVICE
UgaFwCopyRectangle(
    IN PUGA_DEVICE pDevice,
    IN PUGA_IO_REQUEST pIoRequest
);
```

UgaFwCopyRectangle copies data from video to video memory, from system to video memory, or from video to system memory.

This is a required method.

Parameters
pDevice
Specifies a device object associated with a device enumerated by UgaFwGetChildDevice. Each device enumerated by UgaFwGetChildDevice has a unique device object associated with it.
pIoRequest
Points to the UGA IO request packet.
pIoRequest->ioRequestCode
UGA IO request code.
pIoRequest->pvInBuffer
Points to UGA_MEMORY_TRANSFER object.
pIoRequest->ui64InBufferSize
Size of input buffer in bytes.
pIoRequest->pvOutBuffer
Unused.
pIoRequest->ui64OutBufferSize
Size of output buffer in bytes.
pIoRequest->ui64BytesReturned
On return number of bytes in output buffer.

Return Value
UGA firmware status code.

Comments
Bitmap translations between source and destination regions are not supported—both regions must use the same format. UGA 1.0 supports only 16 bpp as RGB 565 and 32 bpp as xRGB.

See Also
UgaFwGetChildDevice.

UgaFwDeviceChannelClose

```
UGA_STATUS
UGA_FW_CALL_TYPE_SERVICE
```

```
UgaFwDeviceChannelClose(
    IN PUGA_DEVICE pDevice,
    IN PUGA_IO_REQUEST pIoRequest
);
```

UgaFwDeviceChannelClose closes a communication channel with a slave device.

This is a required method with the exception of OEM systems with built in non-PnP displays (e.g. laptops), which do not support external PnP display devices. For such OEM systems UgaFwGetEdidSegment method must be implemented.

Parameters
pDevice
Specifies a device object associated with a device enumerated by UgaFwGetChildDevice. Each device enumerated by UgaFwGetChildDevice has a unique device object associated with it.
pIoRequest
Points to the UGA IO request packet.
pIoRequest->ioRequestCode
UGA IO request code.
pIoRequest->pvInBuffer
Unused.
pIoRequest->ui64InBufferSize
Size of input buffer in bytes.
pIoRequest->pvOutBuffer
Unused.
pIoRequest->ui64OutBufferSize
Size of output buffer in bytes.
pIoRequest->ui64BytesReturned
On return number of bytes in output buffer.

Return Value
UGA firmware status code.

Comments
UgaFwDeviceChannelClose is mainly intended for retrieving EDID data from display devices (flexible support for new EDID formats). Additionally, IHV driver writers can use this method to communicate with other video child devices.

See Also
UgaFwGetChildDevice, UgaFwDeviceChannelOpen, UgaFwDeviceChannelRead, UgaFwDeviceChannelWrite, UgaFwGetEdidSegment.

UgaFwDeviceChannelOpen

```
UGA_STATUS
UGA_FW_CALL_TYPE_SERVICE
UgaFwDeviceChannelOpen(
    IN PUGA_DEVICE pDevice,
    IN PUGA_IO_REQUEST pIoRequest
);
```

UgaFwDeviceChannelOpen initiates communication with a slave device.

This is a required method with the exception of OEM systems with built in non-PnP displays (e.g. laptops), which do not support external PnP display devices. For such OEM systems UgaFwGetEdidSegment method must be implemented.

Parameters
pDevice
Specifies a device object associated with a device enumerated by UgaFwGetChildDevice. Each device enumerated by UgaFwGetChildDevice has a unique device object associated with it.
pIoRequest
Points to the UGA IO request packet.
pIoRequest->ioRequestCode
UGA IO request code.
pIoRequest->pvInBuffer
Unused.
pIoRequest->ui64InBufferSize
Size of input buffer in bytes.
pIoRequest->pvOutBuffer
Unused.
pIoRequest->ui64OutBufferSize
Size of output buffer in bytes.
pIoRequest->ui64BytesReturned
On return number of bytes in output buffer.

Return Value
UGA firmware status code.

Comments
UgaFwDeviceChannelOpen is mainly intended for retrieving EDID data from display devices (flexible support for new EDID formats). Additionally, IHV driver writers can use this method to communicate with other video child devices.

See Also
UgaFwGetChildDevice, UgaFwDeviceChannelRead, UgaFwDeviceChannelWrite, UgaFwDeviceChannelClose, UgaFwGetEdidSegment.

UgaFwDeviceChannelRead

```
UGA_STATUS
UGA_FW_CALL_TYPE_SERVICE
UgaFwDeviceChannelRead(
    IN PUGA_DEVICE pDevice,
    IN PUGA_IO_REQUEST pIoRequest
);
```

UgaFwDeviceChannelRead reads a block of data from a slave device.

This is a required method with the exception of OEM systems with built in non-PnP displays (e.g. laptops), which do not support external PnP display devices. For such OEM systems UgaFwGetEdidSegment method must be implemented.

Parameters
pDevice
Specifies a device object associated with a device enumerated by UgaFwGetChildDevice. Each device enumerated by UgaFwGetChildDevice has a unique device object associated with it.
pIoRequest
Points to the UGA IO request packet.
pIoRequest->ioRequestCode
UGA IO request code.
pIoRequest->pvInBuffer
Points to UGA_CHANNEL_TRANSFER object.
pIoRequest->ui64InBufferSize
Size of input buffer in bytes.
pIoRequest->pvOutBuffer
Unused.
pIoRequest->ui64OutBufferSize
Size of output buffer in bytes.
pIoRequest->ui64BytesReturned
On return number of bytes in output buffer.

Return Value
UGA firmware status code.

Comments
UgaFwDeviceChannelRead is mainly intended for retrieving EDID data from display devices (flexible support for new EDID formats). Additionally, IHV driver writers can use this method to communicate with other video child devices.

See Also
UgaFwGetChildDevice, UgaFwDeviceChannelOpen, UgaFwDeviceChannelClose, UgaFwDeviceChannelWrite, UgaFwGetEdidSegment.

UgaFwDeviceChannelWrite

```
UGA_STATUS
UGA_FW_CALL_TYPE_SERVICE
UgaFwDeviceChannelWrite(
    IN PUGA_DEVICE pDevice,
    IN PUGA_IO_REQUEST pIoRequest
);
```

UgaFwDeviceChannelWrite writes a block of data to a slave device.

This is a required method with the exception of OEM systems with built in non-PnP displays (e.g. laptops), which do not support external PnP display devices. For such OEM systems UgaFwGetEdidSegment method must be implemented.

Parameters
pDevice
Specifies a device object associated with a device enumerated by UgaFwGetChildDevice. Each device enumerated by UgaFwGetChildDevice has a unique device object associated with it.
pIoRequest
Points to the UGA IO request packet.
pIoRequest->ioRequestCode
UGA IO request code.
pIoRequest->pvInBuffer
Points to UGA_CHANNEL_TRANSFER object.
pIoRequest->ui64InBufferSize
Size of input buffer in bytes.
pIoRequest->pvOutBuffer
Unused.
pIoRequest->ui64OutBufferSize
Size of output buffer in bytes.
pIoRequest->ui64BytesReturned
On return number of bytes in output buffer.

Return Value
UGA firmware status code.

Comments
UgaFwDeviceChannelWrite is mainly intended for retrieving EDID data from display devices (flexible support for new EDID formats). Additionally, IHV driver writers can use this method to communicate with other video child devices.

See Also
UgaFwGetChildDevice, UgaFwDeviceChannelOpen, UgaFwDeviceChannelClose, UgaFwDeviceChannelRead, UgaFwGetEdidSegment.

UgaFwFlushDevice

```
UGA_STATUS
UGA_FW_CALL_TYPE_SERVICE
UgaFwFlushDevice(
    IN PUGA_DEVICE pDevice,
    IN PUGA_IO_REQUEST pIoRequest
);
```

UgaFwFlushDevice is responsible for flushing any pending writes to hardware, making sure all DMA operations are completed, etc.

This is a required method.

Parameters
pDevice
Specifies a device object associated with a device enumerated by UgaFwGetChildDevice. Each device enumerated by UgaFwGetChildDevice has a unique device object associated with it.
pIoRequest
Points to the UGA IO request packet.
pIoRequest->ioRequestCode
UGA IO request code.
pIoRequest->pvInBuffer
Unused.
pIoRequest->ui64InBufferSize
Size of input buffer in bytes.
pIoRequest->pvOutBuffer
Unused.
pIoRequest->ui64OutBufferSize
Size of output buffer in bytes.
pIoRequest->ui64BytesReturned
On return number of bytes in output buffer.

Return Value
UGA firmware status code.

Comments
UGA hardware must remain fully idle upon return from this routine until some other UGA method is called—system firmware/OS may be touching PCI configuration space of this device.

See Also
UgaFwGetChildDevice.

UgaFwGetChildDevice

```
UGA_STATUS
UGA_FW_CALL_TYPE_SERVICE
UgaFwGetChildDevice(
    IN PUGA_DEVICE pDevice,
    IN PUGA_TO_REQUEST pIoReguest
);
```

UgaFwGetChildDevice returns info about child device of device associated with pDevice device object.

This is a required method.

Parameters
pDevice
Specifies a device object associated with a device enumerated by UgaFwGetChildDevice. Each device enumerated by UgaFwGetChildDevice has a unique device object associated with it.
pIoRequest
Points to the UGA IO request packet.
pIoRequest->ioRequestCode
UGA IO request code.
pIoRequest->pvInBuffer
Points to 0-based child index (UINT32 value).
pIoRequest->ui64InBufferSize
Size of input buffer in bytes.
pIoRequest->pvOutBuffer
Points to UGA_DEVICE_DATA object.
pIoRequest->ui64OutBufferSize
Size of output buffer in bytes.
pIoRequest->ui64BytesReturned
On return number of bytes in output buffer.

Return Value
UGA firmware status code.

Comments
UgaFwGetChildDevice must report all devices, which are supported by UGA adapter, regardless if they are available or not at the time of enumeration. UgaFwGetDeviceState method will be used to determine a current state of devices on per-needed bases.

Setting UGA_DEVICE_DATA.ui32SharedContextSize property to non-zero value tells the run-time environment to allocate shared context buffer of given size, associate it with currently enumerated device, and point all subsequently enumerated devices to the same buffer as long as enumeration returns zero as shared context size for those devices. In general shared context size should be set to non-zero value only for the root device and to zero for all subsequently enumerated devices.

Additional information about UGA devices can be obtained using UgaFwGetDevicePropertySize and UgaFwGetDeviceProperty methods.

See Also
UgaFwGetDeviceState, UgaFwGetDevicePropertySize, UgaFwGetDeviceProperty.

UgaFwGetDeviceProperty

```
UGA_STATUS
UGA_FW_CALL_TYPE_SERVICE
UgaFwGetDeviceProperty(
    IN PUGA_DEVICE pDevice,
    IN PUGA_IO_REQUEST pIoRequest
);
```

UgaFwGetDeviceProperty returns static information about a device.

This is a required method.

Parameters
pDevice
Specifies a device object associated with a device enumerated by UgaFwGetChildDevice. Each device enumerated by UgaFwGetChildDevice has a unique device object associated with it.
pIoRequest
Points to the UGA IO request packet.
pIoRequest->ioRequestCode
UGA IO request code.

pIoRequest->pvInBuffer
    Points to UGA_DEVICE_PROPERTY object.
pIoRequest->ui64InBufferSize
    Size of input buffer in bytes.
pIoRequest->pvOutBuffer
    Points to storage for device property data.
pIoRequest->ui64OutBufferSize
    Size of output buffer in bytes.
pIoRequest->ui64BytesReturned
    On return number of bytes in output buffer.

Return Value
    UGA firmware status code.

Comments

See Also
    UgaFwGetChildDevice, UgaFwGetDevicePropertySize.

UgaFwGetDevicePropertySize

```
UGA_STATUS
UGA_FW_CALL_TYPE_SERVICE
UgaFwGetDevicePropertySize(
    IN PUGA_DEVICE pDevice,
    IN PUGA_IO_REQUEST pIoRequest
    );
```

UgaFwGetDevicePropertySize returns size of static information about a device.
    This is a required method.

Parameters
    pDevice
        Specifies a device object associated with a device enumerated by UgaFwGetChildDevice. Each device enumerated by UgaFwGetChildDevice has a unique device object associated with it.
    pIoRequest
        Points to the UGA IO request packet.
    pIoRequest->ioRequestCode
        UGA IO request code.
    pIoRequest->pvInBuffer
        Points to UGA_DEVICE_PROPERTY object.
    pIoRequest->ui64InBufferSize
        Size of input buffer in bytes.
    pIoRequest->pvOutBuffer
        Points to storage for size of device property (UINT64).
    pIoRequest->ui64OutBufferSize
        Size of output buffer in bytes.
    pIoRequest->ui64BytesReturned
        On return number of bytes in output buffer.

Return Value
    UGA firmware status code.

Comments

See Also
    UgaFwGetChildDevice, UgaFwGetDeviceProperty.

UgaFwGetDeviceState

```
UGA_STATUS
UGA_FW_CALL_TYPE_SERVICE
UgaFwGetDeviceState(
    IN PUGA_DEVICE pDevice,
    IN PUGA_IO_REQUEST pIoRequest
    );
```

UgaFwGetDeviceState returns the current state of a device associated with a device object.
    This is a required method.

Parameters
    pDevice
        Specifies a device object associated with a device enumerated by UgaFwGetChildDevice. Each device enumerated by UgaFwGetChildDevice has a unique device object associated with it.
    pIoRequest
        Points to the UGA IO request packet.
    pIoRequest->ioRequestCode
        UGA IO request code.
    pIoRequest->pvInBuffer
        Unused.
    pIoRequest->ui64InBufferSize
        Size of input buffer in bytes.
    pIoRequest->pvOutBuffer
        Points to UGA_DEVICE_STATE object.
    pIoRequest->ui64OutBufferSize
        Size of output buffer in bytes.
    pIoRequest->ui64BytesReturned
        On return number of bytes in output buffer.

Return Value
    UGA firmware status code.

Comments

See Also
    UgaFwGetChildDevice, UgaFwSetDeviceState.

UgaFwGetEdidSegment

```
UGA_STATUS
UGA_FW_CALL_TYPE_SERVICE
UgaFwGetEdidSegment(
    IN PUGA_DEVICE pDevice,
    IN PUGA_IO_REQUEST pIoRequest
    );
```

UgaFwGetEdidSegment returns EDID data for a device.
    This is a required method.

Parameters
    pDevice
        Specifies a device object associated with a device enumerated by UgaFwGetChildDevice. Each device enumerated by UgaFwGetChildDevice has a unique device object associated with it.
    pIoRequest
        Points to the UGA IO request packet.
    pIoRequest->ioRequestCode
        UGA IO request code.
    pIoRequest->pvInBuffer
        Points to EDID segment number (UINT32).
    pIoRequest->ui64InBufferSize
        Size of input buffer in bytes.
    pIoRequest->pvOutBuffer
        Points to storage for EDID segment data.
    pIoRequest->ui64OutBufferSize
        Size of output buffer in bytes (UGA_MAX_EDID_SEGMENT_LENGTH).
    pIoRequest->ui64BytesReturned
        On return number of bytes in output buffer.

Return Value
    UGA firmware status code.

Comments

This method will be used for enumerated UgaDtOutputController and UgaDtOutputPort devices.

For UgaDtOutputController devices UgaFwGetEdidSegment returns capabilities of individual output controllers, i.e. capabilities of the video adapter itself.

This method can fail if UGA firmware provides I2C methods for given UgaDtOutputPort device and EDID for that device is accessible via I2C protocol. This method must always succeed for UgaDtOutputController devices, and for UgaDtOutputPort devices not supporting I2C protocol by default (e.g. TV, some laptop flat panel displays).

This method can fail for EDID-less legacy monitors.

See Also

UgaFwGetChildDevice.

UgaFwGetMemoryConfiguration

```
UGA_STATUS
UGA_FW_CALL_TYPE_SERVICE
UgaFwGetMemoryConfiguration(
    IN PUGA_DEVICE pDevice,
    IN PUGA_IO_REQUEST pIoRequest
    );
```

UgaFwGetVideoMemoryConfiguration returns video memory configuration data.

This is a required method.

Parameters pDevice

Specifies a device object associated with a device enumerated by UgaFwGetChildDevice. Each device enumerated by UgaFwGetChildDevice has a unique device object associated with it.

pIoRequest

Points to the UGA IO request packet.

pIoRequest->ioRequestCode

UGA IO request code.

pIoRequest->pvInBuffer

Unused.

pIoRequest->ui64InBufferSize

Size of input buffer in bytes.

pIoRequest->pvOutBuffer

Points to UGA_MEMORY_CONFIGURATION object.

pIoRequest->ui64OutBufferSize

Size of output buffer in bytes.

pIoRequest->ui64BytesReturned

On return number of bytes in output buffer.

Return Value

UGA firmware status code.

Comments

This method will be called for enumerated UgaDtOutputController devices.

Video memory configuration data varies based on currently selected video mode. UgaFwGetMemoryConfiguration will be typically called after UgaFwSetVideoMode call.

See Also

UgaFwGetChildDevice, UgaFwSetVideoMode.

UgaFwGetPersistentData

```
UGA_STATUS
UGA_FW_CALL_TYPE_SERVICE
UgaFwGetPersistentData(
    IN PUGA_DEVICE pDevice,
    IN PUGA_IO_REQUEST pIoRequest
    );
```

UgaFwGetPersistentData returns a free formatted, IHV defined, device configuration data. This data is stored by a system firmware on a non-volatile media and it is persistent over a reboot.

This is an optional method.

Parameters pDevice

Specifies a device object associated with a device enumerated by UgaFwGetChildDevice. Each device enumerated by UgaFwGetChildDevice has a unique device object associated with it.

pIoRequest

Points to the UGA IO request packet.

pIoRequest->ioRequestCode

UGA IO request code.

pIoRequest->pvInBuffer

Points to number of bytes to read (UINT64).

pIoRequest->ui64InBufferSize

Size of input buffer in bytes.

pIoRequest->pvOutBuffer

Points to storage for read data.

pIoRequest->ui64OutBufferSize

Size of output buffer in bytes.

pIoRequest->ui64BytesReturned

On return number of bytes in output buffer.

Return Value

UGA firmware status code.

Comments

See Also

UgaFwGetChildDevice, UgaFwGetPersistentDataSize, UgaFwSetPersistentData.

UgaFwGetPersistentDataSize

```
UGA_STATUS
UGA_FW_CALL_TYPE_SERVICE
UgaFwGetPersistentDataSize(
    IN PUGA_DEVICE pDevice,
    IN PUGA_IO_REQUEST pIoRequest
    );
```

UgaFwGetPersistentDataSize returns a size in bytes of a persistent storage area available for UGA device. A persistent storage area for a device is provided by a system firmware and hardware.

This is an optional method.

Parameters pDevice

Specifies a device object associated with a device enumerated by UgaFwGetChildDevice. Each device enumerated by UgaFwGetChildDevice has a unique device object associated with it.

pIoRequest

Points to the UGA IO request packet.

pIoRequest->ioRequestCode
UGA IO request code.
pIoRequest->pvInBuffer
Unused.
pIoRequest->ui64InBufferSize
Size of input buffer in bytes.
pIoRequest->pvOutBuffer
Points to size of persistent data buffer (UINT64).
pIoRequest->ui64OutBufferSize
Size of output buffer in bytes.
pIoRequest->ui64BytesReturned
On return number of bytes in output buffer.

Return Value
UGA firmware status code.

Comments

See Also
UgaFwGetChildDevice, UgaFwGetPersistentData, UgaFwSetPersistentData.

UgaFwGetVersion

```
UGA_STATUS
UGA_FW_CALL_TYPE_SERVICE
UgaFwGetVersion(
    IN PUGA_DEVICE pDevice,
    IN PUGA_IO_REQUEST pIoRequest
);
```

UgaFwGetVersion returns version information.
This is a required method.

Parameters
pDevice
Specifies a device object associated with a device enumerated by UgaFwGetChildDevice. Each device enumerated by UgaFwGetChildDevice has a unique device object associated with it.
pIoRequest
Points to the UGA IO request packet.
pIoRequest->ioRequestCode
UGA IO request code.
pIoRequest->pvInBuffer
Unused.
pIoRequest->ui64InBufferSize
Size of input buffer in bytes.
pIoRequest->pvOutBuffer
Points to UGA_VERSION object.
pIoRequest->ui64OutBufferSize
Size of output buffer in bytes.
pIoRequest->ui64BytesReturned
On return number of bytes in output buffer.

Return Value
UGA firmware status code.

Comments

See Also
UgaFwGetChildDevice.

UgaFwResetDevice

```
UGA_STATUS
UGA_FW_CALL_TYPE_SERVICE
UgaFwResetDevice(
    IN PUGA_DEVICE pDevice,
    IN PUGA_IO_REQUEST pIoRequest
);
```

UgaFwResetDevice resets a device to the initial state.
This is a required method.

Parameters
pDevice
Specifies a device object associated with a device enumerated by UgaFwGetChildDevice. Each device enumerated by UgaFwGetChildDevice has a unique device object associated with it.
pIoRequest
Points to the UGA IO request packet.
pIoRequest->ioRequestCode
UGA IO request code.
pIoRequest->pvInBuffer
Unused.
pIoRequest->ui64InBufferSize
Size of input buffer in bytes.
pIoRequest->pvOutBuffer
Unused.
pIoRequest->ui64OutBufferSize
Size of output buffer in bytes.
pIoRequest->ui64BytesReturned
On return number of bytes in output buffer.

Return Value
UGA firmware status code.

Comments
This method cannot fail for UgaDtGraphicsController and UgaDtOutputController devices—it must reset those devices to the initial state where any other UGA method can be used, especially UgaFwSetVideoMode. UgaFwResetDevice will be used by the operating system in the case of emergency.

See Also
UgaFwGetChildDevice.

UgaFwSetDeviceState

```
UGA_STATUS
UGA_FW_CALL_TYPE_SERVICE
UgaFwSetDeviceState(
    IN PUGA_DEVICE pDevice,
    IN PUGA_IO_REQUEST pIoRequest
);
```

UgaFwSetDeviceState sets a current state of a child device to enabled or disabled.
This is a required method.

Parameters
pDevice
Specifies a device object associated with a device enumerated by UgaFwGetChildDevice. Each device enumerated by UgaFwGetChildDevice has a unique device object associated with it.
pIoRequest
Points to the UGA IO request packet.
pIoRequest->ioRequestCode
UGA IO request code.
pIoRequest->pvInBuffer
Points to UGA_DEVICE_STATE object.

pIoRequest->ui64InBufferSize
Size of input buffer in bytes.
pIoRequest->pvOutBuffer
Unused.
pIoRequest->ui64OutBufferSize
Size of output buffer in bytes.
pIoRequest->ui64BytesReturned
On return number of bytes in output buffer.

Return Value
UGA firmware status code.

Comments
To determine an actual state of a device at any time a call to UgaFwGetDeviceState must be issued. Caller should not make any assumptions about current device state based on device state value passed to UgaFwSetDeviceState.

If UgaFwSetDeviceState is called for UgaDtOutputController and UgaDtOutputPort devices then UGA firmware should expect UgaFwSetVideoMode call to follow, i.e. UGA firmware should not set video mode on its own even if this is required to complete a set state request.

See Also
UgaFwGetChildDevice, UgaFwGetDeviceState.

UgaFwSetPersistentData

```
UGA_STATUS
UGA_FW_CALL_TYPE_SERVICE
UgaFwSetPersistentData(
    IN PUGA_DEVICE pDevice,
    IN PUGA_IO_REQUEST pIoRequest
    );
```

UgaFwSetPersistentData writes a free formatted, IHV defined, device configuration data. This data is stored by a system firmware on a non-volatile media and it is persistent over a reboot.

This is an optional method.

Parameters
pDevice
Specifies a device object associated with a device enumerated by UgaFwGetChildDevice. Each device enumerated by UgaFwGetChildDevice has a unique device object associated with it.
pIoRequest
Points to the UGA IO request packet.
pIoRequest->ioRequestCode
UGA IO request code.
pIoRequest->pvInBuffer
Points to data to write.
pIoRequest->ui64InBufferSize
Size of input buffer in bytes (number of bytes to write).
pIoRequest->pvOutBuffer
Points to number of bytes written (UINT64).
pIoRequest->ui64OutBufferSize
Size of output buffer in bytes.
pIoRequest->ui64BytesReturned
On return number of bytes in output buffer.

Return Value
UGA firmware status code.

Comments

See Also
UgaFwGetChildDevice, UgaFwGetPersistentDataSize, UgaFwGetPersistentData.

UgaFwSetPowerState

```
UGA_STATUS
UGA_FW_CALL_TYPE_SERVICE
UgaFwSetPowerState(
    IN PUGA_DEVICE pDevice,
    IN PUGA_IO_REQUEST pIoRequest
    );
```

UgaFwSetPowerState probes if OK to set, cancels probe, or sets (commits probed) device power state.

This is a required method.

Parameters
pDevice
Specifies a device object associated with a device enumerated by UgaFwGetChildDevice. Each device enumerated by UgaFwGetChildDevice has a unique device object associated with it.
pIoRequest
Points to the UGA IO request packet.
pIoRequest->ioRequestCode
UGA IO request code.
pIoRequest->pvInBuffer
Points to UGA_POWER_REQUEST object.
pIoRequest->ui64InBufferSize
Size of input buffer in bytes.
pIoRequest->pvOutBuffer
Unused.
pIoRequest->ui64OutBufferSize
Size of output buffer in bytes.
pIoRequest->ui64BytesReturned
On return number of bytes in output buffer.

Return Value
UGA firmware status code.

Comments
The device must remain idle between UgaPrProbe and UgaPrCommit or UgaPrCancel requests. This method cannot fail UgaPrCommit request.

See Also
UgaFwGetChildDevice.

UgaFwSetVideoMode

```
UGA_STATUS
UGA_FW_CALL_TYPE_SERVICE
UgaFwSetVideoMode(
    IN PUGA_DEVICE pDevice,
    IN PUGA_IO_REQUEST pIoRequest
    );
```

UgaFwSetVideoMode sets video mode.
This is a required method.

Parameters
pDevice
Specifies a device object associated with a device enumerated by UgaFwGetChildDevice. Each device enumerated by UgaFwGetChildDevice has a unique device object associated with it.
pIoRequest
Points to the UGA IO request packet.
pIoRequest->ioRequestCode
UGA IO request code.

pIoRequest->pvInBuffer
Points to UGA_VIDEO_MODE object.
pIoRequest->ui64InBufferSize
Size of input buffer in bytes.
pIoRequest->pvOutBuffer
Unused.
pIoRequest->ui64OutBufferSize
Size of output buffer in bytes.
pIoRequest->ui64BytesReturned
On return number of bytes in output buffer.

Return Value
UGA firmware status code.

Comments
This method is used for enumerated UgaDtOutputController devices.
Required pixel depths and color ordering (little endian):
16 bpp—RGB 565
32 bpp—xRGB
For add-in UGA adapters 800×600×32 bpp at 60 Hz must be supported. This mode is optional for integrated video implementations.

See Also
UgaFwGetChildDevice, UgaFwGetEdidSegment.

UgaFwStartDevice

```
UGA_STATUS
UGA_FW_CALL_TYPE_SERVICE
UgaFwStartDevice(
    IN PUGA_DEVICE pDevice,
    IN PUGA_IO_REQUEST pIoRequest
);
```

UgaFwStartDevice powers on and initializes device associated with device object to the state when other UGA firmware methods can be used with that device.
This is a required method.

Parameters
pDevice
Specifies a device object associated with a device enumerated by UgaFwGetChildDevice. Each device enumerated by UgaFwGetChildDevice has a unique device object associated with it.
pIoRequest
Points to the UGA IO request packet.
pIoRequest->ioRequestCode
UGA IO request code.
pIoRequest->pvInBuffer
Unused.
pIoRequest->ui64InBufferSize
Size of input buffer in bytes.
pIoRequest->pvOutBuffer
Unused.
pIoRequest->ui64OutBufferSize
Size of output buffer in bytes.
pIoRequest->ui64BytesReturned
On return number of bytes in output buffer.

Return Value
UGA firmware status code.

Comments
UgaFwStartDevice code in not discardable! It is used by the firmware during the POST/INIT faze of boot process, but it may be used by the OS at any other time as well, e.g. during multi-monitor initialization or during the power management cycles.

See Also
UgaFwGetChildDevice.

UgaFwStopDevice

```
UGA_STATUS
UGA_FW_CALL_TYPE_SERVICE
UgaFwStopDevice(
    IN PUGA_DEVICE pDevice,
    IN PUGA_IO_REQUEST pIoRequest
);
```

UgaFwStopDevice stops UGA device. It is responsible for cleaning up all resources associated with pDevice—pDevice will be gone!
This is a required method.

Parameters
pDevice
Specifies a device object associated with a device enumerated by UgaFwGetChildDevice. Each device enumerated by UgaFwGetChildDevice has a unique device object associated with it.
pIoRequest
Points to the UGA IO request packet.
pIoRequest->ioRequestCode
UGA IO request code.
pIoRequest->pvInBuffer
Unused.
pIoRequest->ui64InBufferSize
Size of input buffer in bytes.
pIoRequest->pvOutBuffer
Unused.
pIoRequest->ui64OutBufferSize
Size of output buffer in bytes.
pIoRequest->ui64BytesReturned
On return number of bytes in output buffer.

Return Value
UGA firmware status code.

Comments

See Also
UgaFwGetChildDevice.

Part 3

Virtual Machine Interface
Virtual machine interface is exposed by the system firmware (boot time) and by the operating system (run time). UGA firmware uses this interface to request basic services from its run environment. The UGA-VM stub is included as a part of UGA/VMXXX.LIB static library that UGA firmware code is linked with.

3.1 Virtual Machine Interface—Constants and Data Types
UGA_FW_CALL_TYPE_API
UGA_FW_CALL_TYPE_SERVICE
UGA_FW_CALL_TYPE_VML
UGA_FW_I2C_READ_CLOCK_LINE
UGA_FW_I2C_READ_DATA_LINE
UGA_FW_I2C_WRITE_CLOCK_LINE
UGA_FW_I2C_WRITE_DATA_LINE
UGA_FW_I2C_CONTROL
UGA_FW_SERVICE

UGA_FW_SERVICE_DISPATCH

UGA_FW_CALL_TYPE_XXXX
define UGA_FW_CALL_TYPE_API
define UGA_FW_CALL_TYPE_SERVICE
define UGA_FW_CALL_TYPE_VML

UGA_FW_I2C_READ_CLOCK_LINE

```
typedef
UGA_STATUS
(*PUGA_FW_I2C_READ_CLOCK_LINE)(
    IN PUGA_DEVICE pDevice,
    OUT PUINT8 pui8Data
    );
```

UGA_FW_I2C_READ_DATA_LINE

```
typedef
UGA_STATUS
(*PUGA_FW_I2C_READ_DATA_LINE)(
    IN PUGA_DEVICE pDevice,
    OUT PUINT8 pui8Data
    );
```

UGA_FW_I2C_WRITE_CLOCK_LINE

```
typedef
UGA_STATUS
(*PUGA_FW_I2C_WRITE_CLOCK_LINE)(
    IN PUGA_DEVICE pDevice,
    OUT PUINT8 pui8Data
    );
```

UGA_FW_I2C_WRITE_DATA_LINE

```
typedef
UGA_STATUS
(*PUGA_FW_I2C_WRITE_DATA_LINE)(
    IN PUGA_DEVICE pDevice,
    OUT PUINT8 pui8Data
    );
```

UGA_FW_I2C_CONTROL

```
typedef struct _UGA_FW_I2C_CONTROL
{
    PUGA_FW_I2C_READ_CLOCK_LINE pfnI2cReadClockLine;
    PUGA_FW_I2C_READ_DATA_LINE pfnI2cReadDataLine;
    PUGA_FW_I2C_WRITE_CLOCK_LINE pfnI2cWriteClockLine;
    PUGA_FW_I2C_WRITE_DATA_LINE pfnI2cWriteDataLine;
    UINT32 ui32I2cDelay;          // 100ns units
} UGA_FW_I2C_CONTROL, *PUGA_FW_I2C_CONTROL;
```

UGA_FW_SERVICE

```
typedef
UGA_STATUS
```

-continued

```
(UGA_FW_CALL_TYPE_SERVICE *PUGA_FW_SERVICE)(
    IN PUGA_DEVICE pDevice,
    IN OUT PUGA_IO_REQUEST pIoRequest
    );
```

UGA_FW_SERVICE_DISPATCH

```
typedef
UGA_STATUS
(UGA_FW_CALL_TYPE_API
*PUGA_FW_SERVICE_DISPATCH)(
    IN PUGA_DEVICE pDevice,
    IN OUT PUGA_IO_REQUEST pIoRequest
    );
```

3.3 Virtual Machine Interface—Methods
VmlBtPrivateInterface
VmlCopySystemMemory
VmlGetDeviceContext
VmlGetDeviceId
VmlGetDeviceType
VmlGetParentDevice
VmlGetPersistentData
VmlGetPersistentDataSize
VmlGetSharedContext
VmlGetTimeStamp
VmlGetVersion
VmlI2cGetEdidSegment
VmlI2cRead
VmlI2cStart
VmlI2cStop
VmlI2cWrite
VmlPciAllocateCommonBuffer
VmlPciCopyDeviceMemory
VmlPciFlush
VmlPciFreeCommonBuffer
VmlPciGetRomImage
VmlPciLockSystemMemory
VmlPciMapDeviceIoSpace
VmlPciMapDeviceMemory
VmlPciPollDeviceIoPort
VmlPciPollDeviceMemory
VmlPciReadConfigurationSpace
VmlPciReadDeviceIoPort
VmlPciReadDeviceMemory
VmlPciUnlockSystemMemory
VmlPciUnmapDeviceIoSpace
VmlPciUnmapDeviceMemory
VmlPciWriteConfigurationSpace
VmlPciWriteDeviceIoPort
VmlPciWriteDeviceMemory
VmlSetPersistentData
VmlSleep
VmlBtPrivateInterface

```
UGA_STATUS
UGA_FW_CALL_TYPE_VML
VmlBtPrivateInterface(
    IN PUGA_DEVICE pDevice,
    IN PVOID pvInBuffer,
    IN UINT64 ui64InBufferSize,
```

```
            OUT PVOID pvOutBuffer,
            IN UINT64 ui64OutBufferSize,
            OUT PUINT64 pui64BytesReturned
            );
```

VmlBtPrivateInterface provides a way to send OEM/IHV specific requests to the system firmware and to exchange free formatted data between the UGA and system firmware. This method is available only at the boot time and is not exported from the VM at the OS run time.

Parameters
  pDevice
    Specifies a device object associated with a device enumerated by UgaFwGetChildDevice. Each device enumerated by UgaFwGetChildDevice has a unique device object associated with it.
  pIoRequest
    Points to the UGA IO request packet.
  pvInBuffer
    IHV/OEM defined.
  ui64InBufferSize
    Size of input buffer in bytes.
  pvOutBuffer
    IHV/OEM defined.
  ui64OutBufferSize
    Size of output buffer in bytes.
  pui64BytesReturned
    On return points to number of bytes in output buffer.

Return Value
  UGA firmware status code.

Comments

See Also
  UgaFwGetChildDevice, UgaFwBtPrivateInterface.

VmlCopySystemMemory

```
UGA_STATUS
UGA_FW_CALL_TYPE_VML
VmlCopySystemMemory(
    IN PUGA_DEVICE pDevice,
    OUT VOID UNALIGNED *pvDestination,
    IN VOID UNALIGNED *pvSource,
    IN UINT64 ui64Length
    );
```

VmlCopySystemMemory copies data from the source location in the system memory to the destination location in the system memory.

Parameters
  pDevice
    Specifies a device object associated with a device enumerated by UgaFwGetChildDevice. Each device enumerated by UgaFwGetChildDevice has a unique device object associated with it.
  pvDestination
    Points to the destination location in the system memory.
  pvSource
    Points to the location in the system memory of the data to copy.
  ui64Length
    Specifies the number of bytes to copy.

Return Value
  UGA firmware status code.

Comments
  pvDestination and pvSource must point to the addresses in the system memory. This function cannot be used to access device physical memory. Source+Length cannot overlap Destination.

See Also
  UgaFwGetChildDevice, VmlPciAllocateCommonBuffer, VmlPciMapSystemMemory, VmlPciReadDeviceMemory, VmlPciWriteDeviceMemory.

VmlGetDeviceContext

```
UGA_STATUS
UGA_FW_CALL_TYPE_VML
VmlGetDeviceContext(
    IN PUGA_DEVICE pDevice,
    OUT PVOID *ppvDeviceContext
    );
```

VmlGetDeviceContext returns a pointer to IHV defined device specific context associated with a device object pointed by pDevice.

Parameters
  pDevice
    Specifies a device object associated with a device enumerated by UgaFwGetChildDevice. Each device enumerated by UgaFwGetChildDevice has a unique device object associated with it.
  ppvDeviceContext
    Points to the storage for a pointer to the device context.

Return Value
  UGA firmware status code.

Comments
  UGA firmware specifies the size of the device context for each enumerated UGA device in the UgaFwGetChildDevice handler of the parent device. The device context size of the child device is returned in the UGA_DEVICE_DATA.ui32DeviceContextSize field.

See Also
  UgaFwGetChildDevice, VmlGetSharedContext.

VmlGetDeviceId

```
UGA_STATUS
UGA_FW_CALL_TYPE_VML
VmlGetDeviceId(
    IN PUGA_DEVICE pDevice,
    OUT PUGA_DEVICE_ID pDeviceId
    );
```

VmlGetDeviceId returns IHV defined device specific device ID associated with a device object pointed by pDevice.

Parameters
  pDevice
    Specifies a device object associated with a device enumerated by UgaFwGetChildDevice. Each device enumerated by UgaFwGetChildDevice has a unique device object associated with it.
  pDeviceId
    Points to the storage for the device ID value.

Return Value

UGA firmware status code.

Comments

UGA firmware specifies device ID for each enumerated UGA device in the UgaFwGetChildDevice handler of the parent device. The device ID value for the child device is returned in the UGA_DEVICE_DATA.deviceId field.

See Also

UgaFwGetChildDevice, VmlGetDeviceType.

VmlGetDeviceType

```
UGA_STATUS
UGA_FW_CALL_TYPE_VML
VmlGetDeviceType(
    IN PUGA_DEVICE pDevice,
    OUT PUGA_DEVICE_TYPE pDeviceType
);
```

VmlGetDeviceType returns device type associated with a device object pointed by pDevice.

Parameters pDevice

Specifies a device object associated with a device enumerated by UgaFwGetChildDevice. Each device enumerated by UgaFwGetChildDevice has a unique device object associated with it.

pDeviceType

Points to the storage for the device type value.

Return Value

UGA firmware status code.

Comments

UGA firmware specifies device type for each enumerated UGA device in the UgaFwGetChildDevice handler of the parent device. The device type value for the child device is returned in the UGA_DEVICE_DATA.deviceType field.

See Also

UgaFwGetChildDevice, VmlGetDeviceId.

VmlGetParentDevice

```
UGA_STATUS
UGA_FW_CALL_TYPE_VML
VmlGetParentDevice(
    IN PUGA_DEVICE pDevice,
    OUT PUGA_DEVICE *ppParentDevice
);
```

VmlGetParentDevice returns a pointer to the parent device object of the device associated with a device object pointed by pDevice.

Parameters pDevice

Specifies a device object associated with a device enumerated by UgaFwGetChildDevice. Each device enumerated by UgaFwGetChildDevice has a unique device object associated with it.

ppParentDevice

Points to the storage for a pointer to the parent device object.

Return Value

UGA firmware status code.

Comments

UGA runtime environment maintains a link to the parent device only. UGA firmware itself can maintain links to child devices in device context if needed (using VmlGetParentDevice and VmlGetDeviceContext for parent device in UgaFwStartDevice handler for example).

See Also

UgaFwGetChildDevice, UgaFwStartDevice, VmlGetDeviceContext, VmlGetParentDevice.

VmlGetPersistentData

```
UGA_STATUS
UGA_FW_CALL_TYPE_VML
VmlGetPersistentData(
    IN PUGA_DEVICE pDevice,
    OUT VOID UNALIGNED *pvBuffer,
    IN UINT32 ui32Offset,
    IN UINT32 ui32Length
);
```

VmlGetPersistentData returns a free formatted, IHV/OEM defined, device configuration data. This data is stored by a system firmware on a non-volatile media and it is persistent over a reboot.

Parameters pDevice

Specifies a device object associated with a device enumerated by UgaFwGetChildDevice. Each device enumerated by UgaFwGetChildDevice has a unique device object associated with it.

pvBuffer

On return contains the data read from a persistent storage area for a device.

ui32Offset

Specifies an offset in bytes from a beginning of a persistent storage area for a device.

ui32Length

Specifies length in bytes of the data to be read from a persistent storage area for a device.

Return Value

UGA firmware status code.

See Also

VmlGetPersistentDataSize, VmlSetPersistentData.

VmlGetPersistentDataSize

```
UGA_STATUS
UGA_FW_CALL_TYPE_VML
VmlGetPersistentDataSize(
    IN PUGA_DEVICE pDevice,
    OUT PUINT32 pui32Size
);
```

VmlGetPersistentDataSize returns a size in bytes of a persistent storage area available for a device. A persistent storage area for a device is provided by a system firmware and hardware.

Parameters
pDevice
Specifies a device object associated with a device enumerated by UgaFwGetChildDevice. Each device enumerated by UgaFwGetChildDevice has a unique device object associated with it.
pui32Size
On return contains a size in bytes of a persistent storage area available for a device.

Return Value
UGA firmware status code.

See Also
VmlGetPersistentData, VmlSetPersistentData.

VmlGetSharedContext

```
UGA_STATUS
UGA_FW_CALL_TYPE_VML
VmlGetSharedContext(
    IN PUGA_DEVICE pDevice,
    OUT PVOID *ppvSharedContext
    );
```

VmlGetSharedContext returns a pointer to IHV defined context shared between all devices enumerated by UGA firmware for given display adapter.

Parameters
pDevice
Specifies a device object associated with a device enumerated by UgaFwGetChildDevice. Each device enumerated by UgaFwGetChildDevice has a unique device object associated with it.
ppvSharedContext
Points to the storage for a pointer to the shared context.

Return Value
UGA firmware status code.

Comments
UGA firmware must specify the same size of the shared context for each enumerated UGA device in the UgaFwGetChildDevice handlers. The shared context size is returned in the UGA_DEVICE_DATA.ui32SharedContextSize field.

See Also
UgaFwGetChildDevice, VmlGetDeviceContext.

VmlGetTimeStamp

```
UGA_STATUS
UGA_FW_CALL_TYPE_VML
VmlGetTimeStamp(
    IN PUGA_DEVICE pDevice,
    OUT PUINT64 pui64TimeStamp
    );
```

VmlGetTimeStamp returns a current time stamp value in 100 nanosecond units.

Parameters
pDevice
Specifies a device object associated with a device enumerated by UgaFwGetChildDevice. Each device enumerated by UgaFwGetChildDevice has a unique device object associated with it.
pui64TimeStamp
Points to the storage for a time stamp value.

Return Value
UGA firmware status code.

Comments

See Also
UgaFwGetChildDevice.

VmlGetVersion

```
UGA_STATUS
UGA_FW_CALL_TYPE_VML
VmlGetVersion(
    IN PUGA_DEVICE pDevice,
    OUT PUGA_VM_VERSION pVmVersion
    );
```

VmlGetVersion returns virtual machine version information.

Parameters
pDevice
Specifies a device object associated with a device enumerated by UgaFwGetChildDevice. Each device enumerated by UgaFwGetChildDevice has a unique device object associated with it.
pVmVersion
Points to the storage for virtual machine version information.

Return Value
UGA firmware status code.

Comments

See Also
UgaFwGetChildDevice.

VmlI2cGetEdidSegment

```
UGA_STATUS
UGA_FW_CALL_TYPE_VML
VmlI2cGetEdidSegment(
    IN PUGA_DEVICE pDevice,
    IN PUGA_I2C_CONTROL pI2cControl,
    IN UINT8 ui8Segment
    OUT PVOID pvBuffer,
    OUT PUINT32 pui32Length
    );
```

UgaFwGetEdidSegment returns EDID data for a device.

Parameters
pDevice
Specifies a device object associated with a device enumerated by UgaFwGetChildDevice. Each device enumerated by UgaFwGetChildDevice has a unique device object associated with it.
pI2cControl
Specifies a pointer to UGA_I2C_CONTROL structure. The caller must initialize fields of this structure with pointers to SDA (serial data) and SCL (serial clock) line toggling callback routines and I2C delay required by the I2C slave device (monitor).
ui8Segment
Specifies zero based EDID segment number. EDID segment is always 256 bytes long and it may contain one or two 128 byte EDIDs, one 256 byte EDID, a part of EDID larger than 256 bytes (does not exist at the time of writing), or no EDID at all.

pvBuffer

On return contains EDID segment data.

pui32Length

On return contains number of EDID data bytes returned in the buffer pointed by pvBuffer.

Return Value

UGA firmware status code.

Comments

See Also

UGA_I2C_CONTROL, UgaFwGetChildDevice.

VmlI2cRead

```
UGA_STATUS
UGA_FW_CALL_TYPE_VML
VmlI2cRead(
    IN PUGA_DEVICE pDevice,
    IN PUGA_I2C_CONTROL pI2cControl,
    OUT VOID UNALIGNED *pvBuffer,
    IN UINT32 ui32Length
);
```

VmlI2cRead reads a block of data from I2C slave device.

Parameters pDevice

Specifies a device object associated with a device enumerated by UgaFwGetChildDevice. Each device enumerated by UgaFwGetChildDevice has a unique device object associated with it.

pI2cControl

Specifies a pointer to UGA_I2C_CONTROL structure. The caller must initialize fields of this structure with pointers to SDA (serial data) and SCL (serial clock) line toggling callback routines and I2C delay required by the I2C slave device.

pvBuffer

On return contains data read from I2C slave device.

ui32Length

Specifies length in bytes of data to read.

Return Value

UGA firmware status code.

Comments

See Also

UGA_I2C_CONTROL, UgaFwGetChildDevice, VmlI2cStart, VmlI2cStop, VmlI2cWrite.

VmlI2cStart

```
UGA_STATUS
UGA_FW_CALL_TYPE_VML
VmlI2cStart(
    IN PUGA_DEVICE pDevice
    IN PUGA_I2C_CONTROL pI2cControl
);
```

VmlI2cStart initiates I2C communication with a slave device.

Parameters pDevice

Specifies a device object associated with a device enumerated by UgaFwGetChildDevice. Each device enumerated by UgaFwGetChildDevice has a unique device object associated with it.

pI2cControl

Specifies a pointer to UGA_I2C_CONTROL structure. The caller must initialize fields of this structure with pointers to SDA (serial data) and SCL (serial clock) line toggling callback routines and I2C delay required by the I2C slave device.

Return Value

UGA firmware status code.

Comments

See Also

UGA_I2C_CONTROL, UgaFwGetChildDevice, VmlI2cRead, VmlI2cWrite, VmlI2cStop.

VmlI2cStop

```
UGA_STATUS
UGA_FW_CALL_TYPE_VML
VmlI2cStop(
    IN PUGA_DEVICE pDevice
    IN PUGA_I2C_CONTROL pI2cControl
);
```

VmlI2cRead stops I2C communication with a slave device.

Parameters pDevice

Specifies a device object associated with a device enumerated by UgaFwGetChildDevice. Each device enumerated by UgaFwGetChildDevice has a unique device object associated with it.

pI2cControl

Specifies a pointer to UGA_I2C_CONTROL structure. The caller must initialize fields of this structure with pointers to SDA (serial data) and SCL (serial clock) line toggling callback routines and I2C delay required by the I2C slave device.

Return Value

UGA firmware status code.

Comments

See Also

UGA_I2C_CONTROL, UgaFwGetChildDevice, VmlI2cStart, VmlI2cRead, VmlI2cWrite.

VmlI2cWrite

```
UGA_STATUS
UGA_FW_CALL_TYPE_VML
VmlI2cWrite(
    IN PUGA_DEVICE pDevice,
    IN PUGA_I2C_CONTROL pI2cControl,
    IN VOID UNALIGNED *pvBuffer,
    IN UINT32 ui32Length
);
```

VmlI2cWrite writes a block of data to I2C slave device.

Parameters
pDevice
Specifies a device object associated with a device enumerated by UgaFwGetChildDevice. Each device enumerated by UgaFwGetChildDevice has a unique device object associated with it.
pI2cControl
Specifies a pointer to UGA_I2C_CONTROL structure. The caller must initialize fields of this structure with pointers to SDA (serial data) and SCL (serial clock) line toggling callback routines and I2C delay required by the I2C slave device.
pvBuffer
Contains data to be written to the I2C slave device.
ui32Length
Specifies length in bytes of data to write.

Return Value
UGA firmware status code.

Comments

See Also
UGA_I2C_CONTROL, UgaFwGetChildDevice, VmlI2cStart, VmlI2cStop, VmlI2cRead.

VmlPciAllocateCommonBuffer

```
UGA_STATUS
UGA_FW_CALL_TYPE_VML
VmlPciAllocateCommonBuffer(
    IN PUGA_DEVICE pDevice,
    IN UINT64 ui64Length,
    IN UGA_MEMORY_CACHING_TYPE cachingType,
    OUT PVOID *ppvHostAddress,
    OUT PUGA_PHYSICAL_ADDRESS pDeviceAddress
);
```

VmlPciAllocateCommonBuffer allocates contiguous, non-pageable system memory and maps it so that it is simultaneously accessible from both the processor and a device for DMA operations.

Parameters
pDevice
Specifies a device object associated with a device enumerated by UgaFwGetChildDevice. Each device enumerated by UgaFwGetChildDevice has a unique device object associated with it.
ui64Length
Specifies the number of byte of memory to allocate.
cachingType
Specifies a UGA_MEMORY_CACHING_TYPE value, which indicates the type of caching allowed for the requested memory. The possible values that firmware can use are:
UgaMcNonCached
The requested memory cannot be cached by the processor.
UgaMcCached
The processor may cache the requested memory.
UgaMcWriteCombined
The requested memory can have a write-combine enabled (typical for frame buffer).
ppvHostAddress
On return contains the base virtual address of the allocated range.
pDeviceAddress
On return contains the bus translated base physical address of the allocated range.

Return Value
UGA firmware status code.

Comments
VmlPciAllocateCommonBuffer allocates system memory that can be reached from both the processor and the device. This memory appears contiguous to the device. This method sets up a translation for the device, including loading map registers if necessary.
VmlPciAllocateCommonBuffer allocates at least a page of memory, regardless of the requested ui64Length. After a successful allocation requesting fewer than PAGE_SIZE bytes, the caller can access only the requested ui64Length. After a successful allocation requesting more than an integral multiple of PAGE_SIZE bytes, any remaining bytes on the last allocated page are inaccessible to the caller.
If UGA firmware needs several pages of common buffer space, but the pages need not be contiguous, the driver should make several one-page requests to VmlPciAllocateCommonBuffer instead of one large request. This approach conserves contiguous memory.

See Also
UgaFwGetChildDevice, VmlPciFreeCommonBuffer.

VmlPciCopyDeviceMemory

```
UGA_STATUS
UGA_FW_CALL_TYPE_VML
VmlPciCopyDeviceMemory(
    IN PUGA_DEVICE pDevice,
    IN UINT8 ui8BarIndex,
    IN UINT64 ui64DestinationOffest,
    IN UINT64 ui64SourceOffest,
    IN UINT64 ui64Count,
    IN UGA_DATA_WIDTH dataWidth
);
```

VmlPciCopyDeviceMemory copies the contents of the device memory block from one location to another.

Parameters
pDevice
Specifies a device object associated with a device enumerated by UgaFwGetChildDevice. Each device enumerated by UgaFwGetChildDevice has a unique device object associated with it.
ui8BarIndex
Specifies a zero based index of Base Address Register (BAR) of PCI Configuration Header for memory or IO aperture. All UGA MMIO and IO operations use BAR relative addressing. The valid range for this value is 0-5.
ui64DestinationOffset
Specifies BAR relative offset to the destination of the copy operation.
ui64SourceOffset
Specifies BAR relative offset to the sources of the copy operation.
ui64Count
Specifies the number of memory operations to perform.
dataWidth
Specifies the width of memory operation.

Return Value
UGA firmware status code.

Comments
Source and destination regions cannot overlap.

See Also
UgaFwGetChildDevice.

VmlPciFlush

```
UGA_STATUS
UGA_FW_CALL_TYPE_VML
VmlPciFlush(
    IN PUGA_DEVICE pDevice
);
```

VmlPciFlush flushes all data posted to the device.

Parameters
pDevice
Specifies a device object associated with a device enumerated by UgaFwGetChildDevice. Each device enumerated by UgaFwGetChildDevice has a unique device object associated with it.

Return Value
UGA firmware status code.

Comments

See Also
UgaFwGetChildDevice.

VmlPciFreeCommonBuffer

```
UGA_STATUS
UGA_FW_CALL_TYPE_VML
VmlPciFreeCommonBuffer(
    IN PUGA_DEVICE pDevice,
    IN PVOID pvHostAddress,
    IN UINT64 ui64Length,
    IN UGA_MEMORY_CACHING_TYPE cachingType
);
```

VmlPciFreeCommonBuffer frees a common buffer allocated by VmlPciAllocateCommonBuffer, along with all resources the buffer uses.

Parameters
pDevice
Specifies a device object associated with a device enumerated by UgaFwGetChildDevice. Each device enumerated by UgaFwGetChildDevice has a unique device object associated with it.
pvHostAddress
Specifies the base virtual address of the allocated range.
ui64Length
Specifies the number of byte of memory to deallocate.
cachingType
Specifies a UGA_MEMORY_CACHING_TYPE value.

Return Value
UGA firmware status code.

Comments
The parameters passed to VmlPciFreeCommonBuffer must match exactly those passed to and returned from VmlPciAllocateCommonBuffer. UGA firmware cannot free part of an allocated common buffer.

See Also
UgaFwGetChildDevice, VmlPciAllocateCommonBuffer.

VmlPciGetRomImage

```
UGA_STATUS
UGA_FW_CALL_TYPE_VML
VmlPciGetRomImage(
    IN PUGA_DEVICE pDevice,
    OUT VOID UNALIGNED *pvOutputBuffer,
    IN UINT32 ui32Offset,
    IN UINT32 ui32Length
);
```

VmlPciGetRomImage provides an access to a copy of the PCI Option ROM in system memory.

Parameters
pDevice
Specifies a device object associated with a device enumerated by UgaFwGetChildDevice. Each device enumerated by UgaFwGetChildDevice has a unique device object associated with it.
pvOutputBuffer
On return contains data read from the option ROM image.
ui32Offset
Specifies an offset in bytes from the beginning of the option ROM image.
ui32Length
Specifies length in bytes on the option ROM image to read.

Return Value
UGA firmware status code.

Comments

See Also
UgaFwGetChildDevice.

VmlPciLockSystemMemory

```
UGA_STATUS
UGA_FW_CALL_TYPE_VML
VmlPciLockSystemMemory(
    IN PUGA_DEVICE pDevice,
    IN VOID UNALIGNED *pvHostAddress,
    IN OUT PUINT64 pui64Length,
    IN UGA_MEMORY_TRANSFER_TYPE transferType,
    OUT PUGA_PHYSICAL_ADDRESS pDeviceAddress,
    OUT PVOID *ppvMapping
);
```

VmlPciLockSystemMemory makes physical pages mapped by the virtual address range resident and locked in the memory.

Parameters
pDevice
Specifies a device object associated with a device enumerated by UgaFwGetChildDevice. Each device enumerated by UgaFwGetChildDevice has a unique device object associated with it.
pvHostAddress
Specifies the virtual address of the memory block to be locked.
pui64Length
Specifies the length in bytes of the memory block to be locked.
On return contains the length of contiguous physical memory block locked by this operation. Returned length will be smaller than requested in case when pvAddress points to the virtual address range which is not contiguous in the physical memory.

transferType
Specifies the type of DMA transfer to be performed using locked system memory buffer. Valid values are UgaMtSystemToVideo and UgaMtVideoToSystem.
pDeviceAddress
On return contains the bus translated base physical address of the locked memory range.
ppvMapping
On return points to system memory mapping information. This is an opaque data to be used with matching VmlPciUnlockSystemMemory call only.

Return Value
UGA firmware status code.

Comments
VmlPciLockSystemMemory may have to allocate temporary transfer buffer visible to PCI device. In this case VmlPciLockSystemMemory will copy the content of the buffer pointed by pvHostAddress to that temporary transfer buffer for UgaMtSystemToVideo transfer operation and VmlPciUnlockSystemMemory will copy the content of temporary transfer buffer to UgaMtVideoToSystem operation. Because of possibility of this dual buffering it is illegal for the CPU to access directly buffer pointed by pvHostAddress between matching VmlPciLockSystemMemory and VmlPciUnlockSystemMemory for given transfer operation.

If the length returned in pui64Length is smaller than the initial value then the pvAddress can be advanced by returned length and VmlPciLockSystemMemory can be called again for the remaining length. This operation can be repeated till the whole memory region is successfully locked. If multiple calls to VmlPciLockSystemMemory must be used to lock whole memory region then it means that virtual contiguous memory region is mapped into multiple detached contiguous physical memory blocks. In this case multiple mapping values will be returned as well via ppvMapping argument. Caller must store all retuned mapping values in order to use them with matching calls to VmlPciUnlockSystemMemory.

See Also
UgaFwGetChildDevice, VmlPciUnlockSystemMemory.

VmlPciMapDeviceIoSpace

```
UGA_STATUS
UGA_FW_CALL_TYPE_VML
VmlPciMapDeviceIoSpace(
    IN PUGA_DEVICE pDevice,
    IN UINT8 ui8BarIndex,
    IN UINT64 ui64Offset,
    IN UINT64 ui64Length,
    IN PUGA_UGA_MEMORY_CACHING_TYPE cachingType
    );
```

VmlPciMapDeviceIoSpace maps a device specific physical IO address range to nonpaged system space.

Parameters
pDevice
Specifies a device object associated with a device enumerated by UgaFwGetChildDevice. Each device enumerated by UgaFwGetChildDevice has a unique device object associated with it.
ui8BarIndex
Specifies a zero based index of Base Address Register (BAR) of PCI Configuration Header for memory or IO aperture. All UGA MMIO and IO operations use BAR relative addressing. The valid range for this value is 0-5.
ui64Offset
Specifies BAR relative base offset to the IO range to be mapped.
ui64Length
Specifies the length in bytes of the IO range to be mapped.
cachingType
Specifies a UGA_MEMORY_CACHING_TYPE value, which indicates the type of caching allowed for the requested memory. The possible values that UGA firmware can use are:
UgaMcNonCached
The requested memory cannot be cached by the processor.
UgaMcCached
The processor may cache the requested memory.
UgaMcWriteCombined
The requested memory can have a write-combine enabled (typical for frame buffer).

Return Value
UGA firmware status code.

Comments

See Also
UgaFwGetChildDevice, VmlPciUnmapDeviceIoSpace.

VmlPciMapDeviceMemory

```
UGA_STATUS
UGA_FW_CALL_TYPE_VML
VmlPciMapDeviceMemory(
    IN PUGA_DEVICE pDevice,
    IN UINT8 ui8BarIndex,
    IN UINT64 ui64Offset,
    IN UINT64 ui64Length,
    IN PUGA_UGA_MEMORY_CACHING_TYPE cachingType
    );
```

VmlPciMapDeviceMemory maps a device specific physical memory address range to nonpaged system space.

Parameters
pDevice
Specifies a device object associated with a device enumerated by UgaFwGetChildDevice. Each device enumerated by UgaFwGetChildDevice has a unique device object associated with it.
ui8BarIndex
Specifies a zero based index of Base Address Register (BAR) of PCI Configuration Header for memory or IO aperture. All UGA MMIO and IO operations use BAR relative addressing. The valid range for this value is 0-5.
ui64Offset
Specifies BAR relative base offset to the device memory range to be mapped.
ui64Length
Specifies the length in bytes of the device memory range to be mapped.
cachingType
Specifies a UGA_MEMORY_CACHING_TYPE value, which indicates the type of caching allowed for the requested memory. The possible values that UGA firmware can use are:
UgaMcNonCached
The requested memory cannot be cached by the processor.
UgaMcCached
The processor may cache the requested memory.
UgaMcWriteCombined The requested memory can have a write-combine enabled (typical for frame buffer).

Return Value
UGA firmware status code.

Comments

See Also
UgaFwGetChildDevice, VmlPciUnmapDeviceMemory. VmlPciPollDeviceIoPort

```
UGA_STATUS
UGA_FW_CALL_TYPE_VML
VmlPciPollDeviceIoPort(
    IN PUGA_DEVICE pDevice,
    OUT VOID UNALIGNED *pvData,
    IN UINT8 ui8BarIndex,
    IN UINT64 ui64Offset,
    IN VOID UNALIGNED *pvMask,
    IN VOID UNALIGNED *pvValue,
    IN UGA_DATA_WIDTH dataWidth,
    IN UINT64 ui64TimeOut
    );
```

VmlPciPollDeviceIoPort polls device IO port for specified bit pattern.

Parameters
pDevice
Specifies a device object associated with a device enumerated by UgaFwGetChildDevice. Each device enumerated by UgaFwGetChildDevice has a unique device object associated with it.
pvData
On return contains the final, not masked value read from polled IO port.
ui8BarIndex
Specifies a zero based index of Base Address Register (BAR) of PCI Configuration Header for memory or IO aperture. All UGA MMIO and IO operations use BAR relative addressing. The valid range for this value is 0-5.
ui64Offset
Specifies BAR relative offset in bytes of the IO port to be polled.
pvMask
Points to the mask to be ANDed with values read from the polled IO port.
pvValue
Points to the value to be compared with values read from the polled IO port and ANDed with the mask pointed by pvMask.
dataWidth
Specifies the data width of values read from polled IO port and values stored at pvMask, pvValue, and pvData.
ui64TimeOut
Specifies the timeout value in 100-nanosecond units for the poll operation.

Return Value
UGA firmware status code.

Comments
VmlPciPollDeviceIoPort returns UGA_STATUS_TIMEOUT when there is no match before timeout is reached. Otherwise VmlPciPollDeviceIoPort returns UGA_STATUS_SUCCESS immediately after matching pattern is read.

See Also
UgaFwGetChildDevice, VmlPciPollDeviceMemory.

VmlPciPollDeviceMemory

```
UGA_STATUS
UGA_FW_CALL_TYPE_VML
VmlPciPollDeviceMemory(
    IN PUGA_DEVICE pDevice,
    OUT VOID UNALIGNED *pvData,
    IN UINT8 ui8BarIndex,
    IN UINT64 ui64Offset,
    IN VOID UNALIGNED *pvMask,
    IN VOID UNALIGNED *pvValue,
    IN UGA_DATA_WIDTH dataWidth,
    IN UINT64 ui64TimeOut
    );
```

VmlPciPollDeviceMemory polls device memory location for specified bit pattern.

Parameters
pDevice
Specifies a device object associated with a device enumerated by UgaFwGetChildDevice. Each device enumerated by UgaFwGetChildDevice has a unique device object associated with it.
pvData
On return contains the final, not masked value read from polled device memory location.
ui8BarIndex
Specifies a zero based index of Base Address Register (BAR) of PCI Configuration Header for memory or IO aperture. All UGA MMIO and IO operations use BAR relative addressing. The valid range for this value is 0-5.
ui64Offset
Specifies BAR relative offset in bytes of the device memory to be polled.
pvMask
Points to the mask to be ANDed with values read from the polled device memory location.
pvValue
Points to the value to be compared with values read from the polled device memory location and ANDed with the mask pointed by pvMask.
dataWidth
Specifies the data width of values read from polled device memory location and values stored at pvMask, pvValue, and pvData.
ui64TimeOut
Specifies the timeout value in 100-nanosecond units for the poll operation.

Return Value
UGA firmware status code.

Comments
VmlPciPollDeviceMemory returns UGA_STATUS_TIMEOUT when there is no match before timeout is reached. Otherwise VmlPciPollDeviceMemory returns UGA_STATUS_SUCCESS immediately after matching pattern is read.

See Also
UgaFwGetChildDevice, VmlPciPollDeviceIoPort.

VmlPciReadConfigurationSpace

```
UGA_STATUS
UGA_FW_CALL_TYPE_VML
VmlPciReadConfigurationSpace(
```

-continued

```
IN PUGA_DEVICE pDevice,
OUT VOID UNALIGNED *pvBuffer,
IN UINT32 ui32Offset,
IN UINT32 ui32Count,
IN UGA_DATA_WIDTH dataWidth
);
```

VmlPciReadConfigurationSpace reads the data from the PCI Configuration Header of UGA device.

Parameters
pDevice
Specifies a device object associated with a device enumerated by UgaFwGetChildDevice. Each device enumerated by UgaFwGetChildDevice has a unique device object associated with it.
pvBuffer
On return contains the data read from PCI Configuration Header of UGA device.
ui32Offset
Specifies an offset in bytes from the beginning of the device configuration data. VmlPciReadConfigurationSpace will read device configuration data starting from this offset.
ui32Count
Specifies the number of configuration space reads.
dataWidth
Specifies the data width of values read from configuration space.

Return Value
UGA firmware status code.

Comments

See Also
UgaFwGetChildDevice, VmlPciWriteConfigurationSpace.

VmlPciReadDeviceIoPort

```
UGA_STATUS
UGA_FW_CALL_TYPE_VML
VmlPciReadDeviceIoPort(
    IN PUGA_DEVICE pDevice,
    OUT VOID UNALIGNED *pvData,
    IN UINT8 ui8BarIndex,
    IN UINT64 ui64Offset,
    IN UGA_DATA_WIDTH dataWidth
);
```

VmlPciReadDeviceIoPort reads a value from device IO port.

Parameters
pDevice
Specifies a device object associated with a device enumerated by UgaFwGetChildDevice. Each device enumerated by UgaFwGetChildDevice has a unique device object associated with it.
pvData
On return contains value read from the IO port.
ui8BarIndex
Specifies a zero based index of Base Address Register (BAR) of PCI Configuration Header for memory or IO aperture. All UGA MMIO and IO operations use BAR relative addressing. The valid range for this value is 0-5.
ui64Offset
Specifies BAR relative offset in bytes of the IO port to be read.
dataWidth
Specifies the data width of the value to be read from the IO port.

Return Value
UGA firmware status code.

Comments

See Also
UgaFwGetChildDevice, VmlPciReadDeviceMemory, VmlPciWriteDeviceIoPort, VmlPciWriteDeviceMemory.

VmlPciReadDeviceMemory

```
UGA_STATUS
UGA_FW_CALL_TYPE_VML
VmlPciReadDeviceMemory(
    IN PUGA_DEVICE pDevice,
    OUT VOID UNALIGNED *pvData,
    IN UINT8 ui8BarIndex,
    IN UINT64 ui64Offset,
    IN UINT64 ui64Count,
    IN UGA_DATA_WIDTH dataWidth
);
```

VmlPciReadDeviceMemory reads data block from the device memory.

Parameters
pDevice
Specifies a device object associated with a device enumerated by UgaFwGetChildDevice. Each device enumerated by UgaFwGetChildDevice has a unique device object associated with it.
pvData
On return contains the block of data read from the device memory. The buffer pointed by pvData must be at least (dataWidth*ui64Count) bytes long.
ui8BarIndex
Specifies a zero based index of Base Address Register (BAR) of PCI Configuration Header for memory or IO aperture. All UGA MMIO and IO operations use BAR relative addressing. The valid range for this value is 0-5.
ui64Offset
Specifies BAR relative base offset in bytes of the device memory to be read.
ui64Count
Specifies the number of dataWidth reads to execute starting from ui64Offset.
dataWidth
Specifies the data width of values to be read from the device memory.

Return Value
UGA firmware status code.

Comments

See Also
UgaFwGetChildDevice, VmlPciReadDeviceIoPort, VmlPciWriteDeviceIoPort, VmlPciWriteDeviceMemory.

VmlPciUnlockSystemMemory

```
UGA_STATUS
UGA_FW_CALL_TYPE_VML
VmlPciUnlockSystemMemory(
    IN PUGA_DEVICE pDevice,
    IN VOID UNALIGNED *pvHostAddress,
    IN UINT64 ui64Length,
    IN PVOID pvMapping
);
```

VmlPciUnlockSystemMemory unlocks physical pages locked by VmlPciLockSystemMemory.

Parameters
  pDevice
    Specifies a device object associated with a device enumerated by UgaFwGetChildDevice. Each device enumerated by UgaFwGetChildDevice has a unique device object associated with it.
  pvHostAddress
    Specifies the virtual address of the memory block to be unlocked.
  ui64Length
    Specifies the length in bytes of the memory block to be unlocked.
  pvMapping
    Specifies system memory mapping information returned by VmlPciLockSystemMemory.

Return Value
  UGA firmware status code.

Comments
  VmlPciLockSystemMemory may have to allocate temporary transfer buffer visible to PCI device. In this case VmlPciLockSystemMemory will copy the content of the buffer pointed by pvHostAddress to that temporary transfer buffer for UgaMtSystemToVideo transfer operation and VmlPciUnlockSystemMemory will copy the content of temporary transfer buffer to UgaMtVideoToSystem operation. Because of possibility of this dual buffering it is illegal for the CPU to access directly buffer pointed by pvHostAddress between matching VmlPciLockSystemMemory and VmlPciUnlockSystemMemory for given transfer operation.

UGA firmware cannot unlock a part of locked contiguous physical memory block. If the multiple calls had to be used to lock a contiguous virtual memory block mapped into multiple, disconnected contiguous physical memory blocks, then the caller must use multiple matching calls to VmlPciUnlockSystemMemory to unlock multiple blocks of physical memory passing pvHostAddress, ui64Length, and pvMapping corresponding to each physical memory block.

See Also
  UgaFwGetChildDevice, VmlPciLockSystemMemory.

VmlPciUnmapDeviceIoSpace

```
UGA_STATUS
UGA_FW_CALL_TYPE_VML
VmlPciUnmapDeviceIoSpace(
    IN PUGA_DEVICE pDevice,
    IN UINT8 ui8BarIndex,
    IN UINT64 ui64Offset,
    IN UINT64 ui64Length
);
```

VmlPciUnmapDeviceIoSpace unmaps device specific physical IO address range mapped by VmlPciMapDeviceIoSpace.

Parameters
  pDevice
    Specifies a device object associated with a device enumerated by UgaFwGetChildDevice. Each device enumerated by UgaFwGetChildDevice has a unique device object associated with it.
  ui8BarIndex
    Specifies a zero based index of Base Address Register (BAR) of PCI Configuration Header for memory or IO aperture. All UGA MMIO and IO operations use BAR relative addressing. The valid range for this value is 0-5.
  ui64Offset
    Specifies BAR relative base offset to the IO range to be unmapped.
  ui64Length
    Specifies the length in bytes of the IO range to be unmapped.

Return Value
  UGA firmware status code.

Comments
  The parameters passed to VmlPciUnmapDeviceIoSpace must match exactly those passed to and returned from VmlPciMapDeviceIoSpace. UGA firmware cannot unmap a part of mapped device physical IO range.

See Also
  UgaFwGetChildDevice, VmlPciMapDeviceIoSpace.

VmlpciUnmapDeviceMemory

```
UGA_STATUS
UGA_FW_CALL_TYPE_VML
VmlPciMapDeviceMemory(
    IN PUGA_DEVICE pDevice,
    IN UINT8 ui8BarIndex,
    IN UINT64 ui64Offset,
    IN UINT64 ui64Length
);
```

VmlPciUnmapDeviceMemory unmaps a device specific physical memory address range mapped by VmlPciMapDeviceMemory.

Parameters
  pDevice
    Specifies a device object associated with a device enumerated by UgaFwGetChildDevice. Each device enumerated by UgaFwGetChildDevice has a unique device object associated with it.
  ui8BarIndex
    Specifies a zero based index of Base Address Register (BAR) of PCI Configuration Header for memory or IO aperture. All UGA MMIO and IO operations use BAR relative addressing. The valid range for this value is 0-5.
  ui64Offset
    Specifies BAR relative base offset to the device memory range to be unmapped.
  ui64Length
    Specifies the length in bytes of the device memory range to be unmapped.

Return Value
  UGA firmware status code.

Comments

The parameters passed to VmlPciUnmapDeviceMemory must match exactly those passed to and returned from VmlPciMapDeviceMemory. UGA firmware cannot unmap a part of mapped device physical memory range.

See Also

UgaFwGetChildDevice, VmlPciMapDeviceMemory.

VmlPciWriteConfigurationSpace

```
UGA_STATUS
UGA_FW_CALL_TYPE_VML
VmlPciReadConfigurationSpace(
    IN PUGA_DEVICE pDevice,
    IN VOID UNALIGNED *pvBuffer,
    IN UINT32 ui32Offset,
    IN UINT32 ui32Count,
    IN UGA_DATA_WIDTH dataWidth
);
```

VmlPciWriteConfigurationSpace writes the data to the PCI Configuration Header of UGA device.

Parameters pDevice

Specifies a device object associated with a device enumerated by UgaFwGetChildDevice. Each device enumerated by UgaFwGetChildDevice has a unique device object associated with it.

pvBuffer

Points to the data to be written to PCI Configuration Header of UGA device.

ui32Offset

Specifies an offset in bytes from the beginning of the device configuration data. VmlPciWriteConfigurationSpace will write device configuration data starting from this offset.

ui32Count

Specifies the number of configuration space writes.

dataWidth

Specifies the number of configuration space writes.

Return Value

UGA firmware status code.

Comments

See Also

UgaFwGetChildDevice, VmlPciReadConfigurationSpace.

VmlPciWriteDeviceIoPort

```
UGA_STATUS
UGA_FW_CALL_TYPE_VML
VmlPciWriteDeviceIoPort(
    IN PUGA_DEVICE pDevice,
    IN VOID UNALIGNED *pvData,
    IN UINT8 ui8BarIndex,
    IN UINT64 ui64Offset,
    IN UGA_DATA_WIDTH dataWidth
);
```

VmlPciWriteDeviceIoPort writes a value to device IO port.

Parameters pDevice

Specifies a device object associated with a device enumerated by UgaFwGetChildDevice. Each device enumerated by UgaFwGetChildDevice has a unique device object associated with it.

pvData

Points to value to be written to the IO port.

ui8BarIndex

Specifies a zero based index of Base Address Register (BAR) of PCI Configuration Header for memory or IO aperture. All UGA MMIO and IO operations use BAR relative addressing. The valid range for this value is 0-5.

ui64Offset

Specifies BAR relative offset in bytes of the IO port to be written.

dataWidth

Specifies the data width of the value to be written to the IO port.

Return Value

UGA firmware status code.

Comments

See Also

UgaFwGetChildDevice, VmlPciReadDeviceIoPort, VmlPciReadDeviceMemory, VmlPciWriteDeviceMemory.

VmlPciWriteDeviceMemory

```
UGA_STATUS
UGA_FW_CALL_TYPE_VML
VmlPciWriteDeviceMemory(
    IN PUGA_DEVICE pDevice,
    IN VOID UNALIGNED *pvData,
    IN UINT8 ui8BarIndex,
    IN UINT64 ui64Offset,
    IN UINT64 ui64Count,
    IN UGA_DATA_WIDTH dataWidth
);
```

VmlPciWriteDeviceMemory writes a data block to the device memory.

Parameters pDevice

Specifies a device object associated with a device enumerated by UgaFwGetChildDevice. Each device enumerated by UgaFwGetChildDevice has a unique device object associated with it.

pvData

Points to the block of data to write to the device memory. The buffer pointed by pvData must be at least (dataWidth*ui64Count) bytes long.

ui8BarIndex

Specifies a zero based index of Base Address Register (BAR) of PCI Configuration Header for memory or IO aperture. All UGA MMIO and IO operations use BAR relative addressing. The valid range for this value is 0-5.

ui64Offset

Specifies BAR relative base offset in bytes of the device memory to be written.

ui64Count

Specifies the number of dataWidth writes to execute starting from ui64Offset.

dataWidth

Specifies the data width of values to be written to the device memory.

63

Return Value
UGA firmware status code.

Comments

See Also
UgaFwGetChildDevice, VmlPciReadDeviceIoPort, VmlPciReadDeviceMemory, VmlPciWriteDeviceIoPort.

VmlSetPersistentData

```
UGA_STATUS
UGA_FW_CALL_TYPE_VML
VmlSetPersistentData(
    IN PUGA_DEVICE pDevice,
    IN VOID UNALIGNED *pvBuffer,
    IN UINT32 ui32Offset,
    IN UINT32 ui32Length
    );
```

VmlSetPersistentData writes a free formatted, IHV/OEM defined, device configuration data. This data is stored by a system firmware on a non-volatile media and it is persistent over a reboot.

Parameters
pDevice
Specifies a device object associated with a device enumerated by UgaFwGetChildDevice. Each device enumerated by UgaFwGetChildDevice has a unique device object associated with it.
pvBuffer
Points to the data to be written to a persistent storage area for a device.
u32Offset
Specifies an offset in bytes from a beginning of a persistent storage area for a device.
ui32Length
Specifies length in bytes of the data to be written to a persistent storage area for a device.

Return Value
UGA firmware status code.

See Also
VmlGetPersistentDataSize, VmlGetPersistentData.

VmlSleep

```
UGA_STATUS
UGA_FW_CALL_TYPE_VML
VmlSleep(
    IN PUGA_DEVICE pDevice,
    IN UINT64 ui64Duration
    );
```

VmlSleep suspends UGA firmware execution for specified number of 100 nanosecond units.

Parameters
pDevice
Specifies a device object associated with a device enumerated by UgaFwGetChildDevice. Each device enumerated by UgaFwGetChildDevice has a unique device object associated with it.
ui64Duration
Specifies the number of 100 nanoseconds units.

64

Return Value
UGA firmware status code.

Comments
Currently the smallest "settable" value is 10, which means that for any duration <=10 the delay will be at least 10*100 ns=1 us long.

See Also
UgaFwGetChildDevice.

APPENDIX B

EFI-UGA Binding

EFI_UGA_IO_PROTOCOL

Part 1

EFI_UGA_IO_PROTOCOL
EFI_UGA_IO_PROTOCOL provides an EFI interface to display adapter firmware, one that is compliant with the UGA Firmware Interface Specification. In order to simplify EFI client code implementation, EFI_UGA_IO_PROTOCOL exports CreateDevice and DeleteDevice methods, in addition to a single UGA firmware dispatch entry point.
The EFI_UGA_IO_PROTOCOL implementation and EFI-UGA driver binding code samples shown in this document are completely generic and are independent of the display hardware architecture. They can be provided as a part of an EFI driver library.
A video ROM must export EFI_UGA_IO_PROTOCOL in order to be compliant with EFI 1.1.

1.1 EFI_UGA_IO_PROTOCOL Methods
This section lists the EFI_UGA_IO_PROTOCOL methods. These methods are used to create and initialize a UGA device object, delete a UGA device object, and send an I/O request packet to a UGA device object.
EFI_UGA_IO_CREATE_DEVICE
EFI_UGA_IO_DELETE_DEVICE
EFI_UGA_IO_DISPATCH_SERVICE EFI_UGA IO CREATE_DEVICE
The EFI_UGA_IO_CREATE_DEVICE method creates and initializes a UGA device object.

```
typedef
EFI_STATUS
(*EFI_UGA_IO_CREATE_DEVICE)(
    IN EFI_UGA_IO_PROTOCOL *This,
    IN UGA_DEVICE *ParentDevice,
    IN UGA_DEVICE_DATA *DeviceData,
    IN VOID *RunTimeContext,
    OUT UGA_DEVICE **Device
    );
```

Parameters
This
Points to an EFI_UGA_IO_PROTOCOL structure.
ParentDevice
Points to the UGA_DEVICE structure for the parent of the device to be created. A value of NULL indicates that the created device object is the root of enumeration; that is, a UGA device object of type UgaDtParentBus (see the UGA_DEVICE_TYPE enumeration) is to be created.
DeviceData
Points to a UGA_DEVICE_DATA structure that contains UGA device data for the device to be created.

RunTimeContext
  Points to a memory location that contains run-time environment-specific context for the device to be created.
Device
  Points to a memory location that receives that address of the UGA_DEVICE structure for the created device.
Return Value
  This method returns a standard EFI status code.
Headers
  Declared in efiuga.h. Include efiuga.h and uga.h.
Comments
  Video IHVs do not need to implement this method. It is included in the EFI VML static library. For implementation details, see Section 2.1, EFI-UGA Binding and EFI_UGA_IO_PROTOCOL Implementation Sample.

EFI_UGA_IO_DELETE_DEVICE
  The EFI_UGA_IO_DELETE_DEVICE method deletes a UGA device object that was created in a previous call to the EFI_UGA_IO_CREATE_DEVICE method.

```
typedef
EFI_STATUS
(*EFI_UGA_IO_DELETE_DEVICE)(
    IN EFI_UGA_IO_PROTOCOL *This,
    IN UGA_DEVICE *Device
    );
```

Parameters
  This
    Points to an EFI_UGA_IO_PROTOCOL structure.
  Device
    Points to the UGA_DEVICE structure for the device to be deleted.
Return Value
  This method returns a standard EFI status code.
Headers
  Declared in efiuga.h. Include efiuga.h and uga.h.
Comments
  Video IHVs do not need to implement this method. It is included in the EFI VML static library. For implementation details, see the sample code in Section 2.1, EFI-UGA Binding and EFI_UGA_IO_PROTOCOL Implementation Sample.

EFI_UGA_IO_DISPATCH_SERVICE
  The EFI_UGA_IO_DISPATCH_SERVICE method sends a UGA I/O request packet to a UGA device object.

```
typedef
UGA_STATUS
UGA_FW_CALL_TYPE_API
(*EFI_UGA_IO_DISPATCH_SERVICE)(
    IN UGA_DEVICE *Device,
    IN UGA_IO_REQUEST IoRequest
    );
```

Parameters
  Device
    Points to the UGA_DEVICE structure for the device object associated with an enumerated UGA device.
  IoRequest
    Specifies a UGA_IO_REQUEST structure that contains the UGA I/O request packet.
Return Value
  This method returns a standard UGA status code.
Headers
  Declared in efiuga.h. Include efiuga.h and uga.h.
Comments
  Video IHVs must implement this method. For a sample implementation, see Section 2.2, UGA Firmware Interface Implementation Sample.
  This method is the main UGA firmware service dispatch routine. In addition to implementing this method, video IHVs must implement any of the functions that are specified in IORequest.ioRequestCode. (See the UGA_IO_REQUEST_CODE enumeration for a list of names of the functions that this method can call.)

1.2 EFI_UGA_IO_PROTOCOL Structures
  The structures listed in this section are used by the EFI_UGA_IO_PROTOCOL methods to hold information about a particular UGA device object.
  EFI_UGA_IO_PROTOCOL
  EFI_UGA_IO_PROTOCOL_CONTEXT EFI_UGA_IO_PROTOCOL
  The EFI_UGA_IO_PROTOCOL structure contains the addresses of functions used to create a UGA device, delete a UGA device, and send messages to a UGA device.

```
typedef struct _EFI_UGA_IO_PROTOCOL{
    EFI_UGA_IO_CREATE_DEVICE CreateDevice;
    EFI_UGA_IO_DELETE_DEVICE DeleteDevice;
    EFI_UGA_IO_DISPATCH_SERVICE DispatchService;
}EFI_UGA_IO_PROTOCOL;
```

Members
  CreateDevice
    Points to a function that is used to create a UGA device object.
  DeleteDevice
    Points to a function that is used to delete a UGA device object.
  DispatchService
    Points to a function that is used to send messages to a UGA device object.
Headers
  Declared in efiuga.h. Include efiuga.h.

EFI_UGA_IO_PROTOCOL_CONTEXT
  The EFI_UGA_IO_PROTOCOL_CONTEXT structure contains the information of an EFI_UGA_IO_PROTOCOL structure, together with the handle associated with a PCI video adapter.

```
typedef struct _EFI_UGA_IO_PROTOCOL_CONTEXT{
    EFI_UGA_IO_PROTOCOL Protocol;
    EFI_HANDLE Controller;
}EFI_UGA_IO_PROTOCOL_CONTEXT;
```

Members
  Protocol
    Specifies an EFI_UGA_IO_PROTOCOL structure.
  Controller
    Is a handle to the PCI video adapter. The EFI runtime environment supplies this value.
Headers
  Declared in efiuga.h. Include efiuga.h.

1.3 EFI_UGA_IO_PROTOCOL Constants
  This section lists EFI_UGA_IO_PROTOCOL constants.
  EFI_UGA_IO_PROTOCOL_GUID EFI_UGA_IO_PROTOCOL_GUID
  EFI_UGA_IO_PROTOCOL_GUID is the GUID for the EFI-UGA I/O protocol.
  #define
  EFI_UGA_IO_PROTOCOL_GUID\{0x61a4d49e, 0x6f68, 0x4f1b, 0xb9, 0x22, 0xa8, 0x6e, 0xed, 0xb, 0x7, 0xa2}

Headers
  Defined in efiuga.h. Include efiuga.h.

Part 2

Implementation Samples
  This section provides sample code that illustrates how to implement EFI-UGA Binding and EFI_UGA_IO_PROTOCOL. The section also provides sample code for a UGA Firmware Interface implementation.
  2.1 EFI-UGA Binding and EFI_UGA_IO_PROTOCOL Implementation
  2.2 UGA Firmware Interface Implementation 2.1 EFI-UGA Binding and EFI_UGA_IO_PROTOCOL Implementation Sample

```
/*++

This code and information is provided "as is" without warranty of any kind, either expressed or implied, including but not limited to the implied warranties of merchantability and/or fitness for a particular purpose.

Copyright (c) 2000-2001 Microsoft Corporation

Module Name:
    efiuga.h

Abstract:
    This is an implementation of EFI-UGA binding code.

Author:
    Michael Maciesowicz (mmacie) 7 Aug. 2001

Environment:
    Firmware boot-time and OS kernel mode run-time.

Notes:

Revision History:

--*/
#ifndef _EFIUGA_H_
#define _EFIUGA_H_
#include "vml.h"
extern const UINT16 g_ui16UgaFwPciVendorId;
extern const UINT16 g_ui16UgaFwPciDeviceId;
extern const UINT16 g_ui16UgaFwPciSubvendorId;
extern const UINT16 g_ui16UgaFwPciSubdeviceId;
extern const UINT8 g_ui8UgaFwPciDeviceRevision;
//
// BUGBUG: Remove from here once EFI_UGA_IO_PROTOCOL
is in EFI 1.1.
//
#define EFI_UGA_IO_PROTOCOL_GUID \
    {0x61a4d49e, 0x6f68, 0x4f1b, 0xb9,0x22,0xa8,0x6e,0xed,0xb, 0x7,0xa2}
typedef
EFI_STATUS
(EFIAPI *EFI_UGA_IO_CREATE_DEVICE)(
    IN struct _EFI_UGA_IO_PROTOCOL *This,
    IN UGA_DEVICE *ParentDevice,
    IN UGA_DEVICE_DATA *DeviceData,
    IN VOID *RunTimeContext,
    OUT UGA_DEVICE **Device
    );
typedef
EFI_STATUS
(EFIAPI *EFI_UGA_IO_DELETE_DEVICE)(
    IN struct _EFI_UGA_IO_PROTOCOL *This,
    IN UGA_DEVICE *Device
    );
typedef struct _EFI_UGA_IO_PROTOCOL
{
    EFI_UGA_IO_CREATE_DEVICE CreateDevice;
    EFI_UGA_IO_DELETE_DEVICE DeleteDevice;
    PUGA_FW_SERVICE_DISPATCH DispatchService;
} EFI_UGA_IO_PROTOCOL;
typedef struct _EFI_UGA_IO_PROTOCOL_CONTEXT
{
    EFI_UGA_IO_PROTOCOL Protocol;
    EFI_HANDLE Controller;
} EFI_UGA_IO_PROTOCOL_CONTEXT;
#define EFI_UGA_IO_PROTOCOL_CR(This) \
    ((EFI_UGA_IO_PROTOCOL_CONTEXT *)& \
    (((EFI_UGA_IO_PROTOCOL_CONTEXT \
    *)(This))->Protocol))
extern PUGA_FW_SERVICE_DISPATCH UgaFwDispatchService;
extern EFI_HANDLE gMyImageHandle;
extern EFI_GUID gEfiUgaIoProtocolGuid;
//
// BUGBUG: Remove to here once EFI 1.1 is in the build.
//
EFI_STATUS
EFIAPI
EfiUgaDriverEntryPoint(
    IN EFI_HANDLE ImageHandle,
    IN EFI_SYSTEM_TABLE *SystemTable
    );
EFI_STATUS
EFIAPI
EfiUgaControllerDriverSupported(
    IN EFI_DRIVER_BINDING_PROTOCOL *This,
    IN EFI_HANDLE Controller,
    IN EFI_DEVICE_PATH_PROTOCOL *RemainingDevicePath
    );
EFI_STATUS
EFIAPI
EfiUgaControllerDriverStart(
    IN EFI_DRIVER_BINDING_PROTOCOL *This,
    IN EFI_HANDLE Controller,
    IN EFI_DEVICE_PATH_PROTOCOL *RemainingDevicePath
    );
EFI_STATUS
EFIAPI
EfiUgaControllerDriverStop(
    IN EFI_DRIVER_BINDING_PROTOCOL *This,
    IN EFI_HANDLE Controller,
    IN UINTN NumberOfChildren,
    IN EFI_HANDLE *ChildHandleBuffer
    );
EFI_STATUS
EFIAPI
EfiUgaCreateDevice(
    IN EFI_UGA_IO_PROTOCOL *This,
    IN UGA_DEVICE *ParentDevice,
    IN UGA_DEVICE_DATA *DeviceData,
    IN VOID *RunTimeContext,
    OUT UGA_DEVICE **Device
    );
EFI_STATUS
EFIAPI
```

-continued

```
EfiUgaDeleteDevice(
    IN EFI_UGA_IO_PROTOCOL *This,
    IN UGA_DEVICE *Device
    );
#endif // _EFIUGA_H_
/*++
```

This code and information is provided "as is" without warranty of any kind, either expressed or implied, including but not limited to the implied warranties of merchantability and/or fitness for a particular purpose.

Copyright (c) 2000-2001 Microsoft Corporation

Module Name:
  efiuga.c

Abstract:
  This is an implementation of EFI-UGA binding code.

Author:
  Michael Maciesowicz (mmacie) 24 Jul. 2001

Environment:
  Firmware boot-time and OS kernel mode run-time.

Notes:

Revision History:

```
--*/
#include "efiuga.h"
EFI_STATUS
EFIAPI
EfiUgaDriverEntryPoint(
    IN EFI_HANDLE ImageHandle,
    IN EFI_SYSTEM_TABLE *SystemTable
    )
/*++
```

Routine Description:
  This is a main entry point to EFI driver.

Arguments:
  ImageHandle—Specifies driver's image handle.
  SystemTable—Specifies EFI system data table.

Return Value:

```
EFI status code.
--*/
{
    EFI_STATUS Status;
    static EFI_DRIVER_BINDING_PROTOCOL EfiUgaDriverBinding =
    {
        EfiUgaControllerDriverSupported,
        EfiUgaControllerDriverStart,
        EfiUgaControllerDriverStop,
        1
    };
    //
    // Initialize the EFI Library.
    //
    EfiInitializeDriverLib(ImageHandle, SystemTable);
    //
    // Attach the Driver Binding Protocol to the driver's Image Handle.
    //
    Status = gBS->InstallProtocolInterface(
        &ImageHandle,
        &gEfiDriverBindingProtocolGuid,
        EFI_NATIVE_INTERFACE,
        &EfiUgaDriverBinding);
    return Status;
}
EFI_STATUS
EFIAPI
EfiUgaControllerDriverSupported(
    IN EFI_DRIVER_BINDING_PROTOCOL *This,
    IN EFI_HANDLE Controller,
    IN EFI_DEVICE_PATH_PROTOCOL *RemainingDevicePath
    )
/*++
```

Routine Description:
  This routine checks compatiblity between EFI driver image and hardware. This a required entry point for EFI driver.

Arguments:
  This—Specifies EFI driver binding protocol.
  Controller—Specifies PCI controller.
  RemainingDevicePath—Specifies additional EFI device path.

Return Value:

```
EFI status code.
--*/
{
    EFI_STATUS EfiStatus;
    EFI_PCI_IO_PROTOCOL *PciIo;
    UINT16 VendorId;
    UINT16 DeviceId;
    UINT16 SubvendorId;
    UINT16 SubdeviceId;
    UINT8 DeviceRevision;
    //
    // Open PCI IO protocol.
    //
    PciIo = NULL;
    EfiStatus = gBS->OpenProtocol(
        Controller,
        &gEfiPciIoProtocolGuid,
        &PciIo,
        gMyImageHandle,            // Global set by DriverLib
        Controller,
        EFI_OPEN_PROTOCOL_BY_DRIVER);
    //
    // Read vendor ID from the PCI configuration header.
    //
    if (!EFI_ERROR(EfiStatus))
    {
        EfiStatus = PciIo->Pci.Read(
            PciIo,
            EfiPciIoWidthUint16,
            0x0,
            1,
            &VendorId);
    }
    //
    // Read device ID from the PCI configuration header.
    //
    if (!EFI_ERROR(EfiStatus))
    {
        EfiStatus = PciIo->Pci.Read(
            PciIo,
            EfiPciIoWidthUint16,
            0x2,
            1,
            &DeviceId);
    }
    //
    // Read subvendor ID from the PCI configuration header.
```

```
-continued

//
if (!EFI_ERROR(EfiStatus))
{
  EfiStatus = PciIo->Pci.Read(
    PciIo,
    EfiPciIoWidthUint16,
    0x2c,
    1,
    &SubvendorId);
}
//
// Read subdevice ID from the PCI configuration header.
//
if (!EFI_ERROR(EfiStatus))
{
  EfiStatus = PciIo->Pci.Read(
    PciIo,
    EfiPciIoWidthUint16,
    0x2e,
    1,
    &SubdeviceId);
}
//
// Read device revision from the PCI configuration header.
//
if (!EFI_ERROR(EfiStatus))
{
  EfiStatus = PciIo->Pci.Read(
    PciIo,
    EfiPciIoWidthUint8,
    0x8,
    1,
    &DeviceRevision);
}
//
// Verify against driver's data.
//
if (!EFI_ERROR(EfiStatus))
{
  if ((VendorId == g_ui16UgaFwPciVendorId) &&
      (DeviceId == g_ui16UgaFwPciDeviceId) &&
      (SubvendorId == g_ui16UgaFwPciSubvendorId) &&
      (SubdeviceId == g_ui16UgaFwPciSubdeviceId) &&
      (DeviceRevision == g_ui8UgaFwPciDeviceRevision))
  {
    EfiStatus = EFI_SUCCESS;
  }
  else
  {
    EfiStatus = EFI_UNSUPPORTED;
  }
}
//
// Close PCI IO protocol.
//
if (PciIo)
{
  gBS->CloseProtocol(
    Controller,
    &gEfiPciIoProtocolGuid,
    gMyImageHandle,
    Controller);
  PciIo = NULL;
}
return EfiStatus;
}
EFI_STATUS
EFIAPI
EfiUgaControllerDriverStart(
  IN EFI_DRIVER_BINDING_PROTOCOL *This,
  IN EFI_HANDLE Controller,
  IN EFI_DEVICE_PATH_PROTOCOL *RemainingDevicePath
  )
/*++
```

Routine Description:

This routine starts EFI driver. This a required entry point for EFI driver.

Arguments:

This—Specifies EFI driver binding protocol.

Controller—Specifies PCI controller.

RemainingDevicePath—Specifies additional EFI device path.

Return Value:

EFI status code.
```
--*/
{
  EFI_STATUS EfiStatus;
  EFI_UGA_IO_PROTOCOL_CONTEXT *UgaIoContext = NULL;
  //
  // Allocate UGA IO protocol context.
  //
  EfiStatus = gBS->AllocatePool(
    EfiBootServicesData,
    sizeof (EFI_UGA_IO_PROTOCOL_CONTEXT),
    &UgaIoContext);
  //
  // Publish UGA IO protocol.
  //
  if (!EFI_ERROR(EfiStatus))
  {
    //
    // BUGBUG: Intel-MS sync pending (DispatchService definition).
    //
    UgaIoContext->Protocol.CreateDevice = EfiUgaCreateDevice;
    UgaIoContext->Protocol.DeleteDevice = EfiUgaDeleteDevice;
    UgaIoContext->Protocol.DispatchService = UgaFwDispatchService;
    UgaIoContext->Controller = Controller;
    EfiStatus = gBS->InstallMultipleProtocolInterfaces(
      Controller,
      &gEfiUgaIoProtocolGuid,
      &(UgaIoContext->Protocol),
      NULL);
  }
  //
  // Clean-up if anything failed.
  //
  if (EFI_ERROR(EfiStatus))
  {
    if (UgaIoContext)
    {
      gBS->FreePool(UgaIoContext);
      UgaIoContext = NULL;
    }
  }
  return EfiStatus;
}
EFI_STATUS
EFIAPI
EfiUgaControllerDriverStop(
  IN EFI_DRIVER_BINDING_PROTOCOL *This,
  IN EFI_HANDLE Controller,
  IN UINTN NumberOfChildren,
  IN EFI_HANDLE *ChildHandleBuffer
  )
/*++
```

Routine Description:

This routine stops EFI driver. This a required entry point for EFI driver.

Arguments:

This—Specifies EFI driver binding protocol.

Controller—Specifies PCI controller.

NumberOfChildren—Specifies number of child devices of PCI controller.

ChildHandleBuffer—Specifies list of child device handles of PCI controller.

Return Value:

```
        EFI status code.
--*/
{
    EFI_STATUS EfiStatus;
    EFI_UGA_IO_PROTOCOL *UgaIo;
    EFI_UGA_IO_PROTOCOL_CONTEXT *UgaIoContext;
    //
    // Open UGA IO protocol.
    //
    EfiStatus = gBS->OpenProtocol(
        Controller,
        &gEfiUgaIoProtocolGuid,
        &UgaIo,
        gMyImageHandle,
        Controller,
        EFI_OPEN_PROTOCOL_GET_PROTOCOL);
    //
    // Remove UGA IO protocol from the system.
    //
    if (!EFI_ERROR (EfiStatus))
    {
        //
        // Get UGA IO protocol context.
        //
        UgaIoContext = EFI_UGA_IO_PROTOCOL_CR(UgaIo);
        //
        // Close UGA IO protocol.
        //
        gBS->CloseProtocol(
            Controller,
            &gEfiUgaIoProtocolGuid,
            gMyImageHandle,
            Controller);
        //
        // Uninstall UGA IO protocol.
        //
        EfiStatus = gBS->UninstallMultipleProtocolInterfaces(
            Controller,
            &gEfiUgaIoProtocolGuid,
            &(UgaIoContext->Protocol),
            NULL);
    }
    //
    // Free UGA IO protocol context.
    //
    if (!EFI_ERROR(EfiStatus))
    {
        gBS->FreePool(UgaIoContext);
    }
    return EfiStatus;
}
//
// BUGBUG: Intel-MS sync pending (RunTimeContext).
//
EFI_STATUS
EFIAPI
EfiUgaCreateDevice(
    IN EFI_UGA_IO_PROTOCOL *This,
    IN UGA_DEVICE *ParentDevice,
    IN UGA_DEVICE_DATA *DeviceData,
    IN VOID *RunTimeContext,
    OUT UGA_DEVICE **Device
    )
/*++
```

Routine Description:

This routine creates and initializes UGA device object.

Arguments:

This—Specifies UGA IO protocol.

ParentDevice—Specifies UGA parent device. NULL indicates root of the enumeration—UGA device object for UgaDtParentBus will be created.

DeviceData—Specifies UGA device data.

RunTimeContext—Specifies run-time environment specific context.

Device—Specifies storage for pointer to created UGA device.

Return Value:

```
        EFI status code.
--*/
{
    EFI_UGA_IO_PROTOCOL_CONTEXT *UgaIoContext;
    EFI_STATUS EfiStatus = EFI_SUCCESS;
    EFI_PCI_IO_PROTOCOL *PciIo = NULL;
    UGA_DEVICE *NewDevice = NULL;
    VOID *DeviceContext = NULL;
    VOID *SharedContext = NULL;
    ASSERT(This != NULL);
    ASSERT(DeviceData != NULL);
    ASSERT(Device != NULL);
    //
    // Get UGA IO protocol context.
    //
    UgaIoContext = EFI_UGA_IO_PROTOCOL_CR(This);
    //
    // Check if root of enumeration.
    //
    if (ParentDevice == NULL)
    {
        //
        // Root device - open PCI IO protocol and fill in default device data.
        //
        EfiStatus = gBS->OpenProtocol(
            UgaIoContext->Controller,
            &gEfiPciIoProtocolGuid,
            &PciIo,
            gMyImageHandle,
            UgaIoContext->Controller,
            EFI_OPEN_PROTOCOL_BY_DRIVER);
        if (!EFI_ERROR(EfiStatus))
        {
            DeviceData->deviceType = UgaDtParentBus;
            DeviceData->deviceId = 0;
            DeviceData->ui32SharedContextSize = 0;
            DeviceData->ui32DeviceContextSize = 0;
        }
    }
    else
    {
        PciIo = (EFI_PCI_IO_PROTOCOL *)
            (ParentDevice->pvBusIoServices);
    }
    //
    // Allocate context data for UGA device.
    //
    if (!EFI_ERROR(EfiStatus))
    {
        EfiStatus = gBS->AllocatePool(
            EfiBootServicesData,
            sizeof (UGA_DEVICE),
            &NewDevice);
    }
    if (!EFI_ERROR(EfiStatus))
    {
        if (DeviceData->ui32DeviceContextSize)
        {
            EfiStatus = gBS->AllocatePool(
                EfiBootServicesData,
                DeviceData->ui32DeviceContextSize,
                &DeviceContext);
        }
        else
        {
            DeviceContext = NULL;
        }
    }
    if (!EFI_ERROR(EfiStatus))
    {
        if (DeviceData->ui32SharedContextSize)
```

```
            {
                EfiStatus = gBS->AllocatePool(
                    EfiBootServicesData,
                    DeviceData->ui32SharedContextSize,
                    &SharedContext);
            }
            else if (ParentDevice)
            {
                SharedContext = ParentDevice->pvSharedContext;
            }
            else
            {
                SharedContext = NULL;
            }
        }
        //
        // Set up device context record.
        //
        if (!EFI_ERROR(EfiStatus))
        {
            NewDevice->pvDeviceContext = DeviceContext;
            NewDevice->pvSharedContext = SharedContext;
            NewDevice->pvRunTimeContext = RunTimeContext;
            NewDevice->pParentDevice = ParentDevice;
            NewDevice->pvBusIoServices = PciIo;
            NewDevice->pvStdIoServices = gBS;
            gBS->CopyMem(&(NewDevice->deviceData), DeviceData, sizeof
(UGA_DEVICE_DATA));
        }
        //
        // Clean-up if anything failed.
        //
        if (EFI_ERROR(EfiStatus))
        {
            if ((ParentDevice == NULL) && PciIo)
            {
                gBS->CloseProtocol(
                    UgaIoContext->Controller,
                    &gEfiPciIoprotocolGuid,
                    gMyImageHandle,
                    UgaIoContext->Controller);
                PciIo = NULL;
            }
            if (DeviceData->ui32SharedContextSize && SharedContext)
            {
                gBS->FreePool(SharedContext);
                SharedContext = NULL;
            }
            if (DeviceContext)
            {
                gBS->FreePool(DeviceContext);
                DeviceContext = NULL;
            }
            if (NewDevice)
            {
                gBS->FreePool(NewDevice);
                NewDevice = NULL;
            }
        }
        *Device = NewDevice;
        return EfiStatus;
    }
    EFI_STATUS
    EFIAPI
    EfiUgaDeleteDevice(
        IN EFI_UGA_IO_PROTOCOL *This,
        IN UGA_DEVICE *Device
    )
    /*++
```

Routine Description:

This routine deletes UGA device object.

Arguments:

This—Specifies UGA IO protocol.

Device—Specifies UGA device object to delete.

Return Value:

EFI status code.

```
--*/
{
    EFI_UGA_IO_PROTOCOL_CONTEXT *UgaIoContext;
    ASSERT(This != NULL);
    ASSERT(Device != NULL);
    UgaIoContext = EFI_UGA_IO_PROTOCOL_CR(This);
    //
    // Check if root device.
    //
    if (Device->pParentDevice == NULL)
    {
        //
        // Root device - close PCI IO protocol.
        //
        gBS->CloseProtocol(
            UgaIoContext->Controller,
            &gEfiPciIoProtocolGuid,
            gMyImageHandle,
            UgaIoContext->Controller);
    }
    //
    // Free context data.
    //
    // Note: Shared context was only allocated for UGA devices with
    // non-zero deviceData.ui64SharedContextSize.
    //
    if (Device->deviceData.ui32SharedContextSize)
    {
        gBS->FreePool(Device->pvSharedContext);
    }
    if (Device->pvDeviceContext)
    {
        gBS->FreePool(Device->pvDeviceContext);
    }
    gBS->FreePool(Device);
/*++
    return EFI_SUCCESS;
}
```

2.2 UGA Firmware Interface Implementation Sample

This code and information is provided "as is" without warranty of any kind, either expressed or implied, including but not limited to the implied warranties of merchantability and/or fitness for a particular purpose.

Copyright (c) 2000-2001 Microsoft Corporation

Module Name:

dispatch.c

Abstract:

This is the UGA firmware driver implementation template. This module contains dispatch routines for UGA services. This template assumes following sample logical layout of UGA adapter:

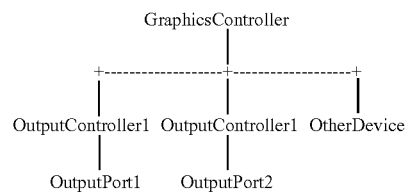

Author:

Michael Maciesowicz (mmacie) 30 Oct. 2000

Environment:

Firmware boot-time and OS kernel mode run-time.

Notes:

Revision History:

```
--*/
#include "ugafw.h"
UGA_STATUS
UGA_FW_CALL_TYPE_API
UgaFwDispatchService(
    IN PUGA_DEVICE pDevice,
    IN OUT PUGA_IO_REQUEST pIoRequest
    )
/*++
```

Routine Description:
This is a main UGA firmware service dispatch routine.
This is a required method.

Arguments:
pDevice—Specifies a device object associated with an enumerated UGA device.
pIoRequest—Points to UGA IO request packet.

Return Value:

```
UGA status code.
--*/
{
    UGA_STATUS ugaStatus;
    UGA_DEVICE_TYPE ugaDeviceType;
    static PUGA_FW_SERVICE apUgaFwService[ ] =
    {
        UgaFwDispatchService_UgaDtParentBus,
        UgaFwDispatchService_UgaDtGraphicsController,
        UgaFwDispatchService_UgaDtOutputController,
        UgaFwDispatchService_UgaDtOutputPort,
        UgaFwDispatchService_UgaDtOther
    };
    ASSERT(NULL != pDevice);
    ASSERT(NULL != pIoRequest);
    //
    // Get device type associated with passed UGA_DEVICE object.
    //
    ugaStatus = VmlGetDeviceType(pDevice, &ugaDeviceType);
    //
    // VmlGetDeviceType( ) call should never fail.
    //
    ASSERT(UGA_SUCCESS(ugaStatus));
    //
    // Dispatch service request to dispatch routine for given device type.
    //
    if ((ugaDeviceType < UgaDtParentBus) || (ugaDeviceType > UgaDtOther))
    {
        ASSERT(FALSE);
        //
        // Set number of bytes returned and status code.
        //
        pIoRequest->ui64BytesReturned = 0;
        ugaStatus = UGA_STATUS_INVALID_DEVICE;
    }
    else
    {
        ugaStatus = (*apUgaFwService[ugaDeviceType - 1])(pDevice, pIoRequest);
    }
    return ugaStatus;
}   // UgaFwDispatchService( )
UGA_STATUS
UGA_FW_CALL_TYPE_SERVICE
UgaFwDispatchService_UgaDtParentBus(
    IN PUGA_DEVICE pDevice,
    IN OUT PUGA_IO_REQUEST pIoRequest
}
/*++
```

Routine Description:
This is UGA firmware service dispatch routine for parent bus.
This is a required method.

Arguments:
pDevice—Specifies a device object associated with an enumerated UGA device.
pIoRequest—Points to UGA IO request packet.

Return Value:

```
UGA status code.
--*/
{
    UGA_STATUS ugaStatus;
    static PUGA_FW_SERVICE apUgaFwService[ ] =
    {
        Common_UgaFwGetVersion,                         //  UgaIoGetVersion
        UgaDtParentBus_UgaFwGetChildDevice,             //  UgaIoGetChildDevice
        NULL,                                           //  UgaIoStartDevice
        NULL,                                           //  UgaIoStopDevice
        NULL,                                           //  UgaIoFlushDevice
        NULL,                                           //  UgaIoResetDevice
        NULL,                                           //  UgaIoGetDeviceState
        NULL,                                           //  UgaIoSetDeviceState
        NULL,                                           //  UgaIoSetPowerState
        NULL,                                           //  UgaIoGetMemoryConfiguration
        NULL,                                           //  UgaIoSetVideoMode
        NULL,                                           //  UgaIoCopyRectangle
        NULL,                                           //  UgaIoGetEdidSegment
        NULL,                                           //  UgaIoDeviceChannelOpen
        NULL,                                           //  UgaIoDeviceChannelClose
        NULL,                                           //  UgaIoDeviceChannelRead
        NULL,                                           //  UgaIoDeviceChannelWrite
        NULL,                                           //  UgaIoGetPersistentDataSize
        NULL,                                           //  UgaIoGetPersistentData
        NULL,                                           //  UgaIoSetPersistentData
        NULL,                                           //  UgaIoGetDevicePropertySize
        NULL                                            //  UgaIoGetDeviceProperty
                                                        //  UgaIoBtPrivateInterface
    };
    ASSERT(NULL != pDevice);
    ASSERT(NULL != pIoRequest);
    //
    // Dispatch service request.
    //
```

-continued

```
    ugaStatus = UgaFwDispatchDeviceService(pDevice, pIoRequest,
apUgaFwService);
    return ugaStatus;
}    // UgaFwDispatchService_UgaDtParentBus( )
UGA_STATUS
UGA_FW_CALL_TYPE_SERVICE
UgaFwDispatchService_UgaDtGraPhicsController(
    IN PUGA_DEVICE pDevice,
    IN OUT PUGA_IO_REQUEST pIoRequest
/*++
```

Routine Description:

This is UGA firmware service dispatch routine for graphics controller.

This is a required method.

Arguments:

pDevice—Specifies a device object associated with an enumerated UGA device.

pIoRequest—Points to UGA IO request packet.

Return Value:

```
    UGA status code.
--*/
{
    UGA_STATUS ugaStatus;
    static PUGA_FW_SERVICE apUgaFwService[ ] =
    {
        Common_UgaFwGetVersion,                                    //
UgaIoGetVersion
        UgaDtGraphicsController_UgaFwGetChildDevice,               //
UgaIoGetChildDevice
        UgaDtGraphicsController_UgaFwStartDevice,                  //
UgaIoStopDevice
        UgaDtGraphicsController_UgaFwStopDevice,                   //
UgaIoStopDevice
        UgaDtGraphicsController_UgaFwFlushDevice,                  //
UgaIoFlushDevice
        UgaDtGraphicsController_UgaFwResetDevice,                  //
UgaIoResetDevice
        UgaDtGraphicsController_UgaFwSetDeviceState,               //
UgaIoGetDeviceState
        UgaDtGraphicsController_UgaFwSetDeviceState,               //
UgaIoGetDeviceState
        UgaDtGraphicsController_UgaFwSetPowerState,                //
UgaIoSetPowerState
        UgaDtGraphicsController_UgaFwGetMemoryConfiguration,       //
UgaIoGetMemoryConfiguration
        NULL,                                                      //
UgaIoSetVideoMode
        NULL,                                                      //
UgaIoCopyRectangle
        NULL,                                                      //
UgaIoGetEdidSegment
        UgaDtGraphicsController_UgaFwDeviceChannelOpen,            //
UgaIoDeviceChannelOpen
        UgaDtGraphicsController_UgaFwDeviceChannelClose,           //
UgaIoDeviceChannelClose
        UgaDtGraphicsController_UgaFwDeviceChannelRead,            //
UgaIoDeviceChannelRead
        UgaDtGraphicsController_UgaFwDeviceChannelWrite,           //
UgaIoDeviceChannelWrite
        UgaDtGraphicsController_UgaFwGetpersistentDatasize,        //
UgaIoGetPersistentDataSize
        UgaDtGraphicsController_UgaFwGetPersistentData,            //
UgaIoGetPersistentData
        UgaDtGraphicsController_UgaFwSetPersistentData,            //
UgaIoSetPersistentData
        UgaDtGraphicsController_UgaFwGetDevicePropertysize,        //
UgaIoGetDevicePropertySize
        UgaDtGraphicsController_UgaFwGetDeviceProperty,            //
UgaIoGetDeviceProperty
```

-continued

```
        UgaDtGraphicsController_UgaFwBtPrivateInterface            //
UgaIoBtPrivateInterface
    };
    ASSERT(NULL != pDevice);
    ASSERT(NULL != pIoRequest);
    //
    // Dispatch service request.
    //
    ugaStatus = UgaFwDispatchDeviceService(pDevice, pIoRequest.
apUgaFwService);
    return ugaStatus;
}  // UgaFwDispatchService_UgaDtGraphicsController( )
UGA_STATUS
UGA_FW_CALL_TYPE_SERVICE
UgaFwDispatchService_UgaDtOutputController(
    IN PUGA_DEVICE pDevice,
    IN OUT PUGA_IO_REQUEST pIoRequest
    )
/*++
```

Routine Description:

This is UGA firmware service dispatch routine for output controller.

This is a required method.

Arguments:

pDevice—Specifies a device object associated with an enumerated UGA device.

pIoRequest—Points to UGA IO request packet.

Return Value:

```
    UGA status code.
--*/
{
    UGA_STATUS ugaStatus;
    static PUGA_FW_SERVICE apUgaFwService[ ] =
    {
        Common_UgaFwGetVersion,                                    //
UgaIoGetVersion
        UgaDtOutputController_UgaFwGetChildDevice,                 //
UgaIoGetChildDevice
        UgaDtOutputController_UgaFwStartDevice,                    //
UgaIoStartDevice
        UgaDtOutputController_UgaFwStopDevice,                     //
UgaIoStopDevice
        UgaDtOutputController_UgaFwFlushDevice,                    //
UgaIoFlushDevice
        UgaDtOutputController_UgaFwResetDevice,                    //
UgaIoResetDevice
        UgaDtOutputController_UgaFwGetDeviceState,                 //
UgaIoGetDeviceState
        UgaDtOutputController_UgaFwSetDeviceState,                 //
UgaIoSetDeviceState
        UgaDtOutputController_UgaFwSetPowerState,                  //
UgaIoSetPowerState
        UgaDtOutputController_UgaFwGetMemoryConfiguration,         //
UgaIoGetMemoryConfiguration
        UgaDtOutputController_UgaFwSetVideoMode,                   //
UgaIoSetVideoMode
        UgaDtOutputController_UgaFwCopyRectangle,                  //
UgaIoCopyRectangle
        UgaDtOutputController_UgaFwGetEdidSegment,                 //
UgaIoGetEdidSegment
        UgaDtOutputController_UgaFwDeviceChannelOpen,              //
UgaIoDeviceChannelOpen
        UgaDtOutputController_UgaFwDeviceChannelClose,             //
UgaIoDeviceChannelClose
        UgaDtOutputController_UgaFwDeviceChannelRead,              //
UgaIoDeviceChannelRead
        UgaDtOutputController_UgaFwDeviceChannelWrite,             //
UgaIoDeviceChannelWrite
        UgaDtOutputController_UgaFwGetPersistentDataSize,          //
```

-continued

```
UgaIoGetPersistentDataSize
        UgaDtOutputController_UgaFwGetPersistentData,          //
UgaIoGetPersistentData
        UgaDtOutputController_UgaFwSetPersistentData,          //
UgaIoSetPersistentData
        UgaDtOutputController_UgaFwGetDevicePropertySize,      //
UgaIoGetDevicePropertySize
        UgaDtOutputController_UgaFwGetDeviceProperty,          //
UgaIoGetDeviceProperty
        UgaDtOutputController_UgaFwBtPrivateInterface          //
UgaIoBtPrivateInterface
    };
    ASSERT(NULL != pDevice);
    ASSERT(NULL != pIoRequest);
    //
    // Dispatch service request.
    //
    ugaStatus = UgaFwDispatchDeviceService(pDevice, pIoRequest,
apUgaFwService);
    return ugaStatus;
}    // UgaFwDispatchService_UgaDtOutputController( )
UGA_STATUS
UGA_FW_CALL_TYPE_SERVICE
UgaFwDispatchService_UgaDtOutputPort(
    IN PUGA_DEVICE pDevice,
    IN OUT PUGA_IO_REQUEST pIoRequest
    )
/*++
```

Routine Description:
This is UGA firmware service dispatch routine for output port.
This is a required method.

Arguments:
pDevice—Specifies a device object associated with an enumerated UGA device.
pIoRequest—Points to UGA IO request packet.

Return Value:

UGA status code.
--*/
```
{
    UGA_STATUS ugaStatus;
    static PUGA_FW_SERVICE apUgaFwService[ ] =
    {
        Common_UgaFwGetVersion,                                //
UgaIoGetVersion
        UgaDtOutputPort_UgaFwGetChildDevice,                   //
UgaIoGetChildDevice
        UgaDtOutputPort_UgaFwStartDevice,                      //
UgaIoStartDevice
        UgaDtOutputPort_UgaFwStopDevice,                       //
UgaIoStopDevice
        UgaDtOutputPort_UgaFwFlushDevice,                      //
UgaIoFlushDevice
        UgaDtOutputPort_UgaFwResetDevice,                      //
UgaIoResetDevice
        UgaDtOutputPort_UgaFwGetDeviceState,                   //
UgaIoGetDeviceState
        UgaDtOutputPort_UgaFwSetDeviceState,                   //
UgaIoSetDeviceState
        UgaDtOutputPort_UgaFwSetPowerState,                    //
UgaIoSetPowerState
        NULL,                                                   //
UgaIoGetMemoryConfiguration
        NULL,                                                   //
UgaIoSetVideoMode
        NULL,                                                   //
UgaIoCopyRectangle
        UgaDtOutputPort_UgaFwGetEdidSegment,                   //
UgaIoGetEdidSegment
        UgaDtOutputPort_UgaFwDeviceChannelOpen,                //
UgaIoDeviceChannelOpen
        UgaDtOutputPort_UgaFwDeviceChannelClose,               //
UgaIoDeviceChannelClose
        UgaDtOutputPort_UgaFwDeviceChannelRead,                //
UgaIoDeviceChannelRead
        UgaDtOutputPort_UgaFwDeviceChannelWrite,               //
UgaIoDeviceChannelWrite
        UgaDtOutputPort_UgaFwGetPersistentDataSize,            //
UgaIoGetPersistentDataSize
        UgaDtOutputPort_UgaFwGetPersistentData,                //
UgaIoGetPersistentData
        UgaDtOutputPort_UgaFwSetPersistentData,                //
UgaIoSetPersistentData
        UgaDtOutputPort_UgaFwGetDevicePropertySize,            //
UgaIoGetDevicePropertySize
        UgaDtOutputPort_UgaFwGetDeviceProperty,                //
UgaIoGetDeviceProperty
        UgaDtOutputPort_UgaFwBtPrivateInterface                //
UgaIoBtPrivateInterface
    };
    ASSERT(NULL != pDevice);
    ASSERT(NULL != pIoRequest);
    //
    // Dispatch service request.
    //
    ugaStatus = UgaFwDispatchDeviceService(pDevice, pIoRequest,
apUgaFwService);
    return ugaStatus;
}    // UgaFwDispatchService_UgaDtOutputPort( )
UGA_STATUS
UGA_FW_CALL_TYPE_SERVICE
UgaFwDispatchService_UgaDtOther(
    IN PUGA_DEVICE pDevice,
    IN OUT PUGA_IO_REQUEST pIoRequest
    )
/*++
```

Routine Description:
This is UGA firmware service dispatch routine for other device.
This is an optional method.

Arguments:
pDevice—Specifies a device object associated with an enumerated UGA device.
pIoRequest—Points to UGA IO request packet.

Return Value:

UGA status code.
--*/
```
{
    UGA_STATUS ugaStatus;
    static PUGA_FW_SERVICE apUgaFwService[ ] =
    {
        Common_UgaFwGetVersion,                                //
UgaIoGetVersion
        UgaDtOther_UgaFwGetChildDevice,                        //
UgaIoGetChildDevice
        UgaDtOther_UgaFwStartDevice,                           //
UgaIoStartDevice
        UgaDtOther_UgaFwStopDevice,                            //
UgaIoStopDevice
        UgaDtother_UgaFwFlushDevice,                           //
UgaIoFlushDevice
        UgaDtOther_UgaFwResetDevice,                           //
UgaIoResetDevice
        UgaDtOther_UgaFwGetDeviceState,                        //
UgaIoGetDeviceState
        UgaDtOther_UgaFwSetDeviceState,                        //
UgaIoSetDeviceState
        UgaDtOther_UgaFwSetPowerState,                         //
```

-continued

```
UgaIoSetPowerState
        NULL,                                          //
UgaIoGetMemoryConfiguration
        NULL,                                          //
UgaIoSetVideoMode
        NULL,                                          //
UgaIoCopyRectangle
        NULL,                                          //
UgaIoGetEdidSegment
        UgaDtOther_UgaFwDeviceChannelOpen,             //
UgaIoDeviceChannelOpen
        UgaDtOther_UgaFwDeviceChannelClose,            //
UgaIoDeviceChannelClose
        UgaDtOther_UgaFwDeviceChannelRead,             //
UgaIoDeviceChannelRead
        UgaDtOther_UgaFwDeviceChannelWrite,            //
UgaIoDeviceChannelWrite
        UgaDtOther_UgaFwGetPersistentDataSize,         //
UgaIoGetPersistentDataSize
        UgaDtOther_UgaFwGetPersistentData,             //
UgaIoGetPersistentData
        UgaDtOther_UgaFwSetPersistentData,             //
UgaIoSetPersistentData
        UgaDtOther_UgaFwGetDevicePropertySize,         //
UgaIoGetDevicePropertySize
        UgaDtOther_UgaFwGetDeviceProperty,             //
UgaIoGetDeviceProperty
        UgaDtOther_UgaFwBtPrivateInterface             //
UgaIoBtPrivateInterface
    };
    ASSERT(NULL != pDevice);
    ASSERT(NULL != pIoRequest);
    //
    // Dispatch service request.
    //
    ugaStatus = UgaFwDispatchDeviceService(pDevice, pIoRequest,
apUgaFwService);
    return ugaStatus;
}   // UgaFwDispatchService_UgaDtOther( )
UGA_STATUS
UgaFwDispatchDeviceService(
    IN PUGA_DEVICE pDevice,
    IN OUT PUGA_IO_REQUEST pIoRequest,
    IN PUGA_FW_SERVICE *ppUgaFwService
    )
/*++
```

Routine Description:
  This is UGA firmware service dispatch routine for passed in device type specific
    dispatch table.
  This is an optional method.

Arguments:
  pDevice—Specifies a device object associated with an enumerated UGA device.
  pIoRequest—Points to UGA IO request packet.
  ppUgaFwService—Points od array of pointers to device type specific UGA services.

Return Value:

UGA status code.
--*/
```
{
    UGA_STATUS ugaStatus;
    ASSERT(NULL != pDevice);
    ASSERT(NULL != pIoRequest);
    ASSERT(NULL != ppUgaFwService);
    //
    // Dispatch device type specific service request.
    //
    if (pIoRequest->ioRequestCode < UgaIoGetVersion)
    {
        ASSERT(FALSE);
        //
        // Set number of bytes returned and status code.
        //
        pIoRequest->ui64BytesReturned = 0;
        ugaStatus = UGA_STATUS_INVALID_FUNCTION;
    }
    else if (pIoRequest->ioRequestCode > UgaIoBtPrivateInterface)
    {
        //
        // Set number of bytes returned and status code.
        //
        pIoRequest->ui64BytesReturned = 0;
        ugaStatus = UGA_STATUS_UNSUPPORTED;
    }
    else if (NULL == ppUgaFwService[pIoRequest->ioRequestCode - 1])
    {
        //
        // Set number of bytes returned and status code.
        //
        pIoRequest->ui64BytesReturned = 0;
        ugaStatus = UGA_STATUS_UNSUPPORTED;
    }
    else
    {
        ugaStatus = (*ppUgaFwService[pIoRequest->ioRequestCode -
1]) (pDevice, pIoRequest);
    }
    return ugaStatus;
}   // UgaFwDispatchDeviceService( )
```

What is claimed is:

1. A method for dispatching an I/O service request comprising:
   receiving abstracted context from a universal graphics adaptor (UGA) client; and
   dispatching the abstracted context through a UGA firmware interface, wherein the firmware comprises a UGA virtual machine that interfaces with UGA hardware, and a UGA hardware abstraction layer (UGA HAL) that receives information relating to the UGA hardware via the UGA virtual machine, the UGA HAL abstracts details of the UGA hardware into the interface.

2. The method of claim 1 further comprising determining whether the context is valid.

3. The method of claim 1 further comprising determining whether the I/O service request is valid.

4. The method of claim 2, further comprising generating a status code if the context is invalid.

5. The method of claim 3, further comprising generating a status code if the I/O service request is invalid.

6. The method of claim 1 further comprising determining if UGA hardware is available for an abstracted UGA service.

7. The method of claim 6, further comprising processing the abstracted UGA service via emulation to interact available video graphics adaptor (VGA) hardware.

8. The method of claim 6 further comprising dispatching the service to a next lowest level within the UGA firmware interface.

9. The method of claim 8, further comprising iterating through next lowest levels of the UGA firmware interface until a service routine is invoked.

10. A universal graphics adaptor (UGA) system comprising:
    means for interfacing with hardware; and
    means for encapsulating and abstracting details of the hardware in a standard manner through firmware, wherein the firmware comprises a UGA virtual machine that interfaces with UGA hardware, and a UGA hardware abstraction layer (UGA HAL) that receives information relating to the UGA hardware via the UGA virtual machine, the UGA HAL abstracts details of the UGA hardware into an interface.

11. The system of claim 10 further comprising means for updating the system to support new hardware.

12. The system of claim 10, further comprising means for interfacing with video graphics adapter (VGA) hardware.

13. A computer-readable medium having stored thereon a universal graphics adaptor (UGA) comprising:
- a UGA virtual machine that interfaces with UGA hardware; and
- a UGA hardware abstraction layer (UGA HAL) that receives information relating to the UGA hardware via the UGA virtual machine, the UGA HAL abstracts details of the UGA hardware into an interface.

14. The computer-readable medium of claim 13, the UGA virtual machine is implemented in firmware.

15. The computer-readable medium of claim 13, the UGA virtual machine is stored on a chip associated with the UGA hardware.

16. The computer-readable medium of claim 13, the UGA HAL implements abstracted methods that interact with VGA hardware through a register interface.

17. The computer-readable medium of claim 13 further comprising a UGA firmware interface that defines a set of services for a device to perform.

18. The computer-readable medium of claim 17, the set of services comprises power management.

19. The computer-readable medium of claim 17, the set of services comprises a device description.

20. The computer-readable medium of claim 17, the set of services comprises data communications.

* * * * *